(12) United States Patent
Cohen et al.

(10) Patent No.: US 9,178,911 B2
(45) Date of Patent: *Nov. 3, 2015

(54) EVALUATION SYSTEMS AND METHODS FOR COORDINATING SOFTWARE AGENTS

(71) Applicant: Searete LLC, Bellevue, WA (US)

(72) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,703

(22) Filed: Jan. 7, 2014

(65) Prior Publication Data

US 2014/0189787 A1    Jul. 3, 2014

Related U.S. Application Data

(63) Continuation of application No. 11/640,448, filed on Dec. 15, 2006, now Pat. No. 8,627,402, and a continuation-in-part of application No. 11/640,532, filed on Dec. 15, 2006, now Pat. No. 8,607,336, and a continuation-in-part of application No. 11/640,531, filed on Dec. 15, 2006, now Pat. No. 8,601,530, and a continuation-in-part of application No. 11/524,051, filed on Sep. 19, 2006.

(51) Int. Cl.
*H04L 29/06* (2006.01)
*H04L 29/08* (2006.01)

(52) U.S. Cl.
CPC .............. *H04L 63/20* (2013.01); *H04L 67/34* (2013.01)

(58) Field of Classification Search
USPC ................................ 726/1, 22; 709/202, 224
See application file for complete search history.

(56) References Cited

U.S. PATENT DOCUMENTS

| 5,182,715 | A  | 1/1993  | Vorgitch et al.   |
|-----------|----|---------|-------------------|
| 5,317,688 | A  | 5/1994  | Watson et al.     |
| 5,367,635 | A  | 11/1994 | Bauer et al.      |
| 5,388,214 | A  | 2/1995  | Leiserson et al.  |
| 6,016,393 | A  | 1/2000  | White et al.      |
| 6,208,991 | B1 | 3/2001  | French et al.     |
| 6,223,215 | B1 | 4/2001  | Hunt et al.       |
| 6,330,602 | B1 | 12/2001 | Law et al.        |
| 6,347,339 | B1 | 2/2002  | Morris et al.     |

(Continued)

OTHER PUBLICATIONS

Bădică, Costin; Ganzha, Maria; Paprzycki, Marcin; "Mobile Agents in a Multi-Agent E-Commerce System"; bearing a date of 2005; pp. 1-8.

(Continued)

*Primary Examiner* — Jason Lee

(57) ABSTRACT

A device, method, computer program product, and network subsystem are described for associating a first mobile agent with a first security policy and a second mobile agent with a second security policy or for providing a first agent with code for responding to situational information about the first agent and about a second agent and for evaluating a received message at least in response to an indication of the first security policy and to an indication of the second security policy or for deploying the first agent.

21 Claims, 44 Drawing Sheets

(56) References Cited

U.S. PATENT DOCUMENTS

| | | | |
|---|---|---|---|
| 6,493,341 B1 | 12/2002 | Datta et al. | |
| 6,496,871 B1 | 12/2002 | Jagannathan et al. | |
| 6,535,928 B1 | 3/2003 | Glass | |
| 6,578,151 B1 | 6/2003 | Nilsen | |
| 6,594,684 B1 | 7/2003 | Hodjat et al. | |
| 6,677,861 B1 | 1/2004 | Henry et al. | |
| 6,748,019 B1 | 6/2004 | Lin et al. | |
| 6,751,794 B1 | 6/2004 | McCaleb et al. | |
| 6,754,691 B1 * | 6/2004 | Gomi et al. | 709/202 |
| 6,785,659 B1 | 8/2004 | Landsman et al. | |
| 6,816,965 B1 | 11/2004 | Moore et al. | |
| 6,857,082 B1 | 2/2005 | Josan et al. | |
| 6,990,547 B2 | 1/2006 | Ulrich et al. | |
| 7,058,958 B1 | 6/2006 | Shutt et al. | |
| 7,072,958 B2 | 7/2006 | Parmar et al. | |
| 7,093,088 B1 | 8/2006 | Todd et al. | |
| 7,131,142 B1 | 10/2006 | Kay | |
| 7,174,563 B1 | 2/2007 | Brownlie et al. | |
| 7,516,112 B1 | 4/2009 | Goldsmith | |
| 7,533,181 B2 | 5/2009 | Dawson et al. | |
| 7,571,474 B2 | 8/2009 | Ross et al. | |
| 7,735,116 B1 | 6/2010 | Gauvin | |
| 7,788,536 B1 | 8/2010 | Qureshi et al. | |
| 7,941,855 B2 | 5/2011 | Sung et al. | |
| 2001/0027493 A1 | 10/2001 | Wallace | |
| 2001/0037371 A1 | 11/2001 | Ohran | |
| 2002/0010798 A1 | 1/2002 | Ben-Shaul et al. | |
| 2002/0015480 A1 | 2/2002 | Daswani et al. | |
| 2002/0026506 A1 | 2/2002 | Herrmann et al. | |
| 2002/0069178 A1 | 6/2002 | Hoffman | |
| 2002/0091819 A1 * | 7/2002 | Melchione et al. | 709/224 |
| 2002/0110186 A1 | 8/2002 | Blakeney, II et al. | |
| 2002/0112089 A1 | 8/2002 | Zargham et al. | |
| 2002/0133601 A1 | 9/2002 | Kennamer et al. | |
| 2002/0143692 A1 | 10/2002 | Heimermann et al. | |
| 2003/0005350 A1 | 1/2003 | Koning et al. | |
| 2003/0009411 A1 | 1/2003 | Ram et al. | |
| 2003/0009558 A1 | 1/2003 | Ben-Yehezkel | |
| 2003/0014669 A1 * | 1/2003 | Caceres et al. | 713/201 |
| 2003/0018792 A1 | 1/2003 | Shiouchi et al. | |
| 2003/0023667 A1 | 1/2003 | Cho et al. | |
| 2003/0074204 A1 | 4/2003 | Krothapalli et al. | |
| 2003/0083908 A1 | 5/2003 | Steinmann | |
| 2003/0126056 A1 | 7/2003 | Hausman et al. | |
| 2003/0126240 A1 | 7/2003 | Vosseler | |
| 2003/0144894 A1 | 7/2003 | Robertson et al. | |
| 2003/0158933 A1 | 8/2003 | Smith | |
| 2003/0163393 A1 | 8/2003 | Mittal et al. | |
| 2003/0172163 A1 | 9/2003 | Fujita et al. | |
| 2003/0177355 A1 | 9/2003 | Elgressy et al. | |
| 2003/0212962 A1 | 11/2003 | Chin et al. | |
| 2003/0225924 A1 | 12/2003 | Jung et al. | |
| 2004/0019627 A1 | 1/2004 | Hattori et al. | |
| 2004/0049698 A1 | 3/2004 | Ott et al. | |
| 2004/0064552 A1 | 4/2004 | Chong et al. | |
| 2004/0103193 A1 | 5/2004 | Pandya et al. | |
| 2004/0143475 A1 | 7/2004 | Kilburn et al. | |
| 2004/0153545 A1 | 8/2004 | Pandya et al. | |
| 2004/0205772 A1 | 10/2004 | Uszok et al. | |
| 2004/0225751 A1 | 11/2004 | Urali | |
| 2004/0254881 A1 | 12/2004 | Kumar et al. | |
| 2005/0021713 A1 | 1/2005 | Dugan et al. | |
| 2005/0027727 A1 | 2/2005 | Garcea et al. | |
| 2005/0038827 A1 | 2/2005 | Hooks | |
| 2005/0080895 A1 | 4/2005 | Cook et al. | |
| 2005/0081182 A1 | 4/2005 | Minor et al. | |
| 2005/0119955 A1 | 6/2005 | Dang et al. | |
| 2005/0130707 A1 | 6/2005 | Ho et al. | |
| 2005/0138109 A1 | 6/2005 | Redlich et al. | |
| 2005/0149726 A1 | 7/2005 | Joshi et al. | |
| 2005/0160104 A1 | 7/2005 | Meera et al. | |
| 2005/0182969 A1 | 8/2005 | Ginter et al. | |
| 2005/0198335 A1 | 9/2005 | Brown et al. | |
| 2005/0223282 A1 | 10/2005 | Frey et al. | |
| 2005/0226059 A1 | 10/2005 | Kavuri et al. | |
| 2005/0246283 A1 | 11/2005 | Gwiazda et al. | |
| 2005/0276397 A1 | 12/2005 | Hiatt et al. | |
| 2005/0278344 A1 | 12/2005 | Horvitz et al. | |
| 2005/0288939 A1 | 12/2005 | Peled et al. | |
| 2005/0289108 A1 | 12/2005 | Carol et al. | |
| 2006/0010491 A1 | 1/2006 | Prigent et al. | |
| 2006/0026272 A1 | 2/2006 | Sullivan et al. | |
| 2006/0026677 A1 | 2/2006 | Edery et al. | |
| 2006/0041558 A1 | 2/2006 | McCauley et al. | |
| 2006/0059253 A1 | 3/2006 | Goodman et al. | |
| 2006/0069585 A1 | 3/2006 | Springfield et al. | |
| 2006/0074946 A1 | 4/2006 | Pham | |
| 2006/0080352 A1 | 4/2006 | Boubez et al. | |
| 2006/0080397 A1 | 4/2006 | Chene et al. | |
| 2006/0095976 A1 | 5/2006 | Torres et al. | |
| 2006/0098588 A1 | 5/2006 | Zhang et al. | |
| 2006/0100010 A1 | 5/2006 | Gatto et al. | |
| 2006/0156398 A1 * | 7/2006 | Ross et al. | 726/22 |
| 2006/0168334 A1 | 7/2006 | Patti et al. | |
| 2006/0230109 A1 | 10/2006 | Lee et al. | |
| 2006/0294103 A1 | 12/2006 | Wood | |
| 2007/0067848 A1 | 3/2007 | Gustave et al. | |
| 2007/0079237 A1 | 4/2007 | Abrams et al. | |
| 2007/0143827 A1 | 6/2007 | Nicodemus et al. | |
| 2007/0168874 A1 | 7/2007 | Kloeffer et al. | |
| 2007/0169167 A1 | 7/2007 | Morimura et al. | |
| 2007/0276696 A1 | 11/2007 | Gauvin et al. | |
| 2007/0282880 A1 | 12/2007 | Cohen et al. | |
| 2008/0068381 A1 | 3/2008 | Cohen et al. | |
| 2008/0071891 A1 | 3/2008 | Cohen et al. | |
| 2008/0071896 A1 | 3/2008 | Cohen et al. | |
| 2008/0072032 A1 | 3/2008 | Cohen et al. | |
| 2008/0141076 A1 | 6/2008 | Hu et al. | |
| 2009/0077616 A1 * | 3/2009 | Lindholm et al. | 726/1 |
| 2010/0057907 A1 | 3/2010 | Ross et al. | |

OTHER PUBLICATIONS

Bădică, Costin; Ganzha, Maria; Paprzycki, Marcin; Pîrvănescu, Amalia; "Combining Rule-Based and Plug-in Components in Agents for Flexible Dynamic Negotiations"; bearing a date of 2005; pp. 1-4.

Borselius, Niklas; "Multi-Agent System Security for Mobile Communication"; Technical Report; bearing dates of Sep. 1, 2003 and 2003; pp. 1-214; located at: http://www.ma.rhul.ac.uk/techreports/2003/RHUL-MA-2003-5.pdf.

Borselius, Niklas; Mitchell, Chris J.; Wilson, Aaron; "On Mobile Agent Based Transactions in Moderately Hostile Environments"; bearing a date of 2001; pp. 1-14.

Corradi, Antonio; Cremonini, Marco; Stefanelli, Cesare; "Melding Abstractions With Mobile Agents"; bearing a date of 1998; pp. 1-14.

Dimitrakos, Theo; Djordjevic, Ivan; Matthews, Brian; Bicarregui, Juan; Phillips, Chris; "Policy-Driven Access Control Over a Distributed Firewall Architecture"; bearing a date of 2002; pp. 1-14.

Merseguer et al.; "Analysing Internet Software Retrieval Systems: Modeling and Performance Comparison"; Wireless Networks; bearing a date of 2003; pp. 223-238; vol. 9; Kluwer Academic Publishers; The Netherlands.

"Nessus Scan Report"; printed on Aug. 28, 2006; pp. 1-65; located at: http://www.nessus.org/demo/report.html.

Olive, Frédéric; "An Intrusion Prevention System Using Mobile Agents"; Master Thesis; bearing a date of Sep. 2003; pp. 1-97.

"Retsina"; The Intelligent Software Agents Lab; bearing a date of 2001; pp. 1-2.

Sander, Tomas; Tschudin, Christian F.; "Protecting Mobile Agents Against Malicious Hosts"; bearing a date of Feb. 1998; pp. 1-16.

Vigna, Giovanni; "Protecting Mobile Agents Through Tracing"; bearing a date of 1997; pp. 1-14.

Wang, Chenxi; "A Security Architecture for Survivability Mechanisms"; Computer Science; bearing a date of Oct. 2000; pp. 1-197.

Wooldridge, Michael; "An Introduction to Multiagent Systems"; Department of Computer Science; bearing a date of 2002; pp. 105-128, 189-223, 245-266 and 267-302; Chapters 6, 9, 11 and 12; John Wiley & Sons, Ltd.

Xian, Feng; Jin, Hai; Liu, Ke, Han, Zongfen; "A Mobile-Agent Based Distributed Dynamic μFirewall Architecture"; Computer Society; bearing a date of 2002; pp. 1-6; IEEE.

* cited by examiner

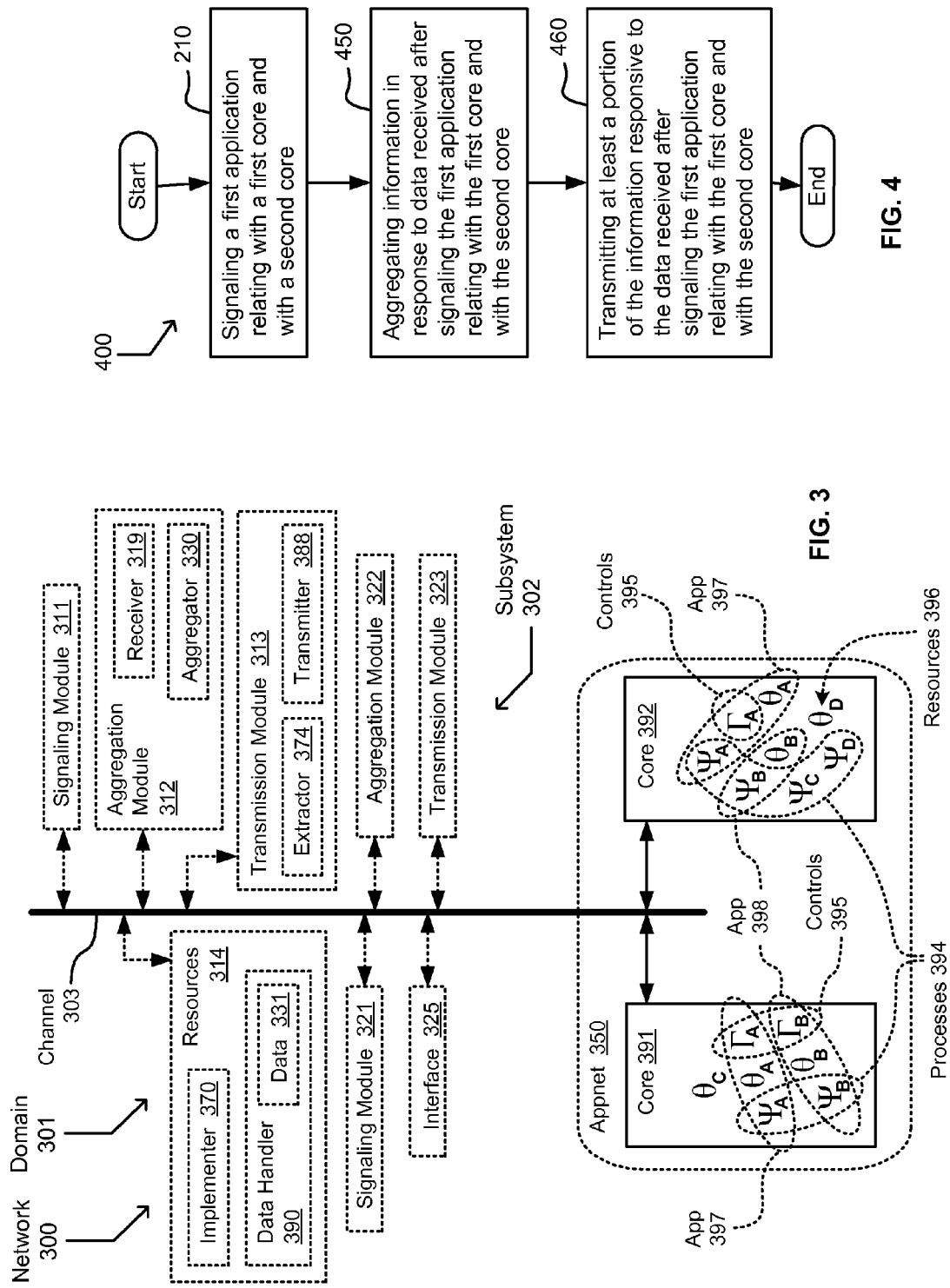

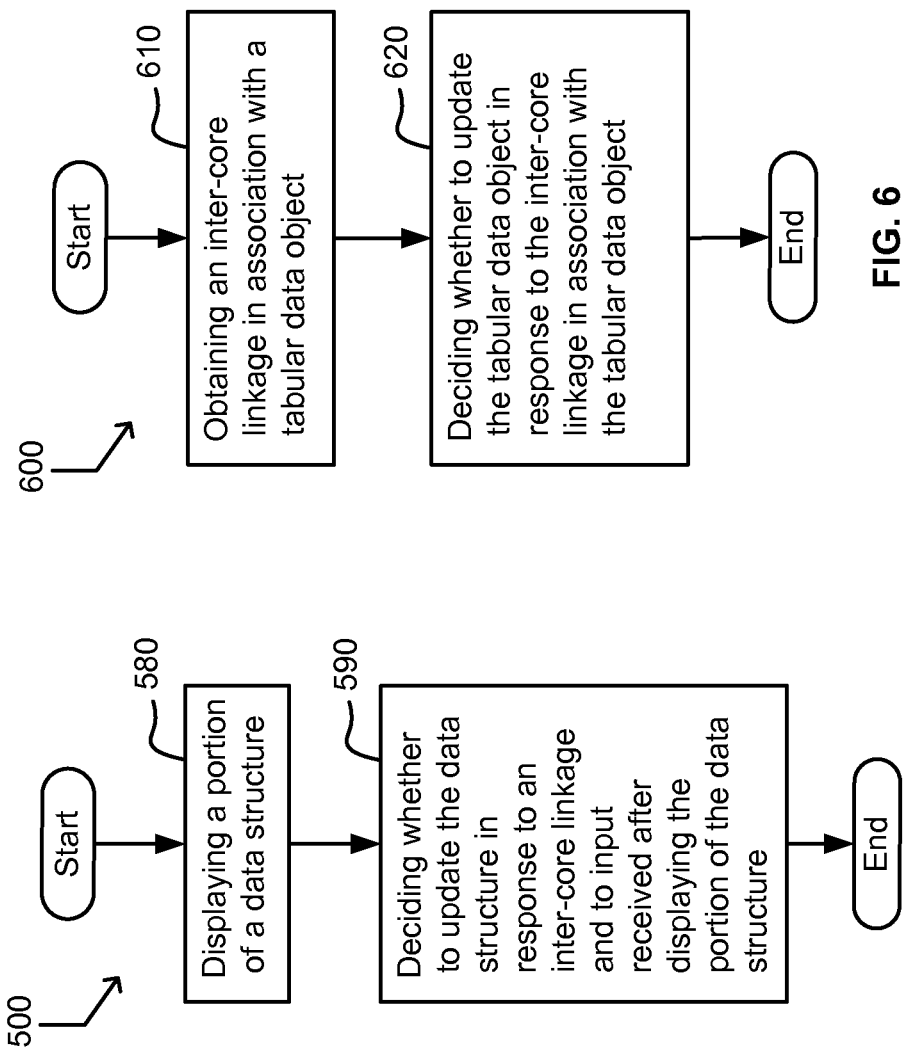

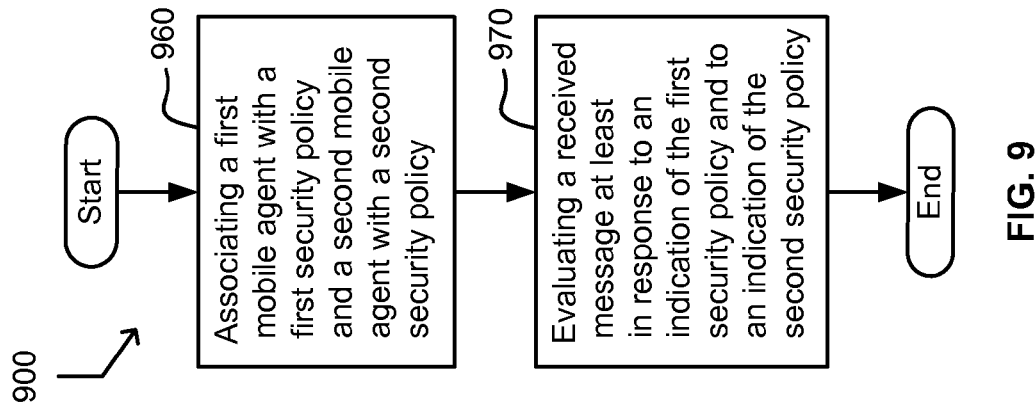
FIG. 9
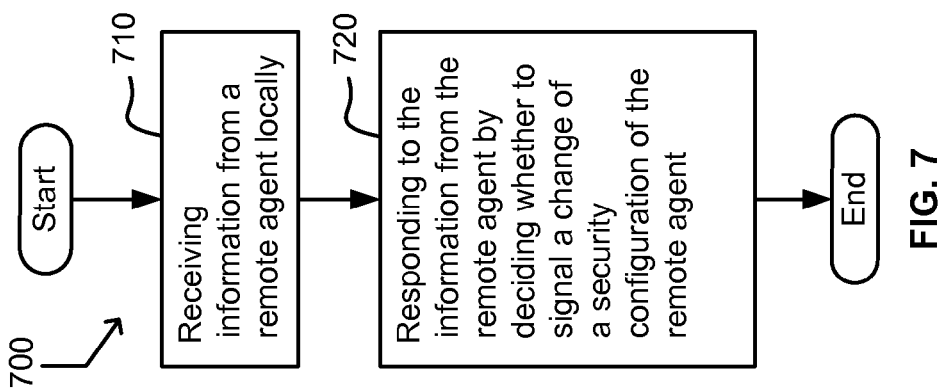
FIG. 8
FIG. 7

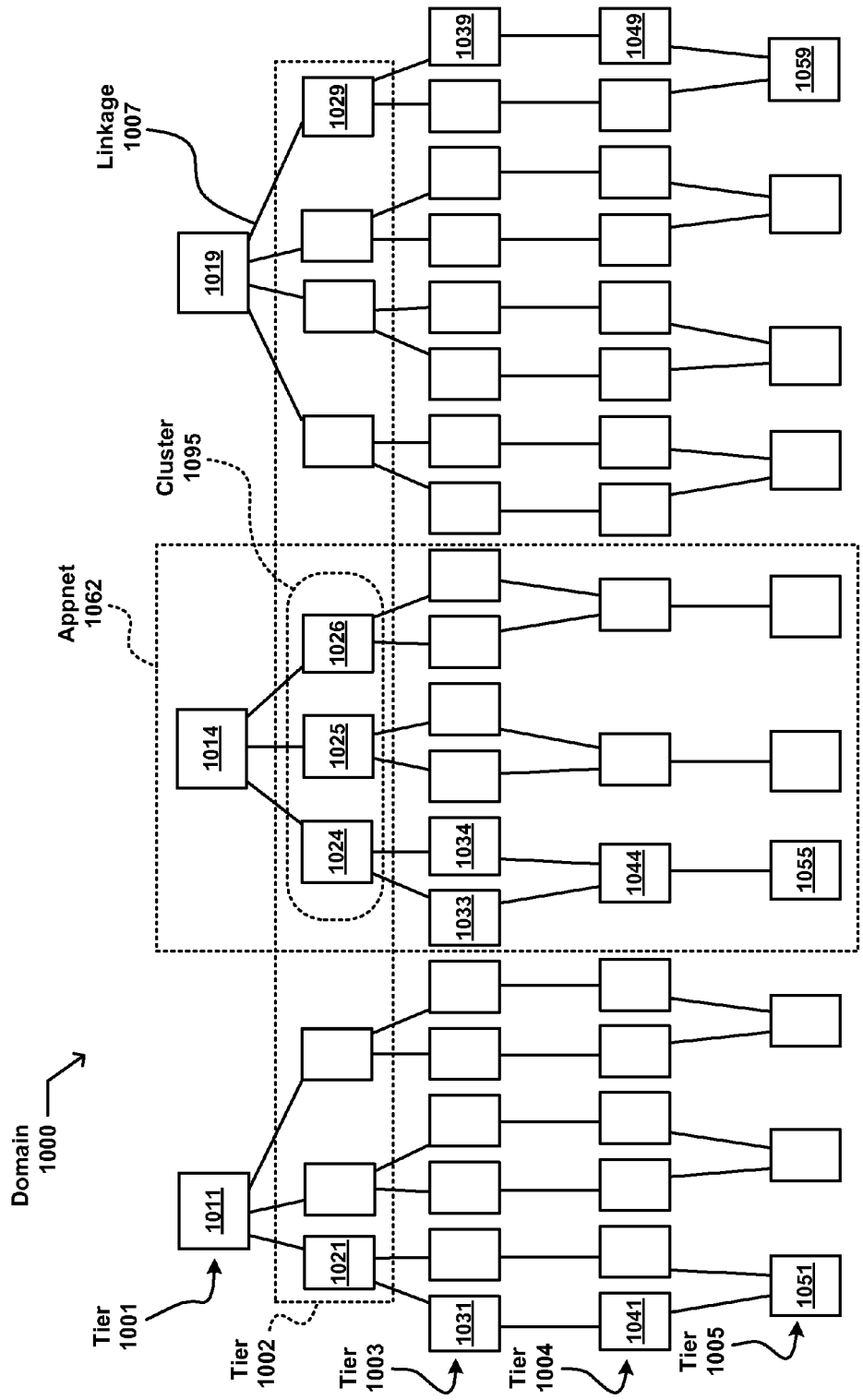

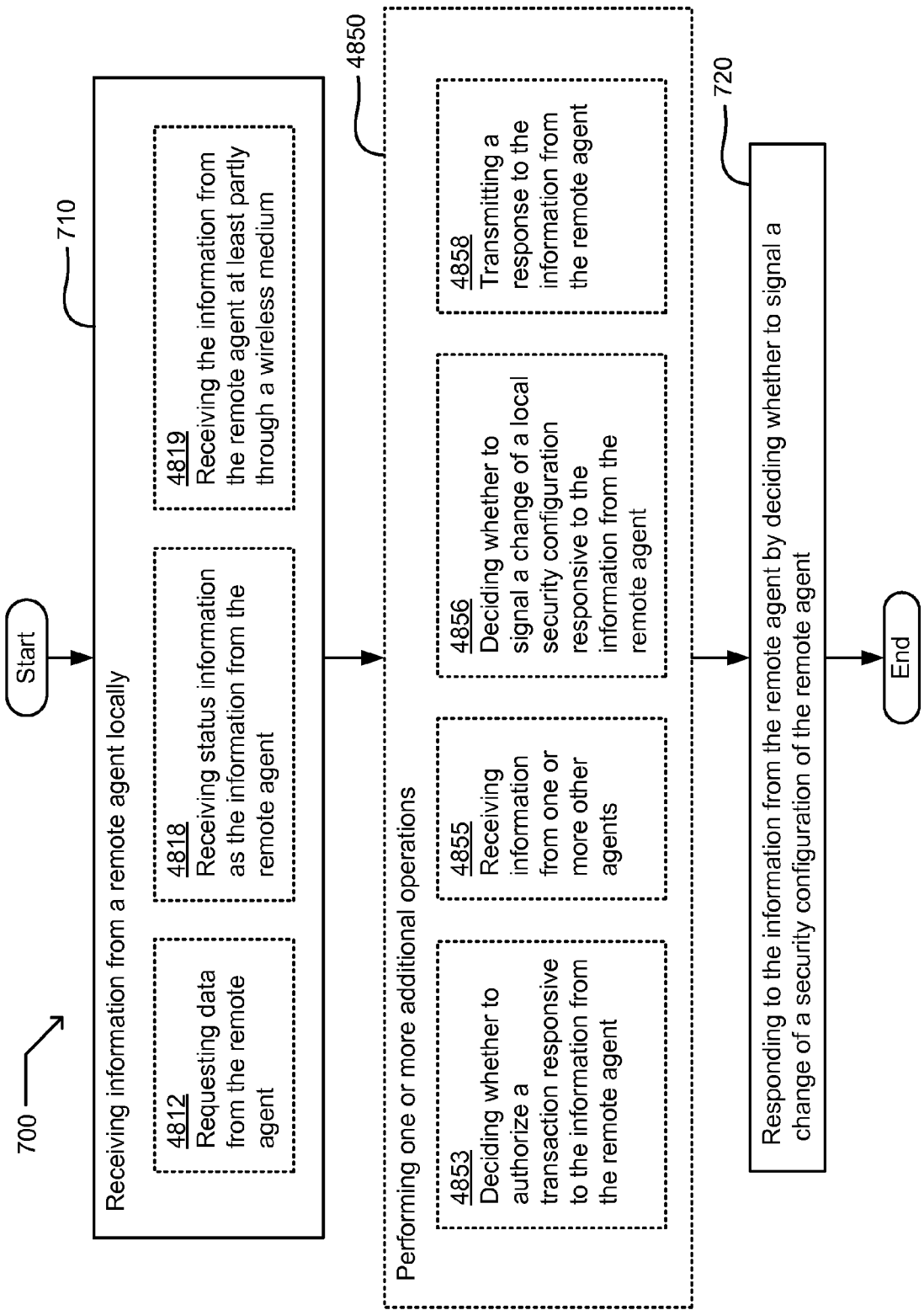

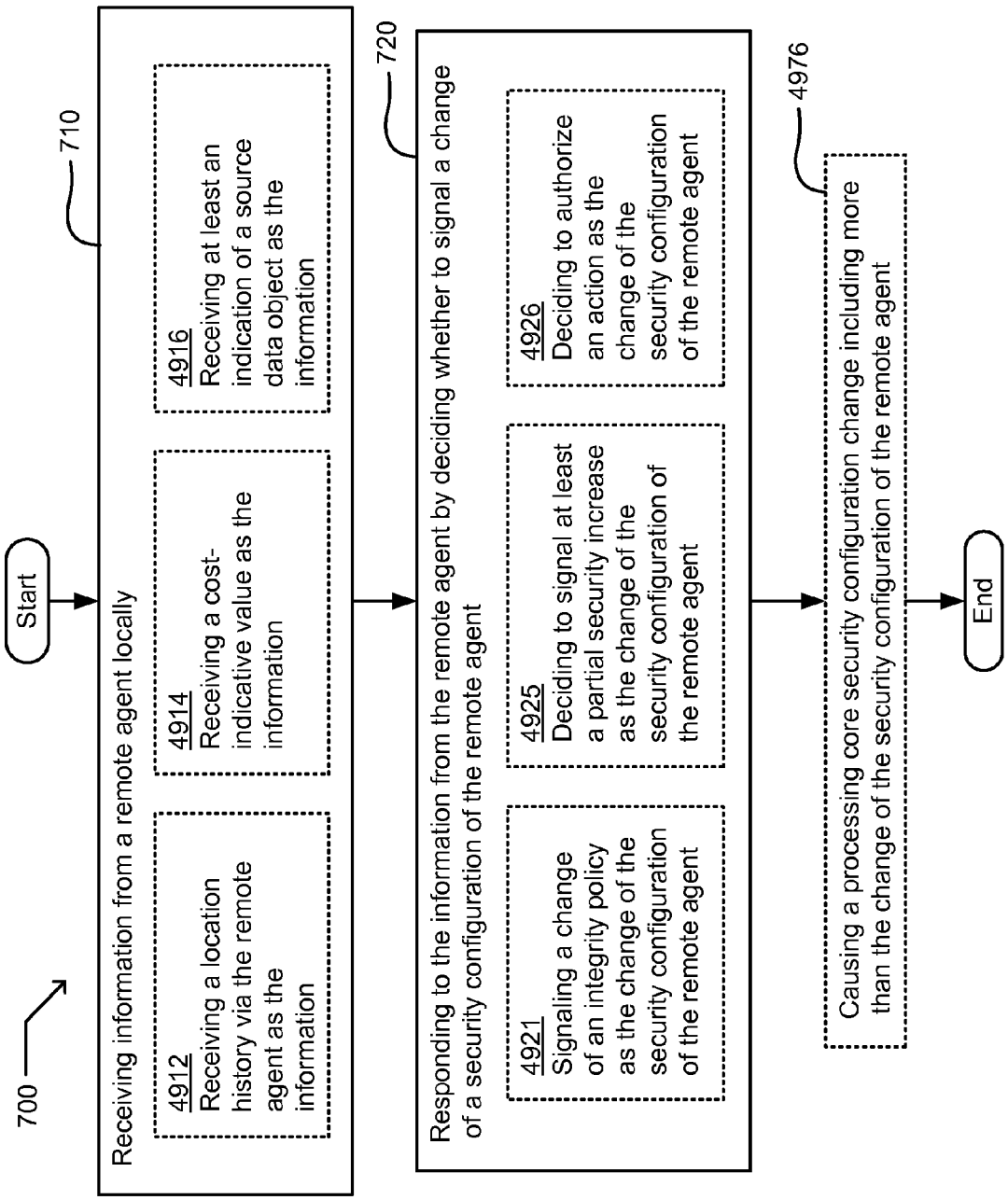

EVALUATION SYSTEMS AND METHODS FOR COORDINATING SOFTWARE AGENTS

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 11/640,448, entitled "EVALUATION SYSTEMS AND METHODS FOR COORDINATING SOFTWARE AGENTS", naming Alexander J. Cohen, Edward K. Y. Jung, Royce A. Levien, Robert W. Lord and William Henry Mangione-Smith as inventors, filed 15 Dec. 2006, which is currently co-pending, or is an application of which a currently co-pending application is entitled to the benefit of the filing date.

For purposes of the USPTO extra-statutory requirements, the present application constitutes a continuation of U.S. patent application Ser. No. 11/640,532, entitled "EVALUATION SYSTEMS AND METHODS FOR COORDINATING SOFTWARE AGENTS", naming Alexander J. Cohen, Edward K. Y. Jung, Royce A. Levien, Robert W. Lord and William Henry Mangione-Smith as inventors, filed 15 Dec. 2006, which is currently co-pending, or is an application of which a currently co-pending application is entitled to the benefit of the filing date.

For purposes of the USPTO extra-statutory requirements, the present application constitutes a continuation of U.S. patent application Ser. No. 11/640,531, entitled "EVALUATION SYSTEMS AND METHODS FOR COORDINATING SOFTWARE AGENTS", naming Alexander J. Cohen, Edward K. Y. Jung, Royce A. Levien, Robert W. Lord and William Henry Mangione-Smith as inventors, filed 15 Dec. 2006, which is currently co-pending, or is an application of which a currently co-pending application is entitled to the benefit of the filing date.

For purposes of the USPTO extra-statutory requirements, the present application constitutes a continuation of U.S. patent application Ser. No. 11/524,051, entitled "EVALUATION SYSTEMS AND METHODS FOR COORDINATING SOFTWARE AGENTS", naming Alexander J. Cohen, Edward K. Y. Jung, Royce A. Levien, Robert W. Lord and William Henry Mangione-Smith as inventors, filed 19 Sep. 2006, which is currently co-pending, or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

SUMMARY

An embodiment provides a method. In one implementation, the method includes but is not limited to signaling a first application relating with a first core and with a second core, aggregating information in response to data received after signaling the first application relating with the first core and with the second core and transmitting at least a portion of the information aggregated in response to the data received after signaling the first application relating with the first core and with the second core. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for signaling a first application relating with a first core and with a second core; one or more instructions for aggregating information in response to data received after signaling the first application relating with the first core and with the second core; and one or more instructions for transmitting at least a portion of the information aggregated in response to the data received after signaling the first application relating with the first core and with the second core. In addition to the foregoing, other computer program product aspects are described in the claims, drawings, and text forming a part of the present disclosure.

In one or more various aspects, related systems include but are not limited to circuitry and/or programming for effecting the herein-referenced method aspects, the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for signaling a first application relating with a first core and with a second core, circuitry for aggregating information in response to data received after signaling the first application relating with the first core and with the second core and circuitry for transmitting at least a portion of the information aggregated in response to the data received after signaling the first application relating with the first core and with the second core. In addition to the foregoing, other system aspects are described in the claims, drawings, and text forming a part of the present disclosure.

An embodiment provides a method. In one implementation, the method includes but is not limited to associating a first mobile agent with a first security policy and a second mobile agent with a second security policy and evaluating a received message at least in response to an indication of the first security policy and to an indication of the second security policy. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for associating a first mobile agent with a first security policy and a second mobile agent with a second security policy and one or more instructions for evaluating a received message at least in response to an indication of the first security policy and to an indication of the second security policy. In addition to the foregoing, other computer program product aspects are described in the claims, drawings, and text forming a part of the present disclosure.

In one or more various aspects, related systems include but are not limited to circuitry and/or programming for effecting the herein-referenced method aspects, the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for associating a first mobile agent with a first security policy and a second mobile agent with a second security policy and circuitry for evaluating a received message at least in response to an indication of the first security policy and to an indication of the second security policy. In addition to the foregoing, other system aspects are described in the claims, drawings, and text forming a part of the present disclosure.

An embodiment provides a method. In one implementation, the method includes but is not limited to providing a first agent with code for responding to situational information about the first agent and about a second agent and deploying the first agent. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for providing a first agent with code for responding to situational information about the first agent and about a second agent and one or more instructions for deploying the first agent. In addition to the foregoing, other computer program product aspects are described in the claims, drawings, and text forming a part of the present disclosure.

In one or more various aspects, related systems include but are not limited to circuitry and/or programming for effecting the herein-referenced method aspects, the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for providing a first agent with code for responding to situational information about the first agent and about a second agent and circuitry for deploying the first agent. In addition to the foregoing, other system aspects are described in the claims, drawings, and text forming a part of the present disclosure.

An embodiment provides a method. In one implementation, the method includes but is not limited to signaling a first application relating with a first core and with a second core and signaling via a third core a partial service configuration change at least in the first core in response to data received after signaling the first application relating with the first core and with the second core. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for signaling a first application relating with a first core and with a second core and one or more instructions for signaling via a third core a partial service configuration change at least in the first core in response to data received after signaling the first application relating with the first core and with the second core. In addition to the foregoing, other computer program product aspects are described in the claims, drawings, and text forming a part of the present disclosure.

In one or more various aspects, related systems include but are not limited to circuitry and/or programming for effecting the herein-referenced method aspects, the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for signaling a first application relating with a first core and with a second core and circuitry for signaling via a third core a partial service configuration change at least in the first core in response to data received after signaling the first application relating with the first core and with the second core. In addition to the foregoing, other system aspects are described in the claims, drawings, and text forming a part of the present disclosure.

An embodiment provides a method. In one implementation, the method includes but is not limited to displaying a portion of a data structure and deciding whether to update the data structure in response to an inter-core linkage and to input received after displaying the portion of the data structure. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for displaying a portion of a data structure and one or more instructions for deciding whether to update the data structure in response to an inter-core linkage and to input received after displaying the portion of the data structure. In addition to the foregoing, other computer program product aspects are described in the claims, drawings, and text forming a part of the present disclosure.

In one or more various aspects, related systems include but are not limited to circuitry and/or programming for effecting the herein-referenced method aspects, the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for displaying a portion of a data structure and circuitry for deciding whether to update the data structure in response to an inter-core linkage and to input received after displaying the portion of the data structure. In addition to the foregoing, other system aspects are described in the claims, drawings, and text forming a part of the present disclosure.

An embodiment provides a method. In one implementation, the method includes but is not limited to obtaining an inter-core linkage in association with a tabular data object and deciding whether to update the tabular data object in response to the inter-core linkage obtained in association with the tabular data object. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for obtaining an inter-core linkage in association with a tabular data object and one or more instructions for deciding whether to update the tabular data object in response to the inter-core linkage obtained in association with the tabular data object. In addition to the foregoing, other computer program product aspects are described in the claims, drawings, and text forming a part of the present disclosure.

In one or more various aspects, related systems include but are not limited to circuitry and/or programming for effecting the herein-referenced method aspects, the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for obtaining an inter-core linkage in association with a tabular data object and circuitry for deciding whether to update the tabular data object in response to the inter-core linkage obtained in association with the tabular data object. In addition to the foregoing, other system aspects are described in the claims, drawings, and text forming a part of the present disclosure.

An embodiment provides a method. In one implementation, the method includes but is not limited to receiving information from a remote agent locally and responding to the locally received information from the remote agent by deciding whether to signal a change of a security configuration of the remote agent. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for receiving information from a remote agent locally and one or more instructions for responding to the locally received information from the remote agent by deciding whether to signal a change of a security configuration of the remote agent. In addition to the foregoing, other computer program product aspects are described in the claims, drawings, and text forming a part of the present disclosure.

In one or more various aspects, related systems include but are not limited to circuitry and/or programming for effecting the herein-referenced method aspects, the circuitry and/or programming can be virtually any combination of hardware, software, and/or firmware configured to effect the herein-referenced method aspects depending upon the design choices of the system designer.

An embodiment provides a system. In one implementation, the system includes but is not limited to circuitry for receiving information from a remote agent locally and circuitry for responding to the locally received information from the remote agent by deciding whether to signal a change of a security configuration of the remote agent. In addition to the foregoing, other system aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 3 depicts an exemplary environment in which one or more technologies may be implemented.

FIGS. 4-9 depict high-level logic flows of other operational processes.

FIGS. 10-28 depict other exemplary environments in each of which one or more technologies may be implemented.

FIGS. 47-49 depict variants of the flow of FIG. 7.

DETAILED DESCRIPTION

Figure 2:
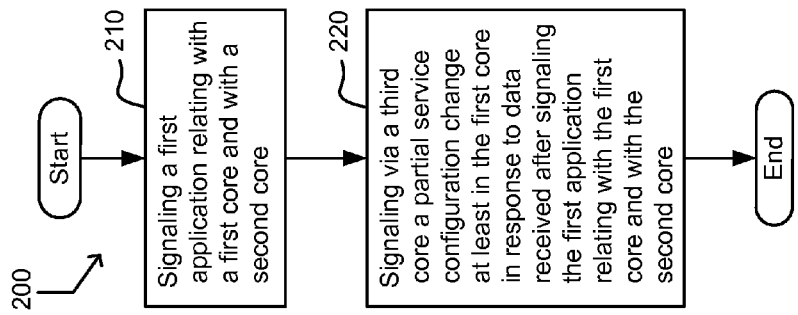
FIG. 2 depicts a high-level logic flow of an operational process.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
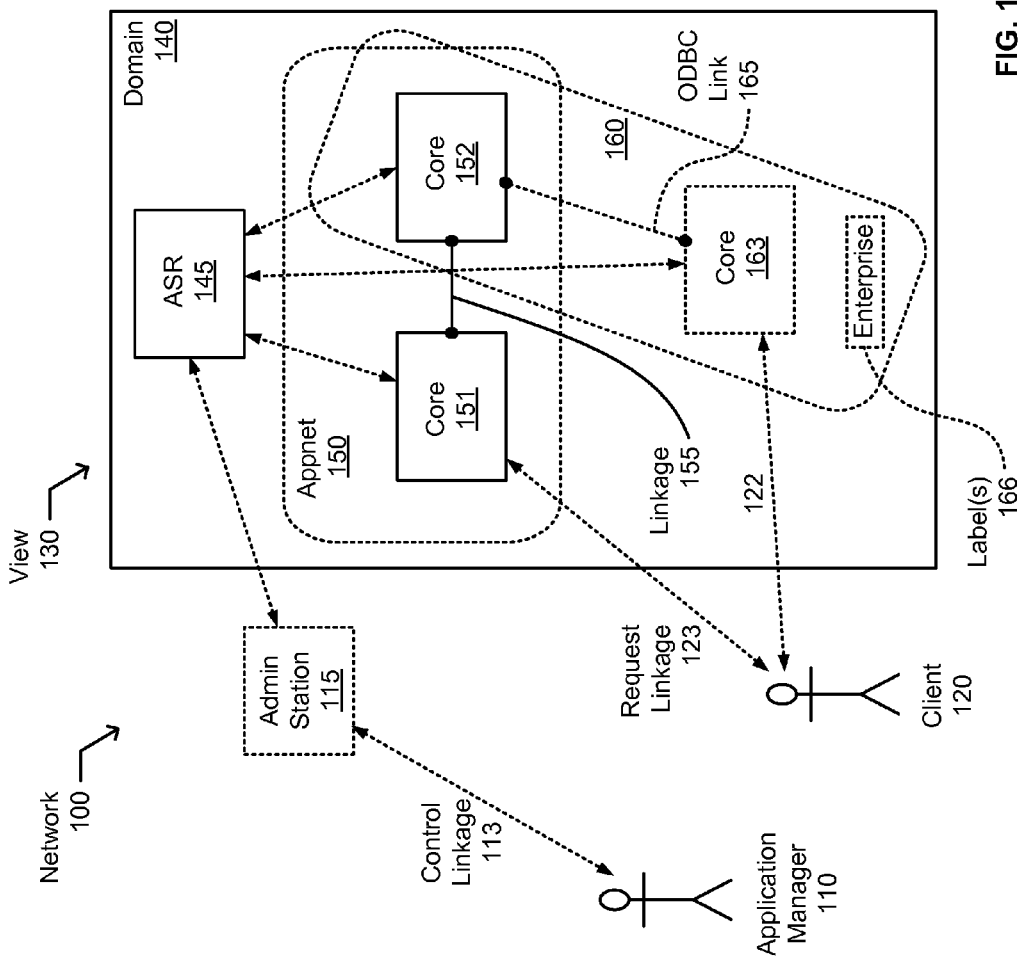
FIG. 1 depicts an exemplary environment in which one or more technologies may be implemented.

Referring now to FIG. 1, there is shown a view 130 of an exemplary environment in which one or more technologies may be implemented. As shown network 100 includes domain 140 including Application Service Router (ASR) 145 optionally linked to admin station 115. Alternatively or additionally, admin station 115 can be linked to application manager 110 via control linkage 113. Domain 140 includes appnet 150 including core 151 and core 152 at least coupled by linkage 155, which can be a virtual or other channel between mutually remote sites, for example. In some embodiments, an appnet includes at least a set of cores associated with an application (or a suite of applications), and may also include circuitry, code, data, or the like. The cores may comprise processing cores or environments, simple communication cores, relays, or the like.

In some embodiments, a "core" refers to a processing core, a computer or processing environment, a network node, software or logic configured for processing data, active relay circuitry operable for handling data, or the like. Likewise a data object can be "in" a core if it is at more closely associated with that core than with other cores, for example by virtue of existing within one or more media of a hardware core or within a core's designated space allocation of memory or storage.

One or more of the cores 151, 152 in appnet 150 are coupled to ASR 145. One or more of the cores 151, 152 in appnet 150 can optionally interact with client 120 via request linkage 123. Network 100 can (optionally) include one or more other appnets such as overlapping appnet 160. Appnet 160 can include core 152 and core 163 at least, optionally coupled by open database communication (ODBC) link 165 or the like. In some embodiments, one or more cores 152, 163 of appnet 160 can also be accessible to client 120, such as by linkage 122. As shown, each of appnets 150, 160 associates an application (or a cluster of applications) to groups of cores. For example, one or more label(s) 166 ("Enterprise" or "Parts Catalog," e.g.) can represent the application(s) of appnet 160 in view 130.

Referring now to FIG. 2, there is shown a high-level logic flow 200 of an operational process. Operation 210 describes signaling a first application relating with a first core and with a second core (e.g. ASR 145 signaling that appnet 150 contains a rendering application distributed across network cores 151, 152). Alternatively or additionally, operation 210 can include signaling such a distributed application via a direct or indirect path. In some embodiments, operation 210 can include storing or transmitting an indication of a relationship between the application and the cores, optionally as one or more messages that also indicate features of the relationship. The features can include names or other handles of processes, resources, or controls affecting or effectuating the application at one or more of the cores, for example. In some embodiments, an application comprises software or firmware that employs the capabilities of circuitry for performing a user-assigned task or some other task that some operating systems might not perform.

Flow 200 includes operation 210—signaling a first application relating with a first core and with a second core (e.g. admin station 115 reporting a complete topography of appnet 150 via control linkage 113). Portions of this topography can be omitted for brevity, of course, in some embodiments. Alternatively or additionally, in various embodiments as described below, operation 210 can likewise be performed by ASR 145 or by various combinations shown in FIGS. 11 and 26.

Flow 200 further includes operation 220—signaling via a third core a partial service configuration change at least in the first core in response to data received after signaling the first application relating with the first core and with the second core (e.g. admin station 115 or ASR 145 signaling a process suspension or restart in core 151 responsive to an instruction from application manager 110 after operation 210). Signaling the process suspension can include triggering or displaying an indication of the suspension or restart (via ASR 145 or control linkage 113, e.g.).

Referring now to FIG. 3, there is shown an exemplary environment in which one or more technologies may be implemented. Network 300 includes domain 301 including subsystem 302 and appnet 350 linked by channel 303 or otherwise able to communicate with each other. (It will be understood by those skilled in the art that a common channel such as a system bus is shown for convenience, but that coupling arrangements of comparable effectiveness between or among the recited items can be formed in other types of structures such as direct conduits. See, e.g., FIG. 17.) Subsystem 302 can include one or more of signaling modules 311, 321; one or more aggregation modules 312, 322, one or more transmission modules 313, 323, or one or more types of interface 325. Appnet 350 includes two or more cores 391, 392 jointly containing one or more apps 397, 398 each with one or more processes 394, one or more controls 395, or one or more resources 396 in each of the cores as shown. As shown, resources 314 can include implementer 370 or data handler 390 able to store or otherwise handle data 331. Aggregation module 312 can include one or more of receiver 319 or aggregator 330. Transmission module 313 can include one or more of extractor 374 or transmitter 388.

Referring now to FIG. 4, there is shown a high-level logic flow 400 of an operational process. Operation 210—signaling a first application relating with a first core and with a second core (e.g. signaling module 311 signaling that appnet 350 contains an encoding application distributed across cores 391, 392). The signaling can include sending a signal to or about the application or the fact or manner of relating, for example.

Flow 400 further includes operation 450—aggregating information in response to data received after signaling the first application relating with the first core and with the second core (e.g. aggregation module 312 logging event indications according to one or more criteria received by receiver 319 after signaling module 311 signals appnet 350). In some embodiments, aggregating can comprise gathering the information over time, or from more than one source, into a unified or other accessible structure. Those skilled in the art will recognize a variety of aggregation rules that can be adapted for such embodiments without undue experimentation. Receiver 319 can receive event types, timestamps, error indications or the like from data 331 locally or from interface 325, for example, as the one or more criteria.

Flow 400 further includes operation 460—transmitting at least a portion of the information aggregated in response to the data received after signaling the first application relating with the first core and with the second core (e.g. transmission module 313 sending a selection of the above-referenced event indications as a plot to interface 325). The plot can include an activity level index plotted against time, for example, or any other scatter plot of correlated measurements or other figures of merit. Alternatively or additionally, portions of operation 460 can be performed before, during, or in alternation with operations 210, 220, and 450 in some embodiments.

Referring now to FIG. 5, there is shown a high-level logic flow 500 of an operational process. Operation 580—displaying a portion of a data structure (e.g. an interface showing less than all of a message, table or the like via a mechanism such as a display screen). In some embodiments, the portion can show a single scalar value or several fields in a common record. Alternatively or additionally, formatting information such as menu options or other labels can be displayed simultaneously. See, e.g., FIGS. 22 & 23.

Flow 500 further includes operation 590—deciding whether to update the data structure in response to an inter-core linkage and to input received after displaying the portion of the data structure (e.g. a decision module or the like deciding whether to update a file partly based on a linkage to another core within the file and partly based on a user's response to the displayed portion). In some embodiments, an "inter-core linkage" can refer to a hardware or software configuration causing data in a first core to affect data in a second core by virtue of a continuous, synchronous, responsive, or other systematic update mechanism. Alternatively or additionally, the input can include timing signals, for example, so that a default value can be used in response to a user's failure to provide the input promptly.

Referring now to FIG. 6, there is shown a high-level logic flow 600 of an operational process. Operation 610 describes obtaining an inter-core linkage in association with a tabular data object (e.g. a linkage module or the like creating or otherwise defining a linkage between a local data object and another core's data object to pull or push data through the linkage, maintaining a relationship between the data objects). In some embodiments, "tabular" data refers to groupings of decimal, text, or other spreadsheet-type data for use in columns and rows of user-symbol-containing cells. It also refers to other data at least partly based on such tabular data (e.g. totals or charts), to format data usable with such tabular data (e.g. font information), or to formulas or other logic responsive to other tabular data. Operation 620 describes deciding whether to update the tabular data object in response to the inter-core linkage obtained in association with the tabular data object (e.g. a link management module maintaining the above-described relationship by pulling or pushing data through the linkage). See, e.g., FIGS. 22 & 23.

Referring now to FIG. 7, there is shown a high-level logic flow 700 of an operational process. Operation 710—receiving information from a remote agent locally (e.g. a receiving module receiving a file containing malware or some other status-indicative signal from an agent via an internet hub). In some embodiments described in this document, an "agent" can be an application or other software object able to decide upon an action to perform based upon a history of its observations in its environment. An agent can be "mobile" if it includes at least a portion that could make such a decision even after being dispatched into one or more remote cores. Flow 700 further includes operation 720—responding to the locally received information from the remote agent by deciding whether to signal a change of a security configuration of the remote agent (e.g. a decision module responding to a long series of timely heartbeat signals by signaling a removal of a security protocol at the remote agent). See, e.g., FIG. 19.

Referring now to FIG. 8, there is shown a high-level logic flow 800 of an operational process. Operation 880—providing a first agent with code for responding to situational information about the first agent and about a second agent (e.g. agent configuration circuitry programming the first agent for reacting to the situation of the first agent and that of other agents). Flow 800 further includes operation 890—deploying the first agent (e.g. agent deployment circuitry causing the first agent to become active locally or remotely). See, e.g., FIG. 25.

Referring now to FIG. 9, there is shown a high-level logic flow 900 of an operational process. Operation 960—associating a first mobile agent with a first security policy and a second mobile agent with a second security policy (e.g. policy association circuitry identifying each agent's policies with a corresponding agent handle). In some embodiments, the respective security policies may include common attributes or components. Flow 900 further includes operation 970—evaluating a received message at least in response to an indication of the first security policy and to an indication of the second security policy (e.g. evaluation circuitry using the policy indications to employ more safeguards for messages arriving from agents fewer safeguards, and vice versa). Such security policy indications can facilitate message evaluation in some embodiments, signaling at least an aspect of risk or other meaning in the received message. A null, outdated, or otherwise weaker second security policy can signify a higher risk in relying on the second mobile agent, for example. This can bear toward trusting messages from the first mobile agent, distrusting messages that might have been affected by the second mobile agent, dispatching one or more additional agents with better security, responding to messages from the second mobile agents with a special instruction, or the like. (The special instruction may instruct the second mobile agent to terminate, accept a configuration upgrade, provide provenance or message certification, suspend action, or the like.) See, e.g., FIG. 21.

Referring now to FIG. 10, there is shown an exemplary environment in which one or more technologies may be implemented. As shown FIG. 10 shows domain 1000 implementing at least five tiers 1001, 1002, 1003, 1004, and 1005. Tier 1001 includes at least module 1011, module 1014, and module 1019, each of which comprises a highest-level control module of a respective application. Likewise, as shown, tier 1002 includes modules 1021-1029, tier 1003 includes modules 1031-1039, tier 1004 includes modules 1041-1049, and tier 1005 includes modules 1051-1059. Module 1019 links via control relationship or other linkage 1007 with one or more lower-tier modules, as shown, as does each of the other modules in tiers 1001-1004.

Each of tiers 1001-1005 may be implemented either in software or in hardware. In some embodiments, successive tiers may comprise a hardware layer and a software layer configured to operate within the hardware layer. In an embodiment in which tier 1002 comprises a software layer, for example, module 1024 can be an application that is distributed between cores of a hardware layer (e.g. modules 1033, 1034 of tier 1003). Alternatively or additionally, successive tiers may comprise hardware layers in some embodiments. This can occur, for example, in an implementation in which modules 1019, 1029 are circuitry coupled by a signal or other control path as linkage 1007. Alternatively or additionally, successive tiers may each comprise protocol or software layers in some embodiments. This can occur, for example, in an implementation in which modules 1033, 1034 each comprise functions, subroutines, or other logic that can be invoked by module 1024. Also as shown, tier 1002 can include cluster 1095 and domain 1000 can include appnet 1062, explained below in reference to FIG. 32.

Those skilled in the art will recognize that a multi-tier architecture such as that of FIG. 10 can enhance control part or all of a network or application in a variety of cases. Even where a single critical role cannot be divided, for example, domain performance can be enhanced by dividing a role between modules on a nearby tier. Sharing a role between modules 1033 & 1034 can provide for load balancing or redundancy, for example, so that fewer bottlenecks occur at module 1044 and module 1055. Various techniques for sharing a role, suitable for use in systems like domain 1000, are taught in U.S. patent application Ser. No. 11/445,503 ("Partial Role or Task Allocation Responsive to Data-Transformative Attributes"), incorporated by reference to the extent not inconsistent herewith. Other suitable techniques are known to those skilled in the art.

In some implementations, the constructs defined in domain 1000 can facilitate an orderly change in a succession of (hardware or software) modules. Many updates or other actions can primarily be characterized as "appnet-type" actions, such as those pertaining to changes primarily to modules within a single appnet. Another type of "appnet-type" action can arise when a change can affect more than one appnet but in which one update is of primary significance to a given group (tier 1005, e.g.) or user (see FIG. 14, e.g.).

Another class of updates can primarily be characterized as "tier-type" actions, those pertaining to changes primarily to modules within a single tier, or to modules within a given tier of a given appnet (e.g. to modules 1024-1026). Those skilled in the art will recognize that substantially any of the operations described below can optionally be implemented in a tier-type or appnet-type action for ease of management within a domain or platform (see FIG. 13, e.g.).

Figure 11:
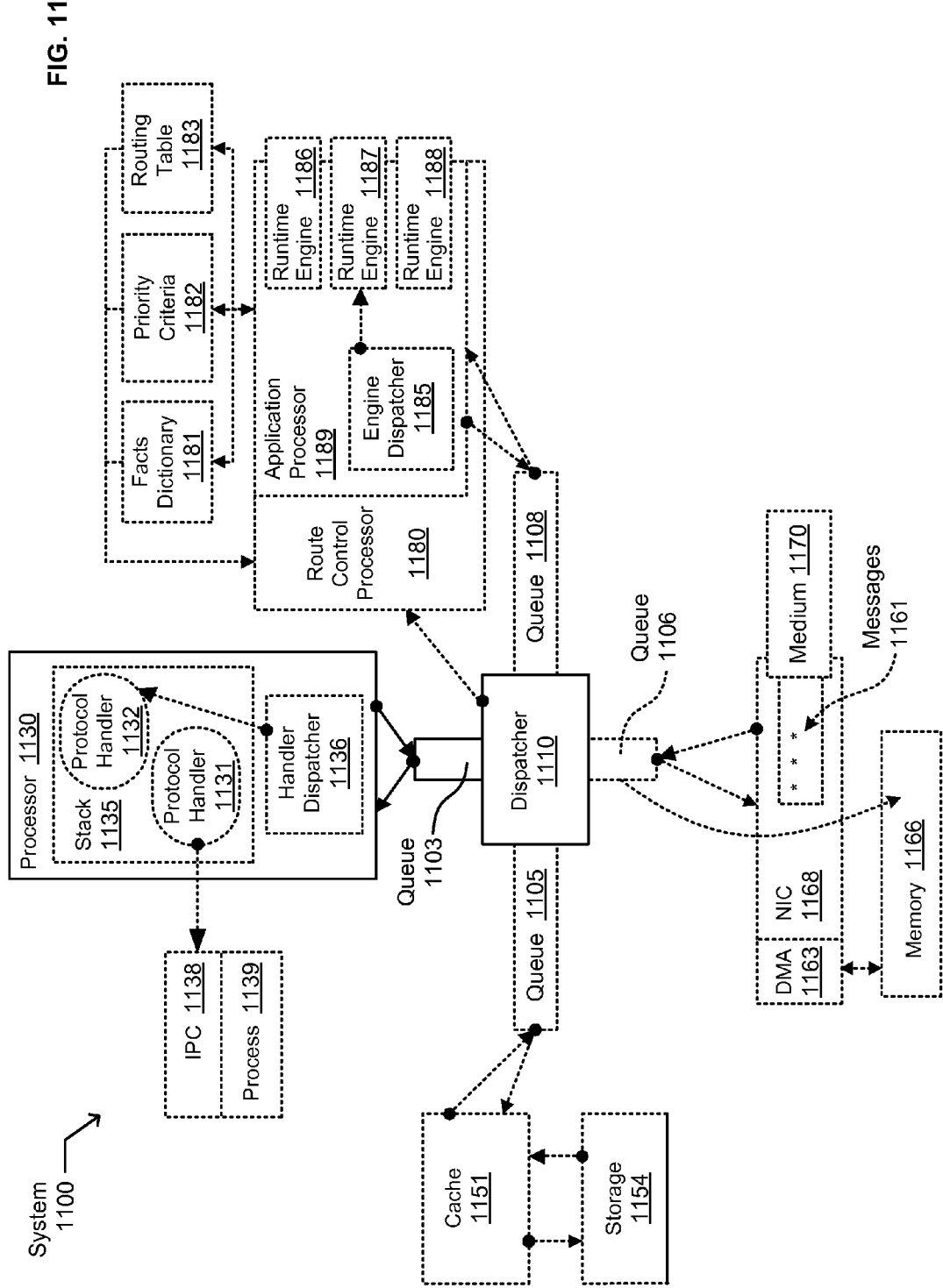

Referring now to FIG. 11, there is shown an exemplary environment in which one or more technologies may be implemented. As shown system 1100 includes processor 1130 configured to interact with dispatcher 1110 via queue 1103. Processor 1130 can include stack 1135, optionally including handler dispatcher 1136 configured for selectively accessing and dispatching one or more protocol handlers 1131, 1132. As shown, handler dispatcher 1136 has dispatched protocol handler 1131 by configuring it to support Intermediate Processing Center (IPC) 1138 of process 1139.

In some embodiments, dispatcher 1110 can likewise interact with cache 1151 via queue 1105. Cache 1151 can likewise be used for retrieving data from or writing data to storage 1154. Alternatively or additionally, dispatcher 1110 can interact with Network Interface Circuit (NIC) 1168, configured for sending or receiving messages 1161 via medium 1170. In some embodiments, NIC 1168 can access memory 1166 through Direct Memory Access (DMA) 1163. Alternatively or additionally, one or more of the queues 1103, 1105, 1106, 1108 can reside in memory 1166.

In some embodiments, dispatcher 1110 can control Route Control Processor (RCP) 1180 directly, or can interact with application processor 1189 via queue 1108 as shown. Application processor 1189 can (optionally) include engine dispatcher 1185 configured to handle information resources selectively via one or more of Runtime Engines (RTE's) 1186, 1187, 1188. As shown application processor 1189 can access one or more of facts dictionary 1181, priority criteria 1182, or routing table 1183 successively or otherwise as necessary so that information can flow from each or all to route control processor 1180.

In some embodiments, dispatcher 1110 is configured for logical routing by which application processor 1189 sends a message using a logical destination identifier. Facts dictionary 1181 can identify a suitable node identifier consistent with the logical destination, if any such identifier is available. Otherwise application processor 1189 can request that dispatcher 1110 request a knowledge base update via queue 1106, optionally with an update request that includes the logical destination. Application processor 1189 can use the response to generate either a suitable node identifier or an error indication. In a scenario in which the suitable node identifier is found, a physical route to the table is found (from facts dictionary 1181, e.g.) and written into routing table 1183. Those skilled in the art will recognize a variety of protocols and contexts with which system 1100 can operate, an example of which is shown in FIG. 12.

Figure 12:
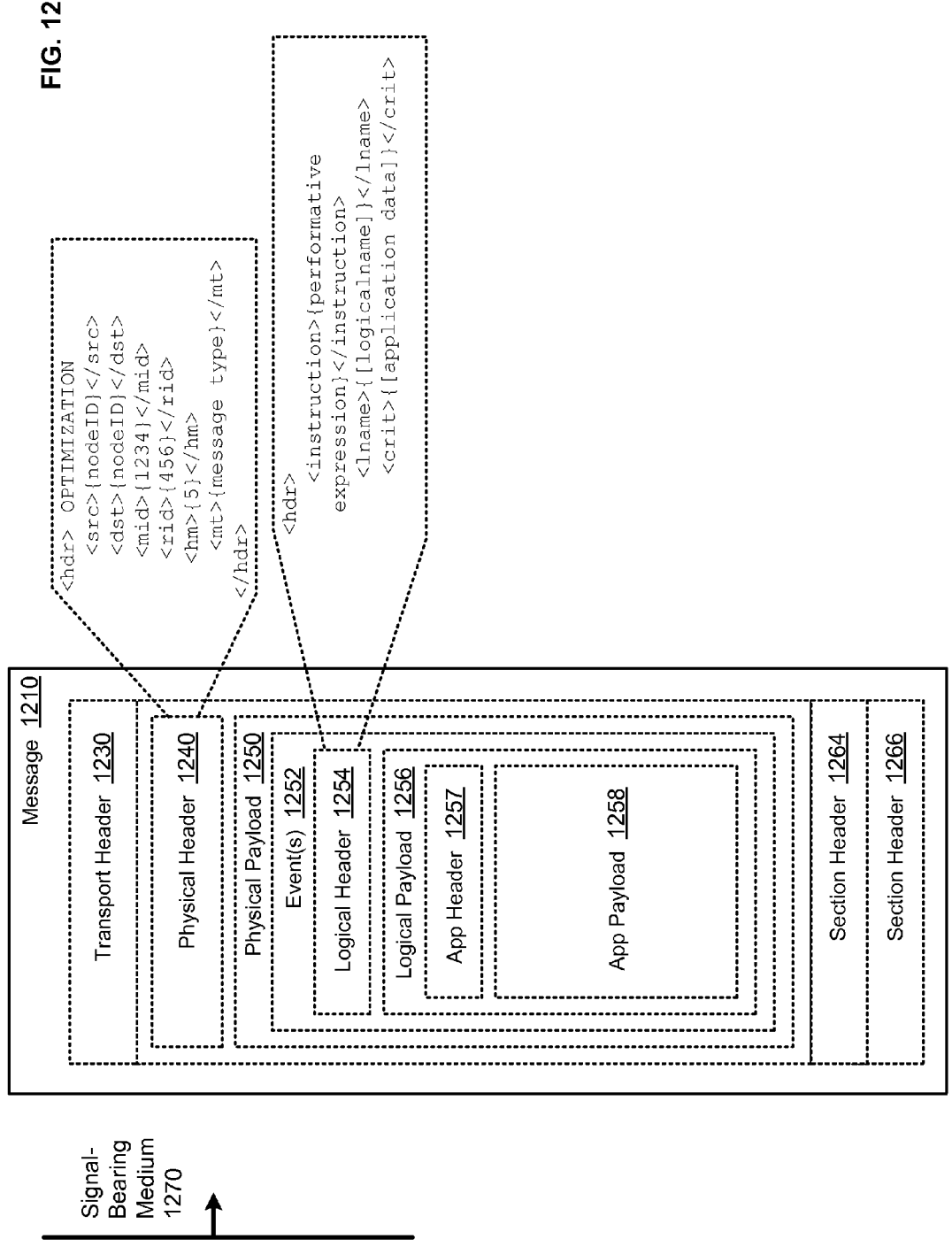

Referring now to FIG. 12, there is shown another exemplary environment in which one or more technologies may be implemented. As shown signal-bearing medium 1270 (such as an optical fiber, wire, or free space medium, e.g.) including at least one message 1210. Message 1210 can include one or more of transport header 1230, physical header 1240, a physical payload 1250 of one or more event(s) 1252, or one or more additional section headers 1264, 1266. Section headers 1264, 1266 can include multimedia message extension (MIME) headers or the like, for example. Alternatively or additionally, event(s) 1252 can each include a respective logical header 1254 or logical payload 1256, with the latter optionally including one or more of app header 1257 or app payload 1258. App payload 1258 can include parameters and other controls, agent code or service code modules or updates, data for use by an application or other service, service metadata or the like. In some embodiments, app payload 1258 can comprise part or all of a computer program product as described herein, for example, such as modules configured to perform one or more variants as described below in reference to FIGS. 29-49.

Figure 13:
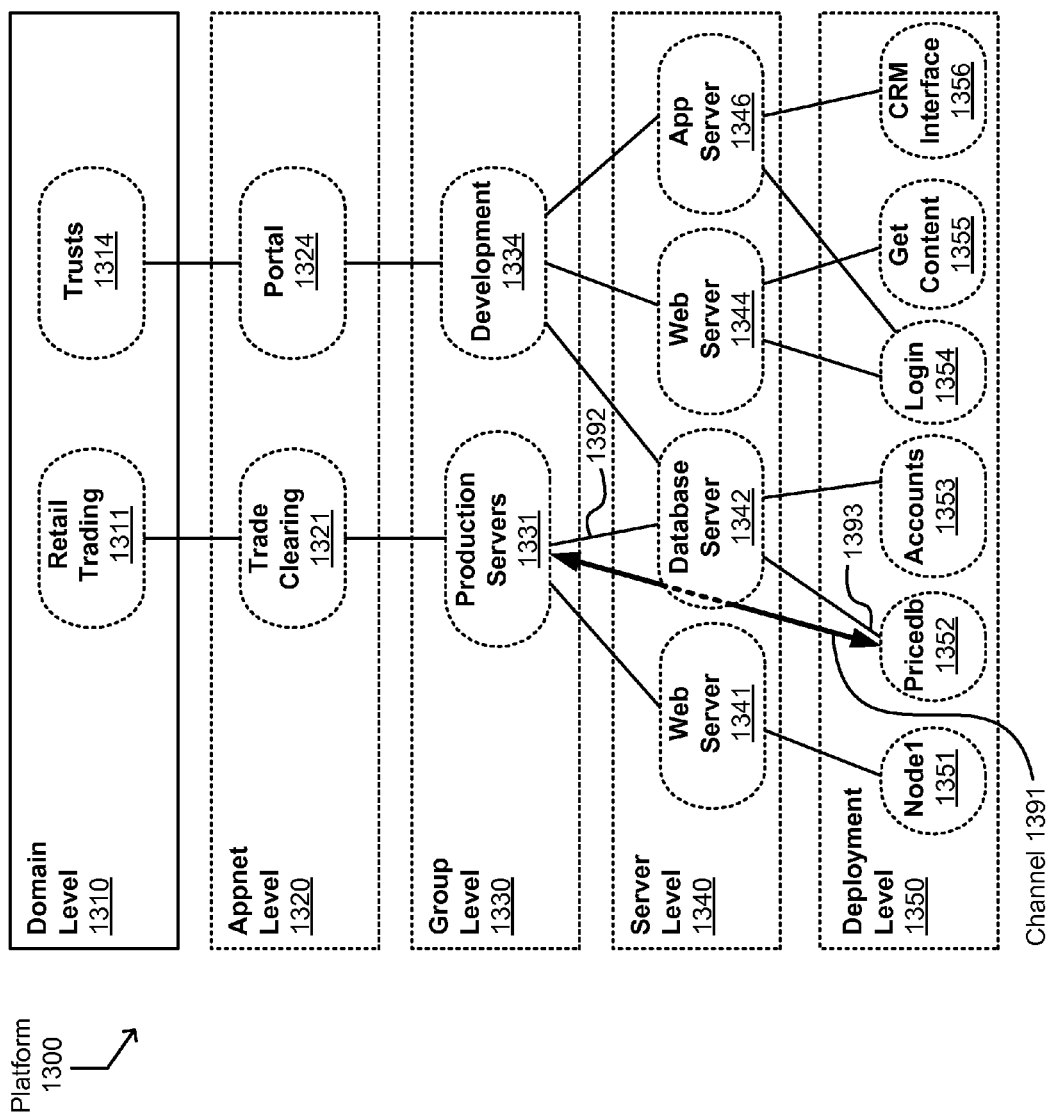

Referring now to FIG. 13, there is shown an exemplary environment in which one or more technologies may be implemented. As shown platform 1300 includes domain level 1310 and several optional implementation levels that can (optionally) include one or more of appnet level 1320, group level 1330, server level 1340, deployment level 1350, or the like. In one implementation, retail trading domain 1311 can include a trade clearing appnet 1321 associating "Production Servers" group 1331 with one or more applications (at deployment level 1350, e.g.). "Production Servers" group 1331 may include one or more of web server 1341 (to support "Node1" function 1351, e.g.) or database server 1342 (to support "Pricedb" function 1352 or "Accounts" function 1353, e.g.).

In a parallel implementation, trusts domain 1314 can (optionally) include a portal appnet 1324 associating development group 1334, which may (optionally) include one or more of database server 1342, web server 1344 (to support "Get Content" function 1355, e.g.), or app server 1346 (to support Critical Resource Management Interface function 1356, e.g.). As shown, each of web server 1344 or app server 1346 can likewise include login function 1354. Platform 1300 thus illustrates how appnet implementations as described herein can function within or among networks to enable a variety of coexisting functions or specialists to manage diverse and complex tasks effectively.

In some implementations, higher-level modules can be organized schematically or physically as distinct objects with linkages to related lower-level modules. Linkage 1392 can link "Production Servers" group 1331 to database server 1342 logically or physically, in various embodiments, as can linkage 1393 between database server 1342 and the "Pricedb" module 1352. In some embodiments, two or more such linkages can be grouped, for example, as a composite virtual linkage through an intermediate module (channel 1391 through database server 1342, e.g.).

Figure 14:
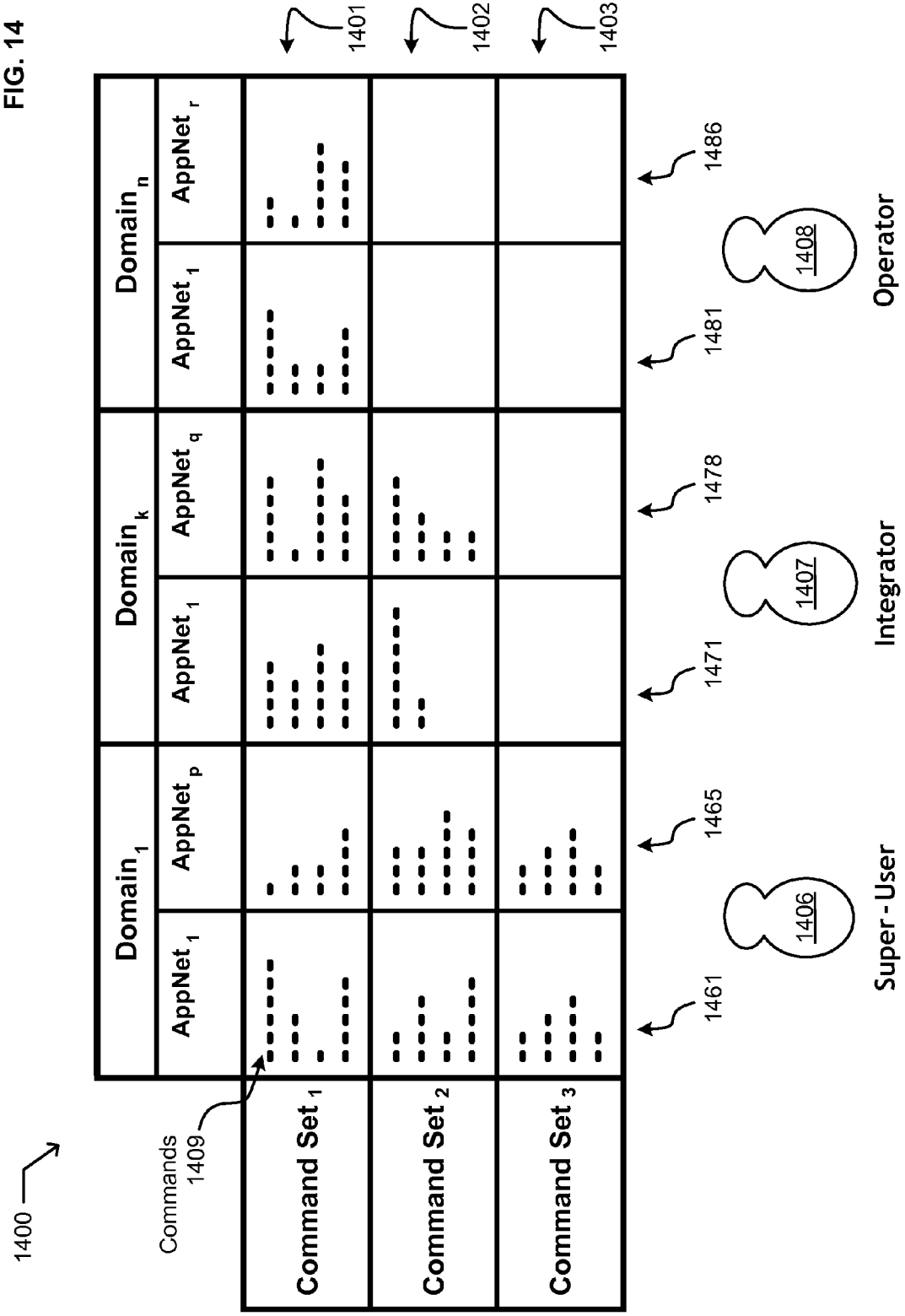

Referring now to FIG. 14, there is shown an exemplary environment in which one or more technologies may be implemented. As shown system 1400 includes logic by which one or more domains of super-user 1406 each include appnets represented by respective one of the p columns 1461-1465. Likewise one or more domains of integrator 1407 each include appnets represented by a respective one of the q columns 1471-1478. Likewise one or more domains of operator 1408 each include appnets represented by a respective one of the r columns 1481-1486. As shown in row 1401, Command Set$_1$ includes many commands 1409, various subsets of which are permissible in each of the respective appnets shown as columns 1461-1486. As shown in row 1402, Command Set$_2$ likewise includes many commands 1409 of which various subsets are permissible in each of the respective appnets shown as columns 1461-1478. As shown in row 1403, moreover, Command Set$_3$ includes many commands 1409 of which various subsets are permissible in each of the respective appnets shown as columns 1461-1465. None of the commands 1409 of Command Set$_2$ are permissible for operator 1408, however, as shown by the fact that row 1402 is blank in columns 1481-1486. Row 1403 is likewise blank in columns 1471-1486, signifying that none of the commands 1409 of Command Set$_3$ are permissible for integrator 1407 or operator 1408.

In some variants, one or more commands 1409 of Command Set$_1$ in a given appnet can overlap with some or all of the commands 1409 in other appnets. Alternatively or additionally, more or less than three sets of commands can be defined to provide coarser or finer resolution in entity classes. Alternatively or additionally, one or more of the entities (e.g. super-user 1406, integrator 1407, or operator 1408 can be a mobile agent or a user assisted by a software agent. Alternatively or additionally, a quantity of a domain's defined appnets (e.g. p, q, or r) can change dynamically, such as by deactivating an infrequently used appnet or adding a newly-implemented appnet responsive to a user request. Appnets can likewise be modified or substituted, alternatively or additionally, as described below.

In some variants, super-user 1406 or the like can perform several of the commands 1409 of Command Set$_3$ in row 1403 as shown, in an embodiment in which appnet 160 implements AppNet$_1$ of column 1461. Alternatively or additionally, ASR 145 can manage appnet 150 with application manager 110 as super-user 1406 or integrator 1407, for example. Alternatively or additionally, ASR 145 can manage appnet 160 with client 120 as integrator 1407 or operator 1408 in a variety of scenarios and configurations as described in further detail herein in FIGS. 38-42. Optionally, domain 140 can be depicted to include label(s) 166 (such as "Enterprise" or other identity-indicative or status-indicative information) for appnets or the like.

Figure 15:
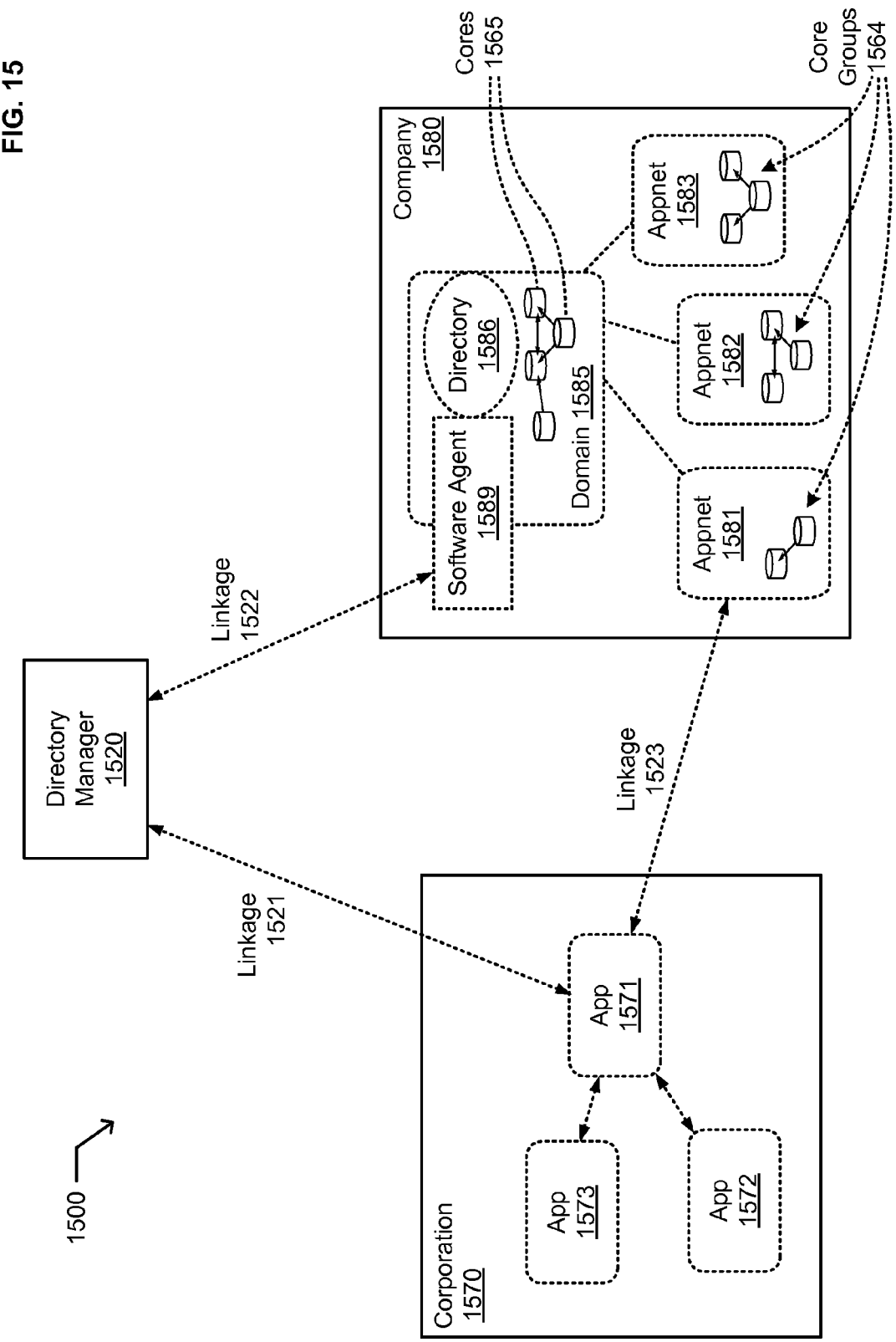

Referring now to FIG. 15, there is shown an exemplary environment in which one or more technologies may be implemented. As shown FIG. 15 depicts network 1500 comprising directory manager 1520 (UDDI, metadirectory, search engine, or other existing directory mechanism, e.g.) linked with one or more of corporation 1570 and company 1580. In some embodiments corporation 1570 comprises a core or network with several applications 1571, 1572, 1573 of which one can communicate with directory manager 1520 via linkage 1521. App 1571 can use linkage 1521 for adding an entry for a new user, for example, or for other registration-type functions. Company 1580 comprises a network in which domain 1585 can (optionally) include directory 1586 and can interface through linkage 1522 using software agent 1589 (decision guidance software or other existing agent, e.g.). Domain 1585 can likewise interact with several appnets 1581, 1582, 1583, some of which can optionally be configured to interact with entities outside company 1580 such as through linkage 1523. As shown, appnets 1581, 1582, 1583 each include one or more core groups 1564 of processor cores, communication nodes, or the like. Domain 1585 likewise includes cores 1565 accessible to software agent 1589. (Those skilled in the art will recognize that core groups 1564 and cores 1565 can overlap one another and can, in some configurations, include multi-network linkages, shared resources, mobile or other wireless cores, or the like.)

In some configurations, a scenario can occur in which app 1571 registers one or more of its attributes with directory manager 1520, for example in order to accommodate a request from appnet 1581 or otherwise to establish a more trusted status for itself. Directory 1586 can contain topological information about each of appnets 1581, 1582, 1583, including how an application of each relates to their respective core groups 1564 as shown. In this case directory 1586 can perform operation 210 by virtue of appnet 1581 having earlier signaled how its application relates to its core groups 1564.

Software Agent 1589 can subsequently receive data relating to application 1571 (e.g. a reputation indicator of corporation 1570 or the like), optionally as a response to a query from software agent 1589. Software agent 1589 can then perform operation 220 by signaling (via cores 1565) a configuration change to a security service of appnet 1581, causing appnet 1581 to enhance a trust in or otherwise interact differently with app 1571.

Figure 16:
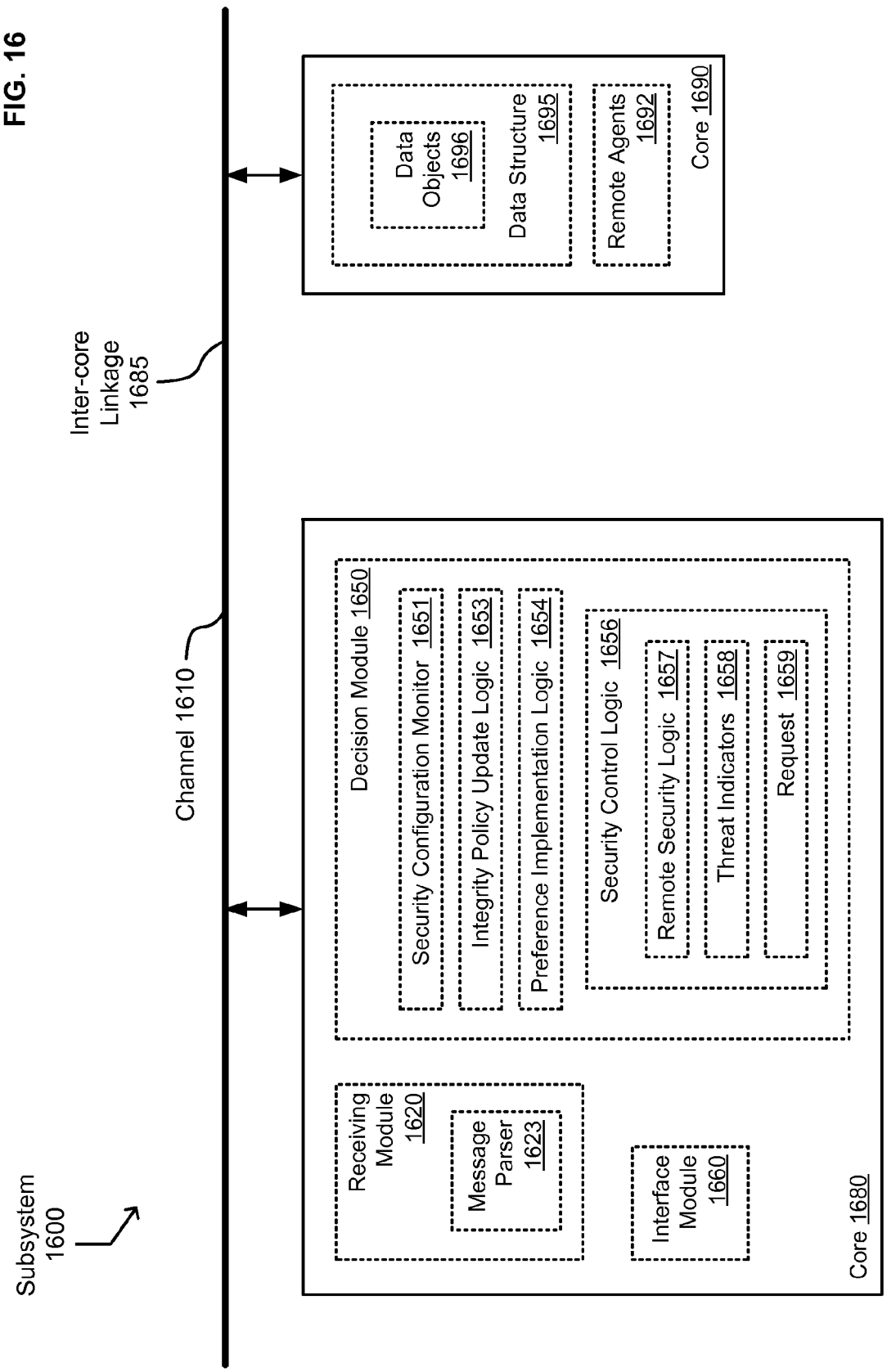

Referring now to FIG. 16, there is shown an exemplary environment in which one or more technologies may be implemented. As shown subsystem 1600 includes core 1680 and core 1690 operatively linked, for example, by channel 1610 including inter-core linkage 1685. Core 1690 can (optionally) include one or more of remote agents 1692 or data structure 1695 (including data objects 1696, e.g.). Core 1680 can include one or more of receiving module 1620 (optionally including message parser 1623, e.g.), decision module 1650, or interface module 1660. Decision module 1650 can (optionally) include one or more of security configuration monitor 1651, integrity policy update logic 1653, preference implementation logic 1654 or security control logic 1656. Security control logic 1656 can include one or more of remote security logic 1657, threat indicators 1658, or request 1659. Subsystem 1600 can be configured to perform flow 500. This can occur, for example, in embodiments in which interface module 1650 is configured to perform operation 580, in which receiving module 1620 is configured to receive the input, and in which decision module 1650 is configured to perform operation 590.

Figure 17:
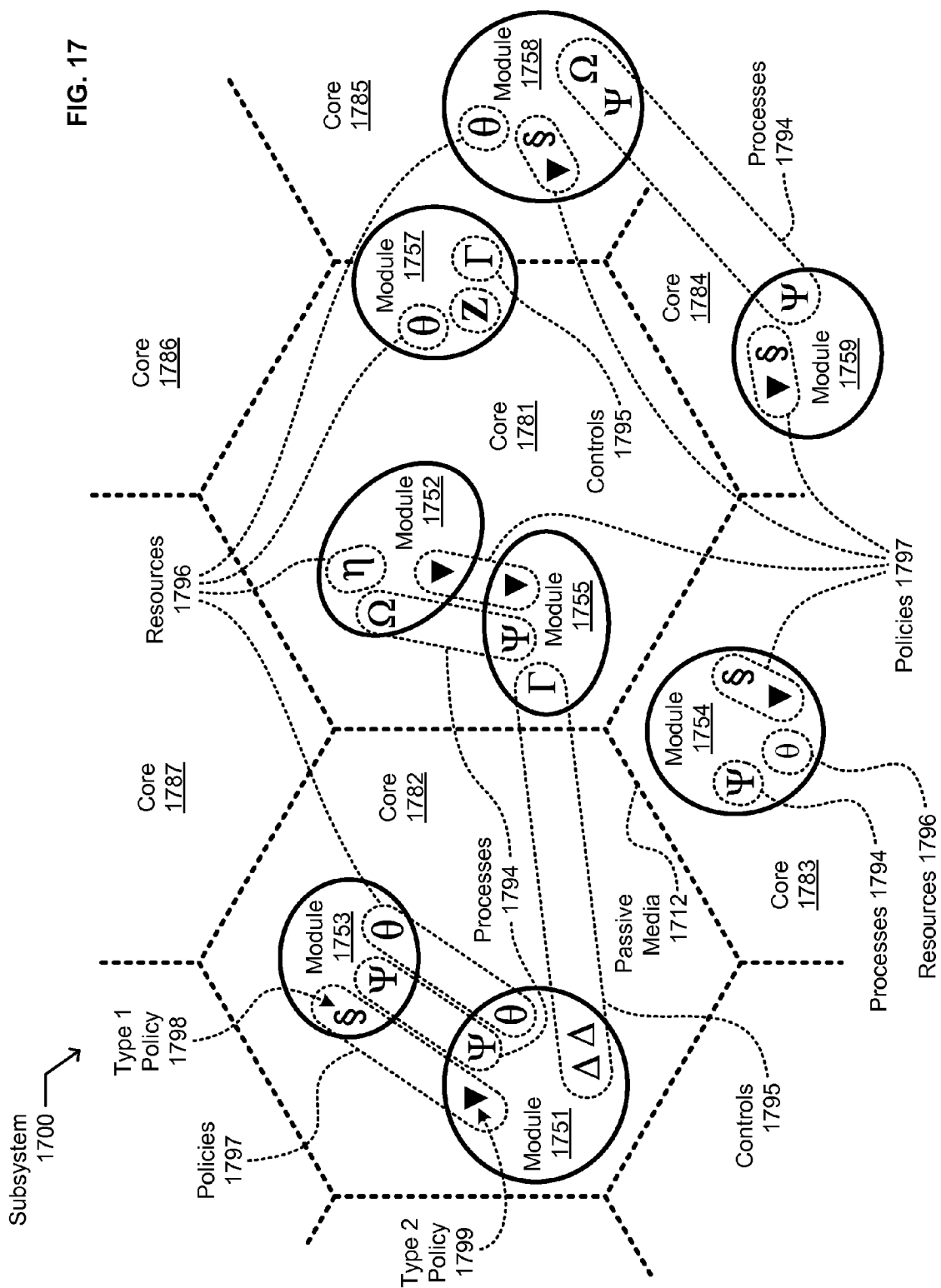

Referring now to FIG. 17, there is shown an exemplary environment in which one or more technologies may be implemented. As shown subsystem 1700 can (optionally) include one or more of core 1781, core 1782, core 1783, core 1784, core 1785, core 1786, or core 1787. Adjacent pairs of these cores (e.g. core 1781 with each of cores 1782-1787) are linked by passive media 1712 as shown. Subsystem 1700 can also include one or more of module 1751, module 1752, module 1753, module 1754, module 1755, module 1757, module 1758, or module 1759. Each of modules 1751-1759 can include one or more processes 1794, controls 1795, resources 1796, or policies 1797, some of which are shown. For example, module 1753 can include type one policy 1798, and module 1751 can include type two policy 1799. Module 1754 as shown includes at least one of each of these policies 1798, 1799.

Figure 18:
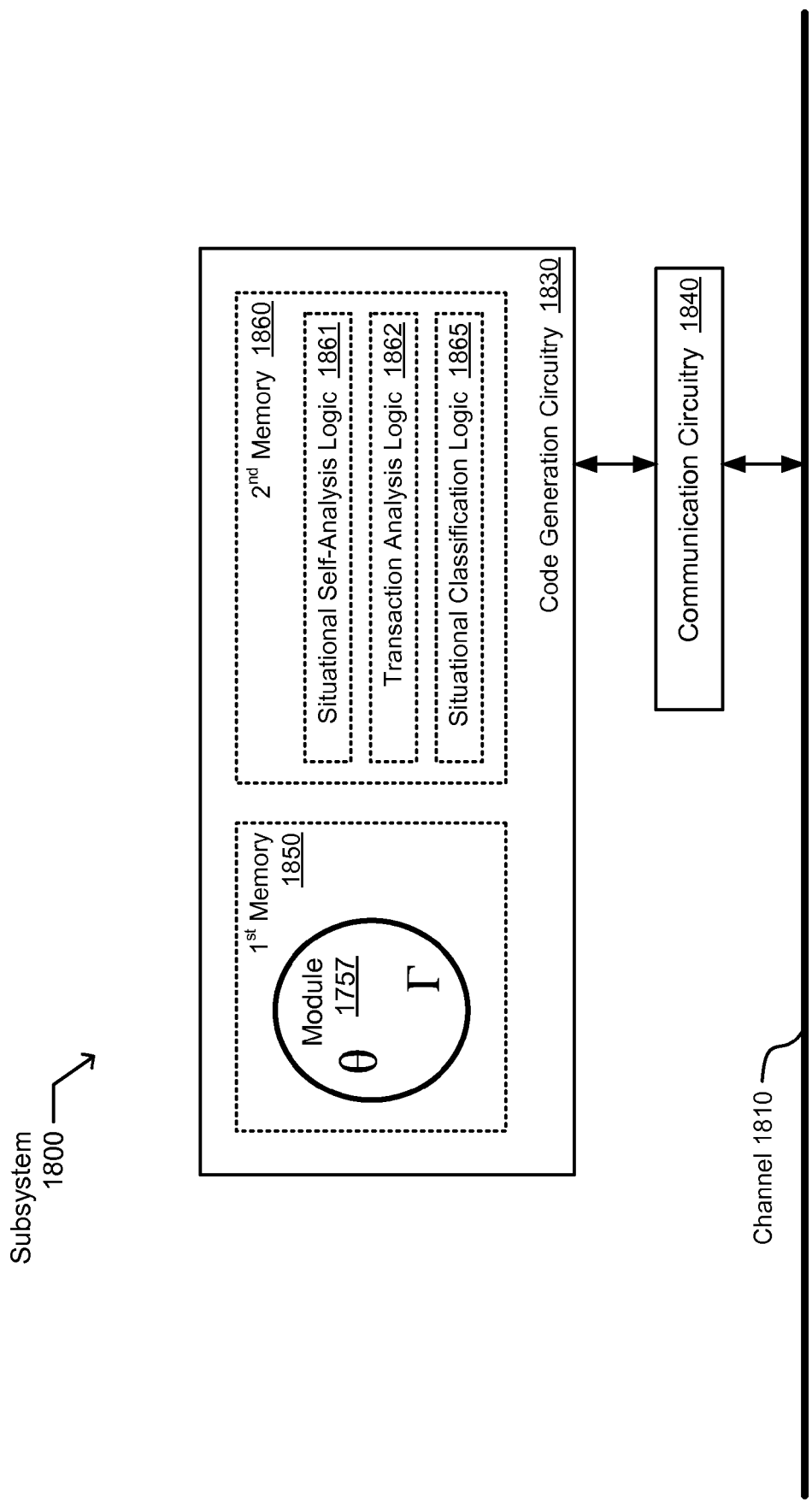

Referring now to FIG. 18, there is shown an exemplary environment in which one or more technologies may be implemented. As shown subsystem 1800 includes code generation circuitry 1830 operatively coupled with channel 1810 through communication circuitry 1840 with channel 1810. Code generation circuitry 1830 can include first memory 1850 (optionally including a variant of module 1757 of FIG. 17) or second memory 1860. Second memory 1860 can include one or more of situational self-analysis logic 1861, transaction analysis logic 1862 or situational classification logic 1865. Subsystem 1800 can be configured to perform flow 800. This can occur, for example, in embodiments in which module 1757 is configured as the first agent, in which code generation circuitry 1830 is configured to perform operation 880, and in which communication circuitry 1840 is configured to perform operation 890.

Figure 19:
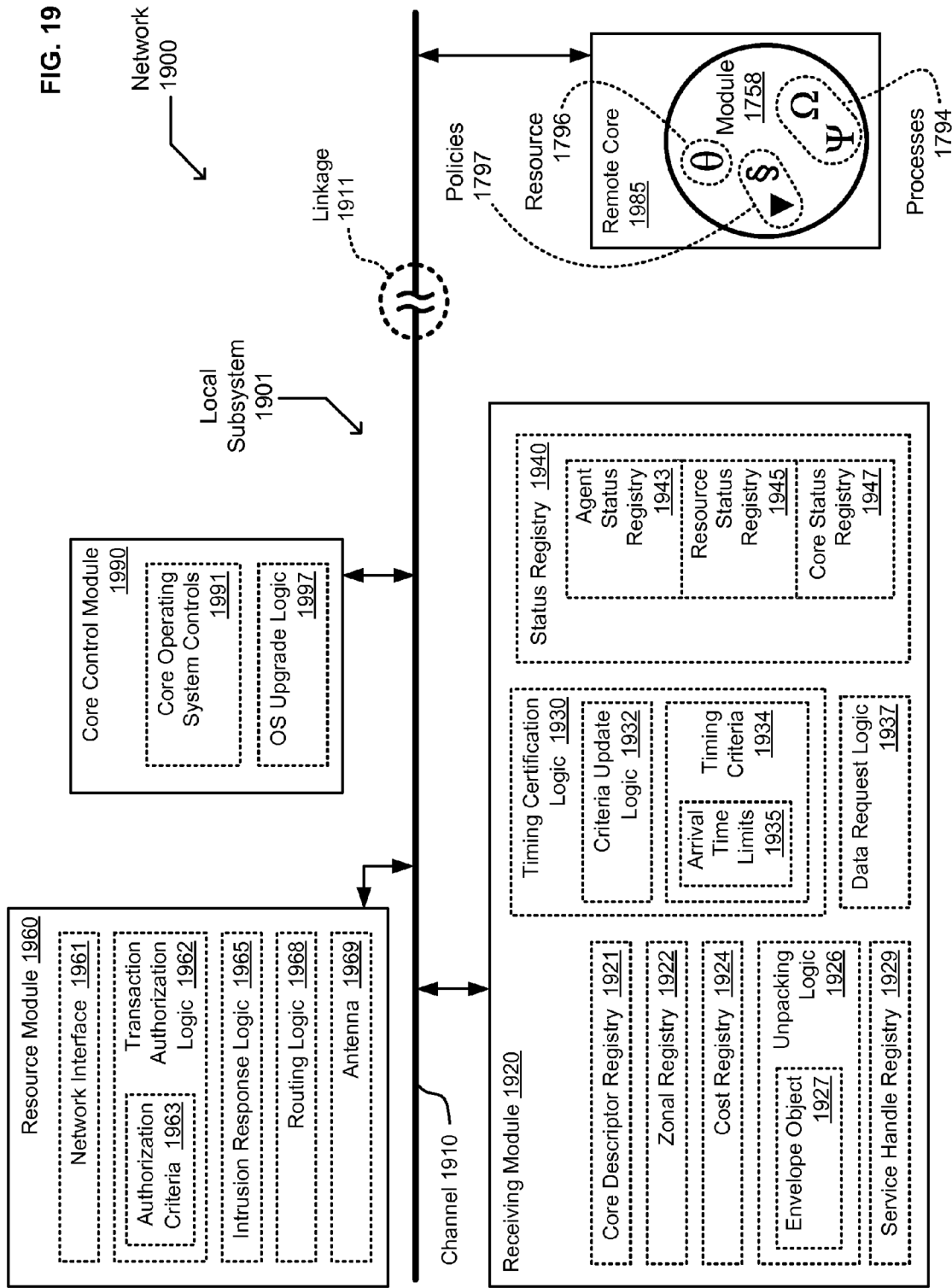

Referring now to FIG. 19, there is shown an exemplary environment in which one or more technologies may be implemented. As shown network 1900 includes local subsystem 1901 operatively coupled with remote core 1985 through at least linkage 1911 of channel 1910. Linkage 1911 can (optionally) include a wireless communication medium or incorporate active signal relay circuitry in some embodiments. Remote core 1985 includes module 1758 with processes 1794, resource 1796, and policies 1797. In some embodiments core 1785 implements remote core 1985. Local subsystem 1901 can include at least receiving module 1920, resource module 1960 or core control module 1990. Receiving module 1920 can include one or more of core description registry 1921, zonal registry 1922, cost registry 1924, unpacking logic 1926 (optionally including envelope object 1927), service handle registry 1929, timing certification logic 1930, data request logic 1937 or status registry 1940. Timing certification logic 1930 can include criteria update logic 1932 or timing criteria 1934 (optionally with one or more arrival time limits 1935). Status registry 1940 can include one or more of agent status registry 1943, resource status registry 1945 or core status registry 1947. Resource module 1960 can include one or more of network interface 1961, transaction authorization logic 1962 (including authorization criteria 1963, e.g.), intrusion response logic 1965, routing logic 1968, or antenna 1969. Core control module 1990 can include one or more of core operating system controls 1991 or operating system upgrade logic 1997.

Figure 20:
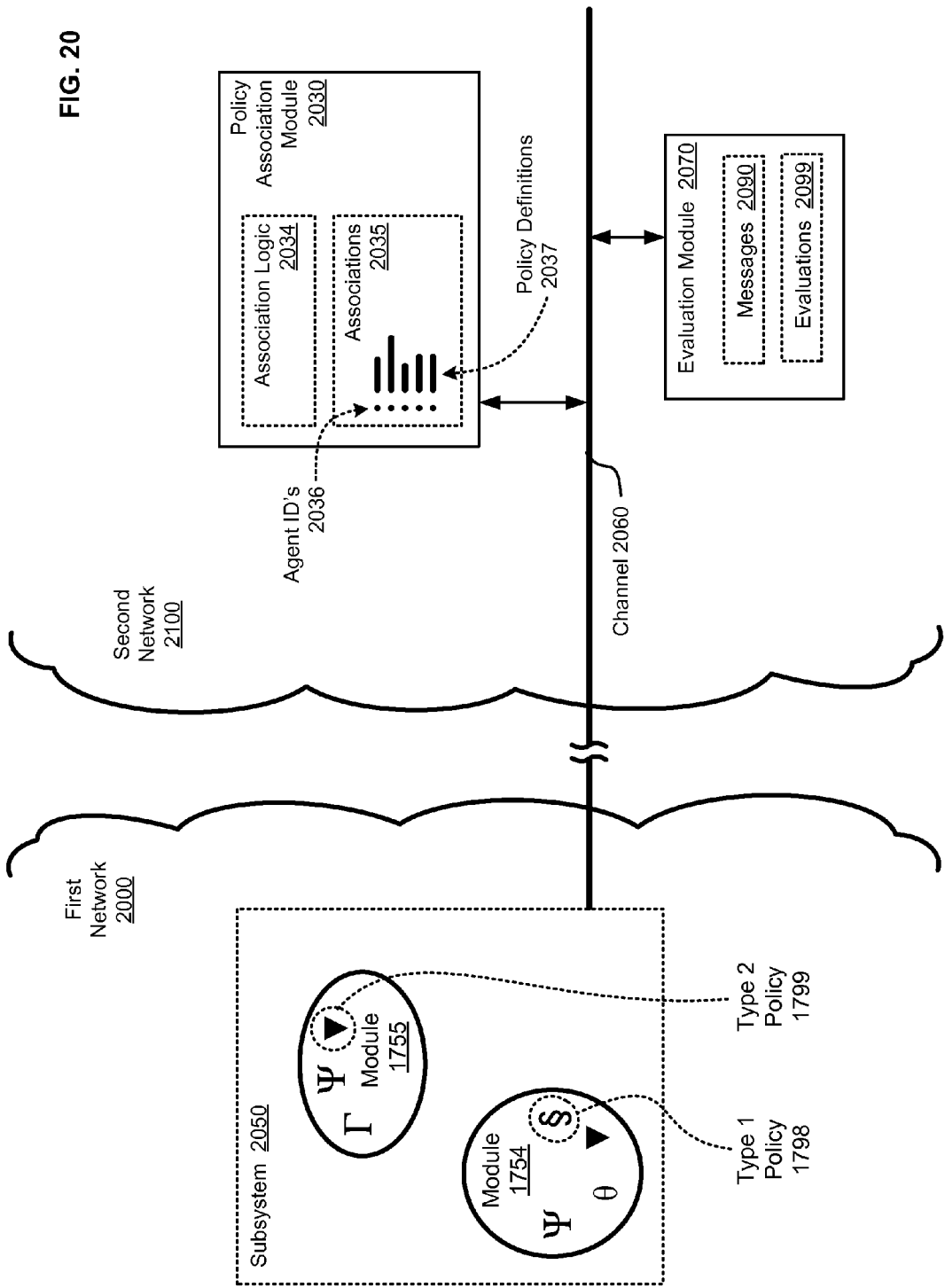

Referring now to FIG. 20, there is shown an exemplary environment in which one or more technologies may be implemented. As shown channel 2060 links subsystem 2050 of first network 2000 with second network 2100. Subsystem 2050 as shown can include module 1754 (with type one policy 1798) and module 1755 (with type two policy 1799), optionally in a configuration like that of FIG. 17. Second network 2100 can include policy association module 2030 and evaluation module 2070 as shown. Policy association module 2030 can include one or more of association logic 2034 and associations 2035 (association agent identifiers 2036 with policy definitions 2037 in a one-to-one association). Associations 2035 can likewise include many-to-one or one-to-many associations. Evaluation module 2070 can include one or more of messages 2090 or evaluations 2099. Second network 2100 can be configured to perform flow 900. This can occur, for example, in embodiments in which policy association module 2030 performs operation 960 and in which evaluation module 2070 performs operation 970.

Figure 21:
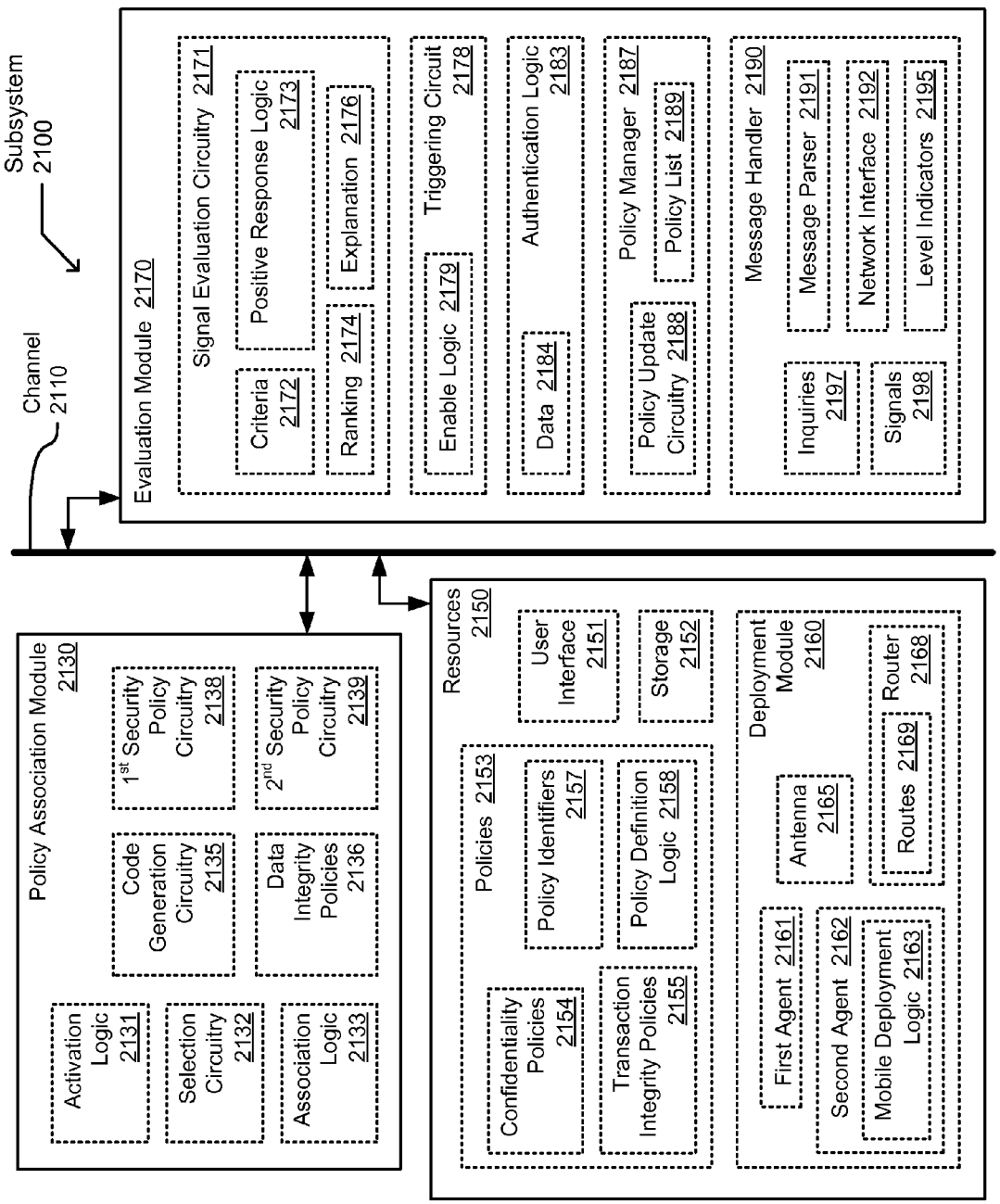

Referring now to FIG. 21, there is shown an exemplary environment in which one or more technologies may be implemented. As shown subsystem 2100 includes policy association module 2130, resources 2150, and evaluation module 2170 linked, such as by channel 2110. Policy association module 2130 can (optionally) include one or more of activation logic 2131, selection circuitry 2132, association logic 2133, code generation circuitry 2135, data integrity policies 2136, first security policy circuitry 2138, or second security policy circuitry 2139. Resources 2150 can include one or more of user interface 2151, storage 2152, policies 2153, or deployment module 2160. Policies 2153 can include one or more confidentiality policies 2154, transaction integrity policies 2155, policy identifiers 2157, or policy definition logic 2158. Deployment module 2160 can include one or more of first agent 2161, second agent 2162, mobile deployment logic 2163, antenna 2165, router 2168, or one or more routes 2169. Evaluation module 2170 can include one or more of signal evaluation circuitry 2171, triggering circuit 2178, authentication logic 2183, policy manger 2187, or message handler 2190. Signal evaluation circuitry 2171 can include one or more of criteria 2172, positive response logic 2173, ranking 2174, or explanation 2176. Triggering circuit 2178 can include enable logic 2179. Authentication logic 2183 can include data 2184. Policy manager 2187 can include one or more of policy update circuitry 2188 or policy list 2189. Message handler 2190 can include one or more of message parser 2191, network interface 2192, level indicators 2195, one or more inquiries 2197 or signals 2198. Subsystem 2100 can be configured to perform flow 900. This can occur, for example, in embodiments in which policy association module 2130 is configured to perform operation 960 and in which evaluation module 2170 is configured to perform operation 970.

Figure 22:
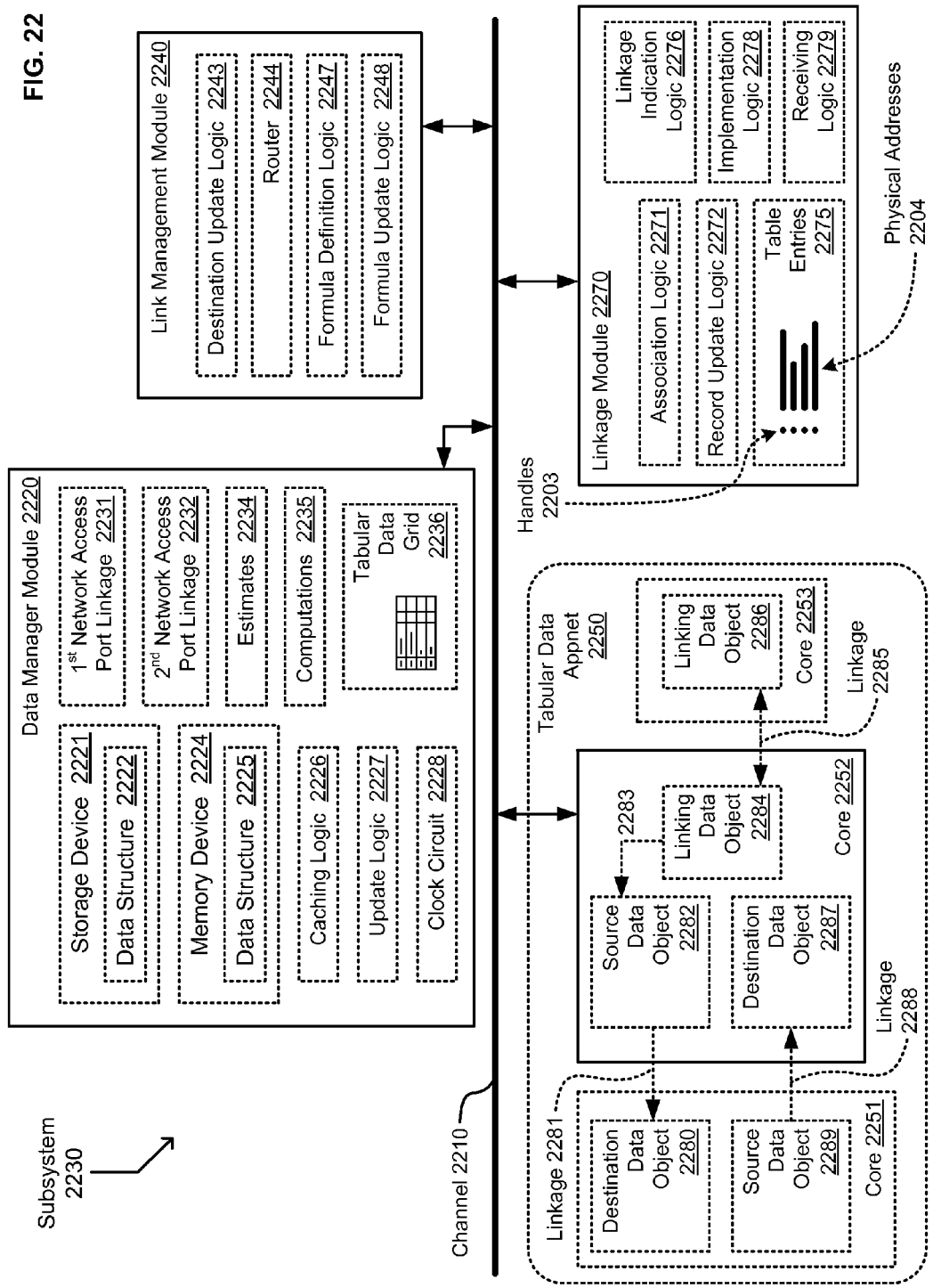

Referring now to FIG. 22, there is shown an exemplary environment in which one or more technologies may be implemented. As shown subsystem 2230 includes one or more of data manager module 2220, link management module 2240, core 2252, or linkage module 2270 linked together, such as by channel 2210 as shown. Data manager module 2220 can (optionally) include one or more of data storage device 2221 (with data structure 2222), memory device 2224 (with data structure 2225), caching logic 2226, update logic 2227, clock circuit 2228, first network access port linkage 2231, second network access port linkage 2232, estimates 2234, computations 2235, or tabular data grid 2236. Link management module 2240 can (optionally) include destination update logic 2243, router 2244, formula definition logic 2247, or formula update logic 2248.

Subsystem 2230 can (optionally) include tabular data appnet 2250 including core 2252. Tabular data appnet 2250 can further include core 2251 or core 2253 as shown. Core 2251 can (optionally) include SDO 2289 for updating DDO 2287 of core 2252 via linkage 2288. Alternatively or additionally, core 2251 can include DDO 2280 configured for receiving data from SDO 2282 via linkage 2281. SDO 2282 of core 2252 can likewise receive data via linkage 2283, such as by a formula. Core 2252 and core 2253 can likewise contain LDO's 2284, 2286 each for receiving data from the other via linkage 2285. In some configurations destination update logic 2243 can be configured for maintaining one or more of linkages 2281, 2283, 2285, 2288 as shown. Linkage module 2270 can include one or more of association logic 2271, record update logic 2272, table entries 2275 linking handles 2203 with physical addresses 2204, linkage indication module 2276, implementation logic 2278 or receiving logic 2279. Table entries 2275 can be configured to link handles 2203 with physical addresses 2204 in one-to-one, many-to-one or one-to-many relationships. Subsystem 2230 can be configured to perform flow 600. This can occur, for example, in embodiments in which linkage module 2270 performs operation 610 and in which linkage management module 2240 performs operation 620. Operation 620—deciding whether to update the tabular data object in response to the inter-core linkage obtained in association with the tabular data object—can be performed, for example, by linkage management module 2240 accessing data objects using handles 2203 of linkages with physical addresses 2204. The linkages can include linkage 2281, linkage 2285, or linkage 2288. See, e.g., FIGS. 45 & 46 and their description below.

Figure 23:
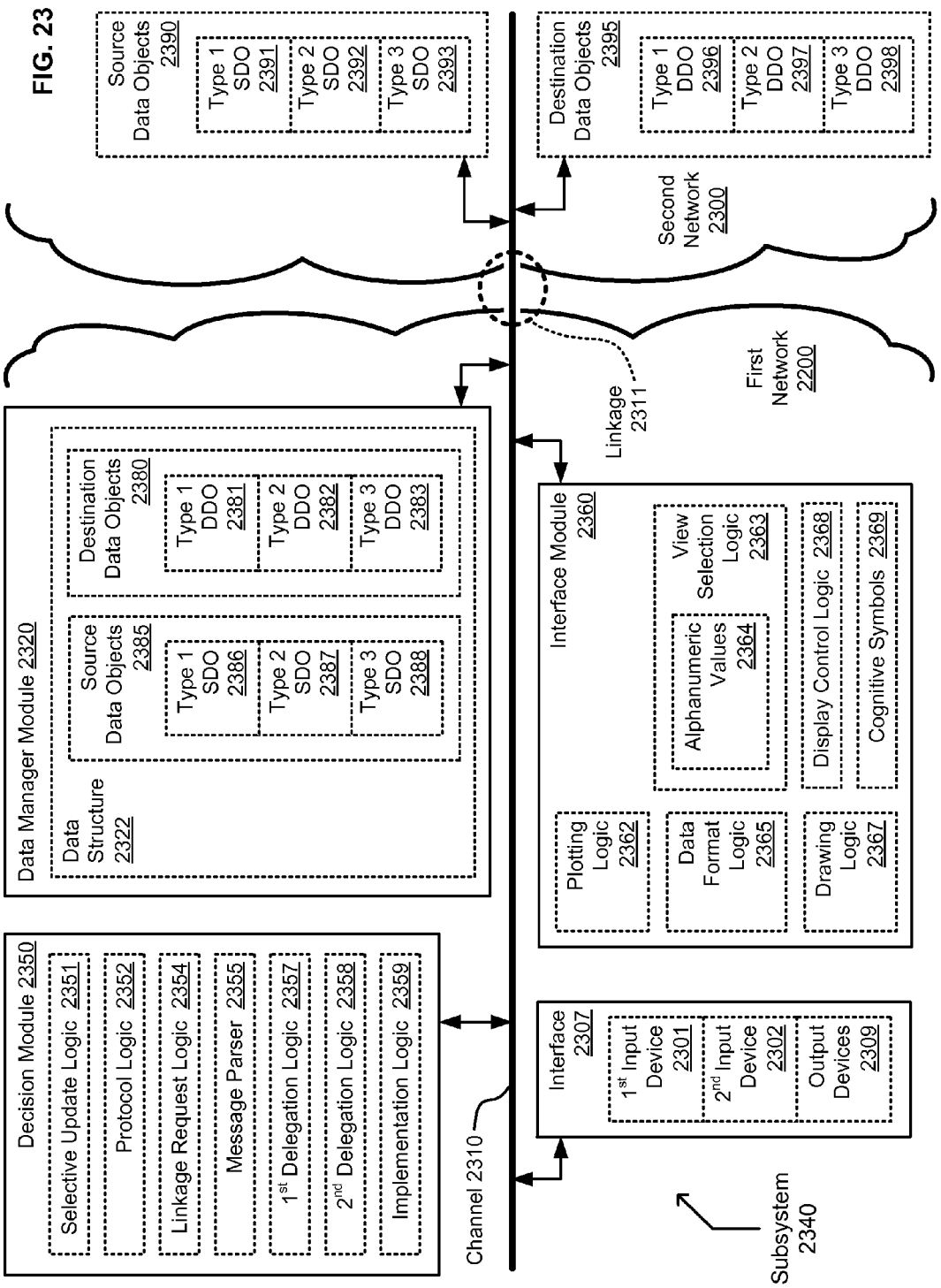

Referring now to FIG. 23, there is shown an exemplary environment in which one or more technologies may be implemented. As shown linkage 2311 (of channel 2310, e.g.) links first network 2200 with second network 2300. Second network 2300 includes SDO's 2390 (e.g. type 1 SDO 2391, type 2 SDO 2392, or type 3 SDO 2393) or DDO's 2395 (e.g. type 1 DDO 2396, type 2 DDO 2397, or type 3 DDO 2398), optionally in one or more data structures of one or more modules (not shown).

Subsystem 2340 of first network 2200 can (optionally) include one or more of interface 2307, data manager module 2320, decision module 2350, or interface module 2360. Interface 2307 can include one or more of first input device 2301, second input device 2302 or one or more output devices 2309. Data manger module 2320 can include data structure 2322 containing SDO's 2385 (e.g. type 1 SDO 2386, type 2 SDO 2387, or type 3 SDO 2388) or DDO's 2380 (e.g. type 1 DDO 2381, type 2 DDO 2382, or type 3 DDO 2383). Decision module 2350 can include one or more of selective update logic 2351, protocol logic 2352, linkage request logic 2354, message parser 2355, first delegation logic 2357, second delegation logic 2358 or implementation logic 2359. Interface module 2360 can include one or more of plotting logic 2362, view selection logic 2363 (e.g. with alphanumeric values 2364), data format logic 2365, drawing logic 2367, display control logic 2368, or cognitive symbols 2369. Subsystem 2340 can be configured to perform flow 500. This can occur, for example, in embodiments in which interface module 2360 performs operation 580 and in which decision module 2350 performs operation 590. See, e.g., FIGS. 43 & 44 and their description below.

Figure 24:
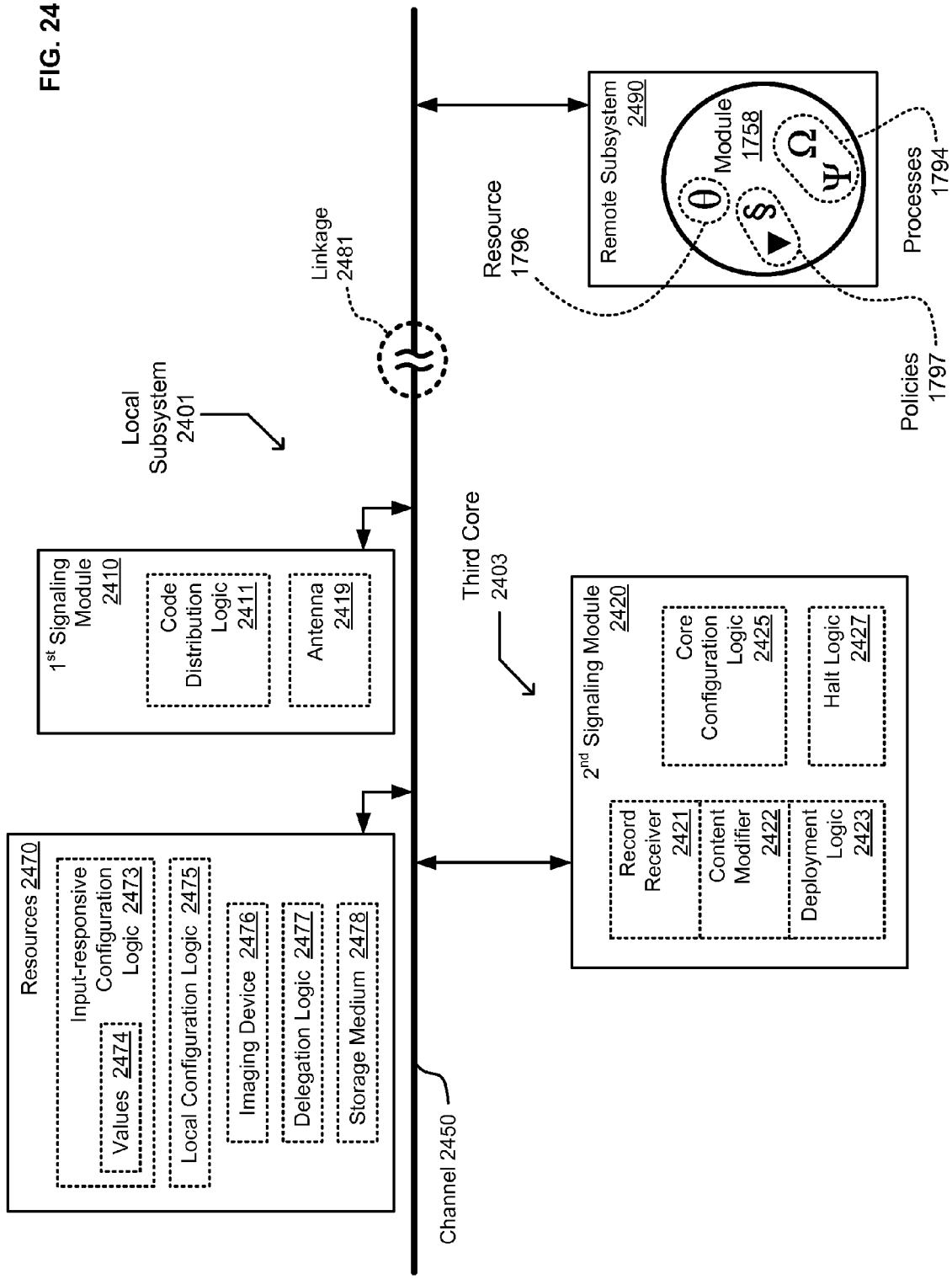

Referring now to FIG. 24, there is shown an exemplary environment in which one or more technologies may be implemented. As shown local subsystem 2401 is operatively coupled with remote subsystem 2490 via channel 2450 including linkage 2481. Linkage 2481 can be wireless or can incorporate active signal relay circuitry, for example. Remote subsystem 2490 can include an appnet, multicore processor, local area network or other cluster of processors or other cores, such as "first" and "second" cores in some embodiments.

Local subsystem 2401 includes at least first signaling module 2410, second signaling module 2420 (of third core 2403, e.g.), and resources 2470. Third core 2403 can further (optionally) include one or more of first signaling module 2410 or resources 2470. First signaling module 2410 can include one or more of code distribution logic 2411 or antenna 2419. Resources 2470 can include input-responsive configuration logic 2473 (with values 2474, e.g.), local configuration logic 2475, imaging device 2476, delegation logic 2477, or storage medium 2478. In some embodiments, storage medium 2478 can contain part or all of a computer program product as described herein, for example, such as modules configured to perform one or more variants as described below in reference to FIGS. 29-49.

Second signaling module 2420 can include one or more of record receiver 2421, content modifier 2422, deployment logic 2423, core configuration logic 2425, or halt logic 2427. As shown, remote subsystem 2490 includes module 1758, (at least) processes 1794, resource 1796, or policies 1797. For example, remote subsystem 2490 can optionally implement subsystem 1700 as shown in FIG. 17.

Figure 25:
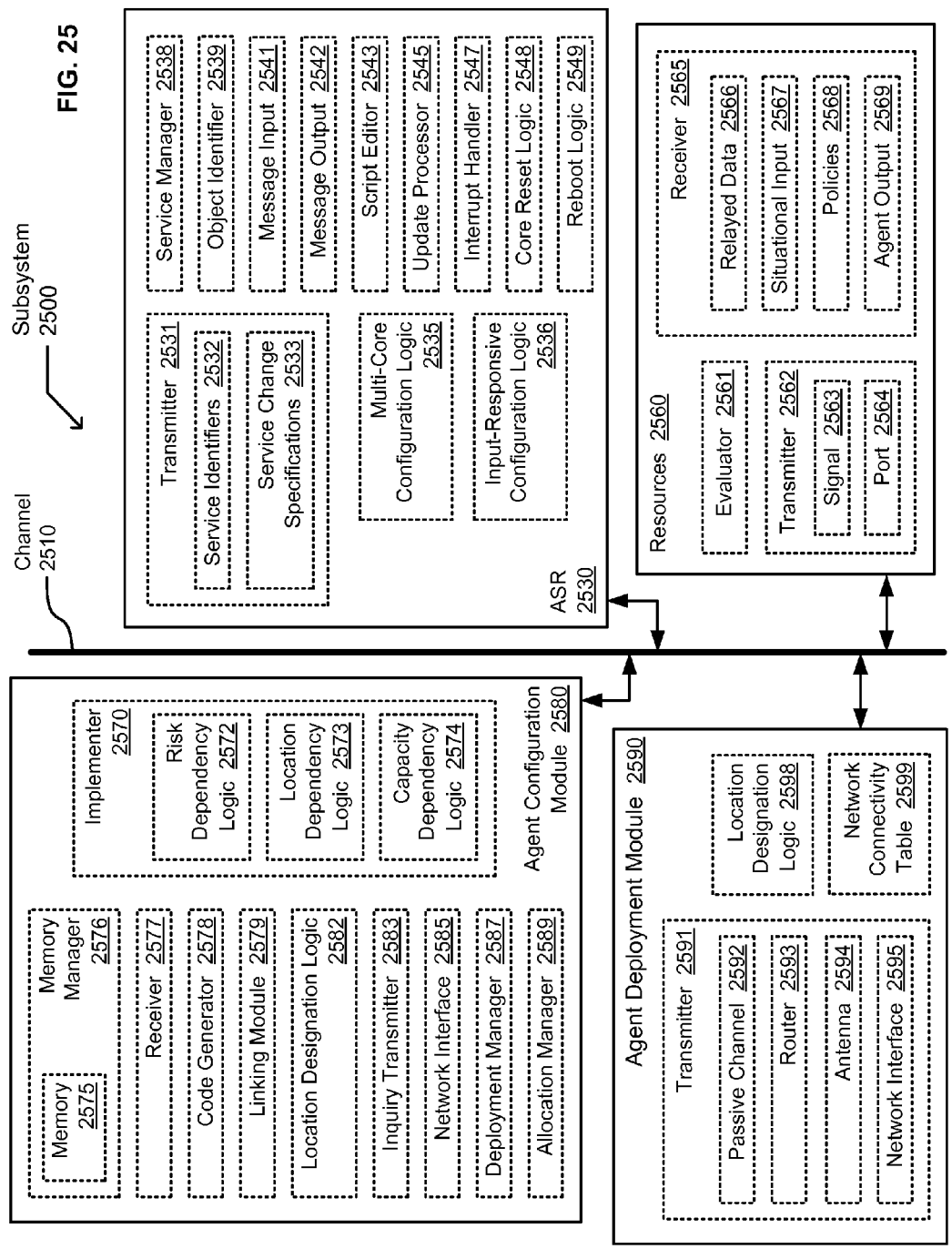

Referring now to FIG. 25, there is shown an exemplary environment in which one or more technologies may be implemented. As shown subsystem 2500 includes ASR 2530, resources 2560, agent configuration module 2580, and agent deployment module 2590 operatively coupled, for example, by channel 2510. ASR 2530 can (optionally) include transmitter 2531, multi-core configuration logic 2535, input-responsive configuration logic 2536, service manager 2538, object identifier 2539, message input 2541, message output 2542, script editor 2543, update processor 2545, interrupt handler 2547, core reset logic 2548, or reboot logic 2549. Transmitter 2531 can include service identifiers 2532 or service change specifications 2533. Resources 2560 can (optionally) include evaluator 2561, transmitter 2562, or receiver 2565. Transmitter 2562 can include signal 2563 or port 2564. Receiver 2565 can include relayed data 2566, situational input 2567, policies 2568, or agent output 2569.

Agent configuration module 2580 can (optionally) include memory manager 2576 (with memory 2575), receiver 2577, code generator 2578, linking module 2579, location designation logic 2582, inquiry transmitter 2583, network interface 2585, deployment manager 2587, allocation manager 2589, implementer 2570. Implementer 2570 can include one or more of risk dependency logic 2572, location dependency logic 2573, or capacity dependency logic 2574. Agent deployment module 2590 can include transmitter 2591, location designation logic 2598, or network connectivity table 2599. Transmitter 2591 can (optionally) include one or more of passive channel 2592, router 2593, antenna 2594, or network interface 2595.

Figure 26:
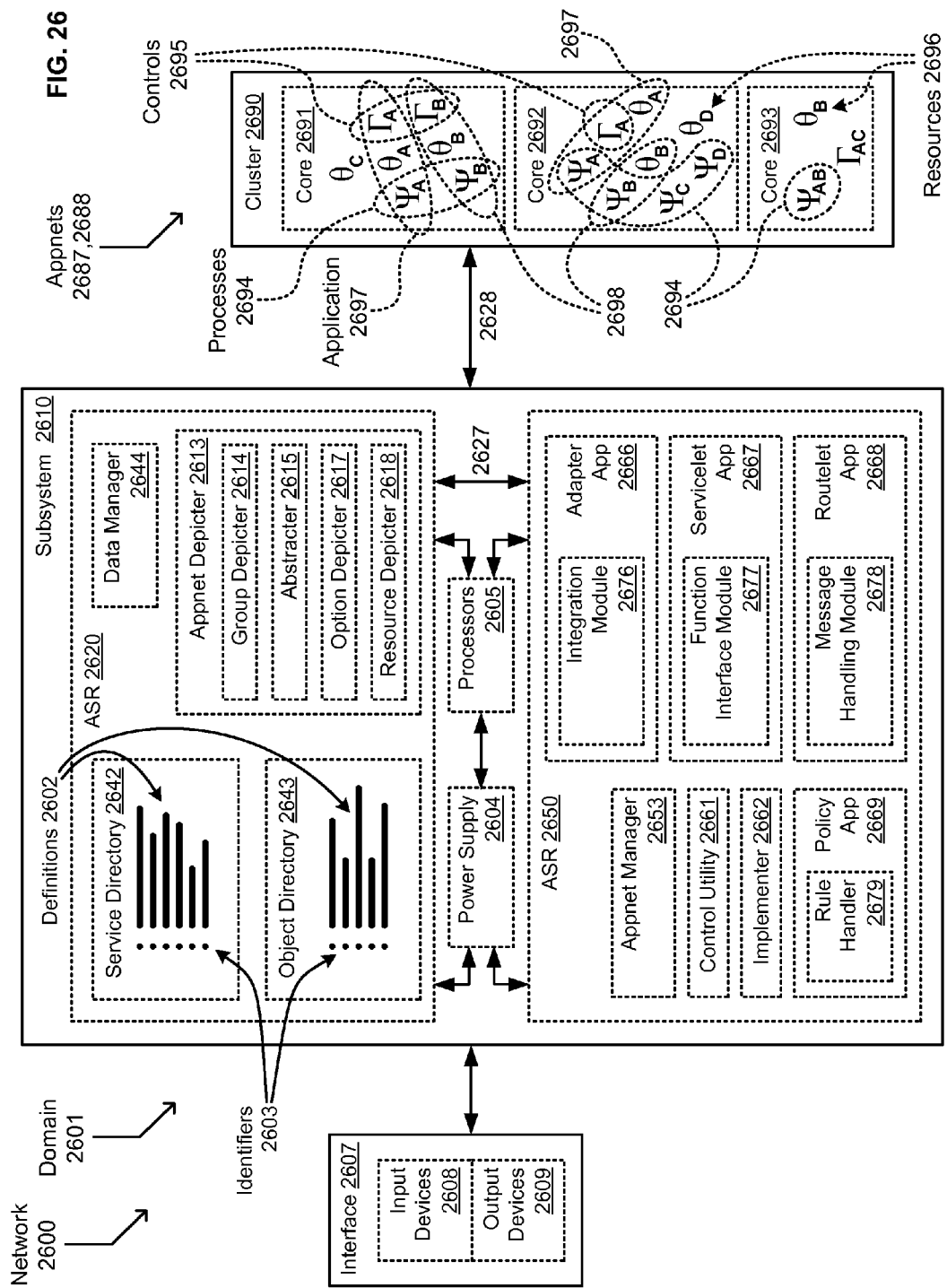

FIG. 26 shows network 2600 including at least domain 2601 and interface 2607. Interface 2607 includes one or more input devices 2608 (e.g. keyboards, pointing devices, touchscreen elements, voice recognition circuitry, or other user input devices, or network interface circuitry) or one or more output devices 2609 (e.g. transmitters, speakers, projectors, or the like). In some embodiments, interface 2607 can comprise one or more of a hand-held device, a wireless device, a browser, a content-aware agent, or the like. Alternatively or additionally, subsystem 2802 likewise includes or couples with power supply 2604 configured to provide power via one or more of linkages 2803-2827.

Domain 2601 includes one or more of subsystem 2610 or cluster 2690. Subsystem 2610 can (optionally) include one or more of ASR 2620 or ASR 2650 coupled via linkage 2627, with power supply 2604, or with one or more processors 2605. ASR 2620 or ASR 2650 can be implemented within or across one or more processing cores as software or firmware in some embodiments. Alternatively or additionally, instances of each can be implemented partly or entirely in application-specific circuitry. In some embodiments, part or all of domain 2601 can be implemented on a single integrated circuit chip. Those skilled in the art will appreciate, however, that power supply 2604 or the like can be implemented off-chip, for example, in a portable device, vehicle, or other stand-alone server.

Some implementations of ASR 2620 can include one or more of service directory 2642, object directory 2643, data manager 2644, or appnet depicter 2613. As shown, service directory 2642 or object directory 2643 can each include one or more definitions 2602 each corresponding to one or more identifiers 2603 (in a one-to-one, a many-to-one, or a one-to-many relationship, e.g.). In some implementations, for example, object directory 2643 can include routing information or the like, optionally built as a distributed index or widely replicated at several remote locations. Each site can optionally be constructed with a local cache of logical names primarily useful with a regional or other cluster of cores of subsystem 2610, in some embodiments. Appnet depicter 2613 can include one or more of group depicter 2614, abstracter 2615, option depicter 2617, or resource depicter 2618.

Some implementations of ASR 2650 can include one or more of appnet manager 2653, control utility 2661, or implementer 2662. ASR 2650 can likewise include one or more of adapter app 2666 (with integration module 2676, e.g.), servicelet app 2667 (with function interface module 2677, e.g.), routelet app 2668 (with message handling module 2678, e.g.), or policy app 2669 (with rule handler 2679, e.g.).

Subsystem 2610 can connect via one or more linkages 2628 with cluster 2690, which includes one or more of cores 2691-2693 each including one or more of processes 2694, controls 2695, or resources 2696. Application 2697 as shown, for example, can include one of the processes 2694, one of the controls 2695, and one of the resources 2696 that can each be addressable or otherwise named entities. Alternatively or additionally, application 2697 can include processes 2694, controls 2695, and resources 2696 of core 2692. Optionally, cores 2691-2693 can likewise include entities of each of these types (processes 2694, controls 2695, or resources 2696) in another application 2698. Domain 2601 can include one or more of appnet 2687 (relating application 2697 to two or more cores 2691-2693) or appnet 2688 (relating application 2698 to two or more cores 2691-2693).

Figure 27:
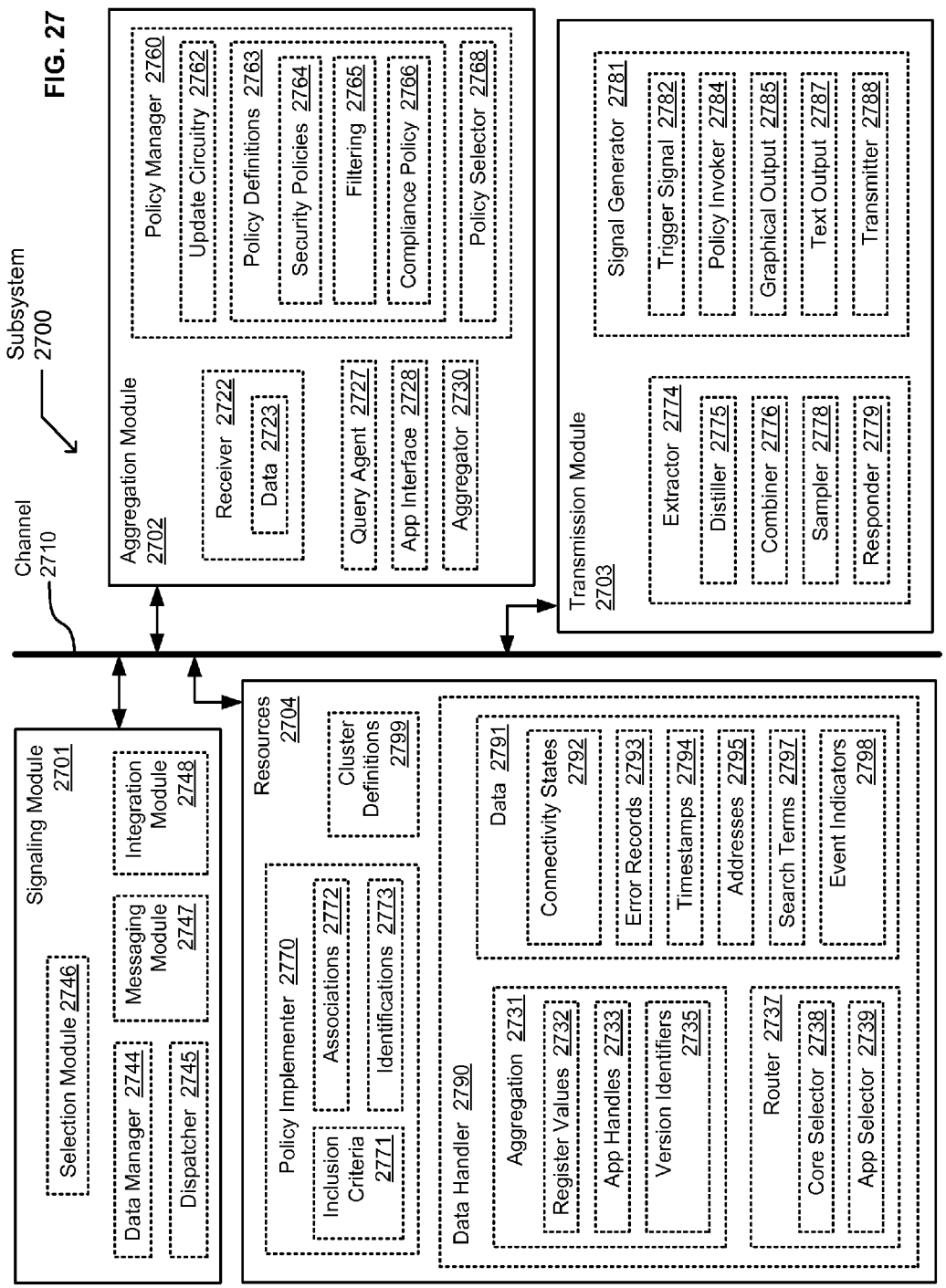

Referring now to FIG. 27, there is shown an exemplary environment in which one or more technologies may be implemented. As shown subsystem 2700 includes signaling module 2701, aggregation module 2702, transmission module 2703 and one or more resources 2704 operatively linked, for example, by channel 2710. Signaling module 2701 can (optionally) include data manager 2744, dispatcher 2745, selection module 2746, messaging module 2747, and integration module 2748. Resources 2704 can (optionally) include policy implementer 2770, data handler 2790, or cluster definitions 2799. Policy implementer can (optionally) include inclusion criteria 2771, associations 2772, or identifications 2773. Data handler 2790 can include one or more of aggregation 2731, router 2737 or one or more types of data 2791. Aggregation 2731 can include register values 2732, app handles 2733, version identifiers 2735 or the like. Router 2737 can include core selector 2738 or app selector 2739. Data 2791 can include connectivity states 2792, error records 2793, timestamps 2794, addresses 2795, search terms 2797, event indicators 2798 or the like.

Aggregation module 2702 can include receiver 2722 (with data 2723, e.g.), query agent 2727, app interface 2728, aggregator 2730, or policy manager 2760. Policy manager 2760 can (optionally) include update circuitry 2762, policy definitions 2763, or policy selector 2768. Policy definitions 2763 can (optionally) include security policies 2764, filtering 2765, or compliance policy 2766. Transmission module 2703 can (optionally) include extractor 2774 or signal generator 2781. Extractor 2774 can include distiller 2775, combiner 2776, sampler 2778, or responder 2779. Signal generator 2781 can (optionally) include trigger signal 2782, policy invoker 2784, graphical output 2785, text output 2787, or transmitter 2788.

Figure 28:
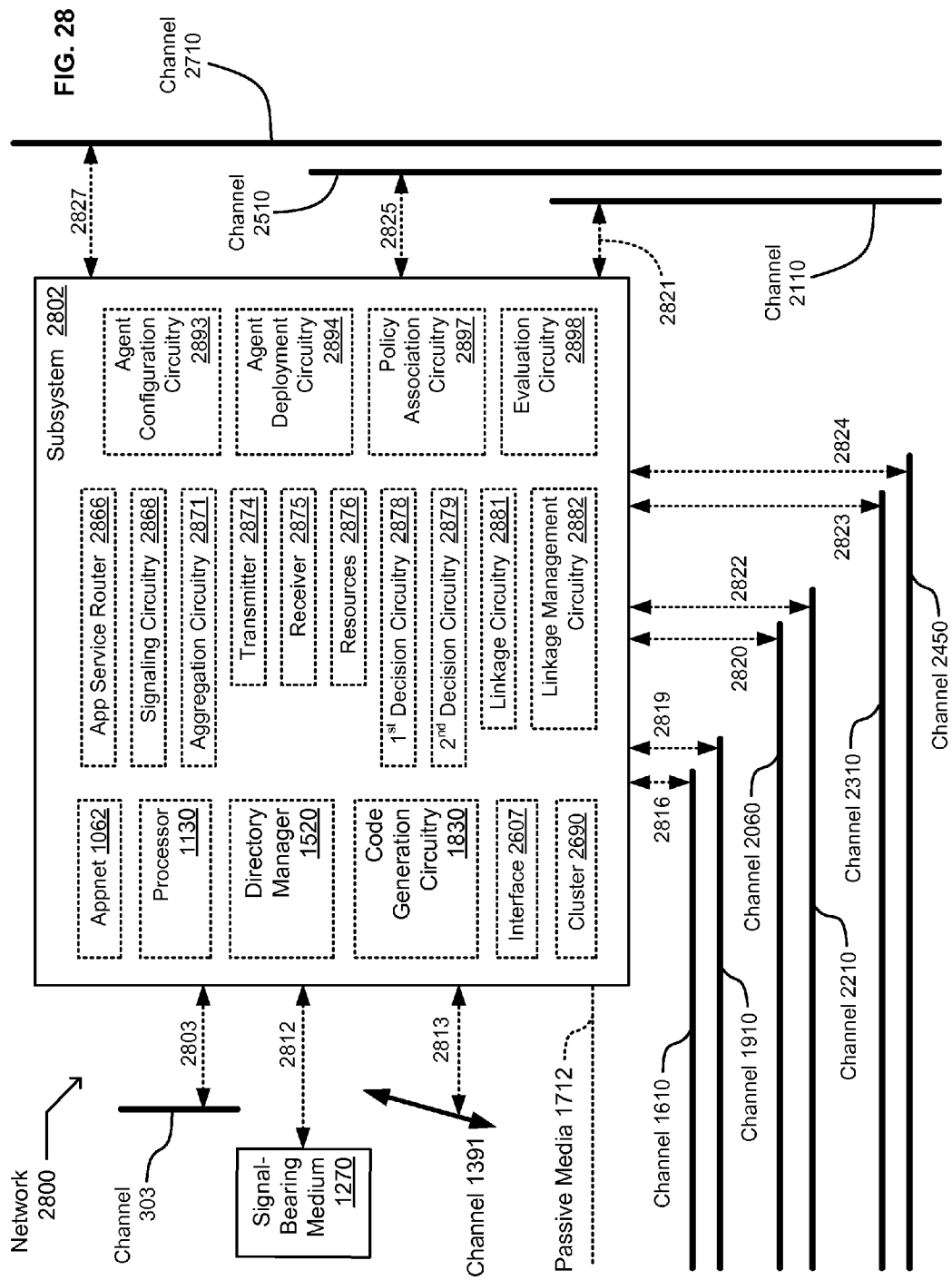

Referring now to FIG. 28, there is shown an exemplary environment in which one or more technologies may be implemented. As shown network 2800 includes subsystem 2802 optionally including one or more of appnet 1062 of FIG. 10, processor 1130 of FIG. 11, directory manager 1520 of FIG. 15, code generation circuitry 1830 of FIG. 18, or interface 2607 or cluster 2690 of FIG. 26. Alternatively or additionally, subsystem 2802 can include one or more of app service router 2866, signaling circuitry 2868, aggregation circuitry 2871, transmitter 2874, receiver 2875, resources 2876, first decision circuitry 2878, second decision circuitry 2879, linkage circuitry 2881, linkage management circuitry 2882, agent configuration circuitry 2893, agent deployment circuitry 2894, policy association circuitry 2897, or evaluation circuitry 2898.

In some embodiments network 2800 can include linkage 2803 between subsystem 2802 and channel 303 of FIG. 3. Alternatively or additionally, network 2800 can include linkage 2812 between subsystem 2802 and signal bearing medium 1270 of FIG. 12. Alternatively or additionally, network 2800 can include linkage 2813 between subsystem 2802 and channel 1391 of FIG. 13. Subsystem 2802 can likewise couple with passive media 1712 of FIG. 17. Alternatively or additionally, network 2800 can include linkage 2816 between subsystem 2802 and channel 1610 of FIG. 16, linkage 2819 between subsystem 2802 and channel 1910 of FIG. 19, linkage 2820 between subsystem 2802 and channel 2060 of FIG. 20, linkage 2822 between subsystem 2802 and channel 2210 of FIG. 22, linkage 2823 between subsystem 2802 and channel 2310 of FIG. 23, linkage 2824 between subsystem 2802 and channel 2450 of FIG. 24, linkage 2821 between subsystem 2802 and channel 2110 of FIG. 21, linkage 2825 between subsystem 2802 and channel 2510 of FIG. 25, or linkage 2827 between subsystem 2802 and channel 2710 of FIG. 27.

In some embodiments, subsystem 2802 can include app service router 2866 comprising application-specific circuitry or software-configured circuitry for implementing one or more of the five items as shown within signaling module 2701 of FIG. 27, such as that described below. In some embodiments, "software-configured circuitry" operable for a defined function can be implemented by configuring general purpose circuitry or the like via a transmission or storage medium bearing one or more executable instructions operable for the defined instruction.

Alternatively or additionally, signaling circuitry 2868 can likewise include application-specific circuitry or software-configured circuitry for implementing one or more of the five items as shown within second signaling module 2420 of FIG. 24. Aggregation circuitry 2871 can likewise include either or both (in combination) for implementing one or more of the items shown within aggregation module 2702 of FIG. 27. Alternatively or additionally, transmitter 2874 can likewise implement a transceiver or transmission module 2703 with application-specific circuitry or software-configured circuitry implementing one or more of the items shown therein.

In some embodiments, interface 2607 in FIG. 26 or FIG. 28 can likewise comprise application-specific circuitry or software-configured circuitry for implementing any of the several items as shown within interface module 2360 of FIG. 23. Alternatively or additionally, first decision circuitry 2878 can likewise include either or both for implementing one or more variants of decision module 2350 as described herein. Second decision circuitry 2879 can likewise include either or both for implementing one or more variants of decision module 1650 as described herein. Linkage circuitry 2881 can likewise (optionally) include application-specific circuitry or software-configured circuitry for implementing linkage module 2270 with one or more of the six items therein as shown in FIG. 22. In some embodiments, linkage management circuitry 2882 can comprise either or both for implementing one or more items within linkage management module 2240 as shown in FIG. 22.

In some embodiments, agent configuration circuitry 2893 can likewise (optionally) include application-specific circuitry or software-configured circuitry for implementing any of the several items as shown within configuration module 2580 of FIG. 25. Agent deployment circuitry 2894 can likewise include either or both for implementing one or more items as shown within agent deployment module 2590 of FIG. 25, or the like. In some variants, policy association circuitry 2897 can likewise include application-specific circuitry or software-configured circuitry for implementing one or more items in policy association module 2130 or the like. Likewise evaluation circuitry 2898 can likewise include either or both, including one or more items as shown in evaluation module 2170 of FIG. 21.

Figure 29:
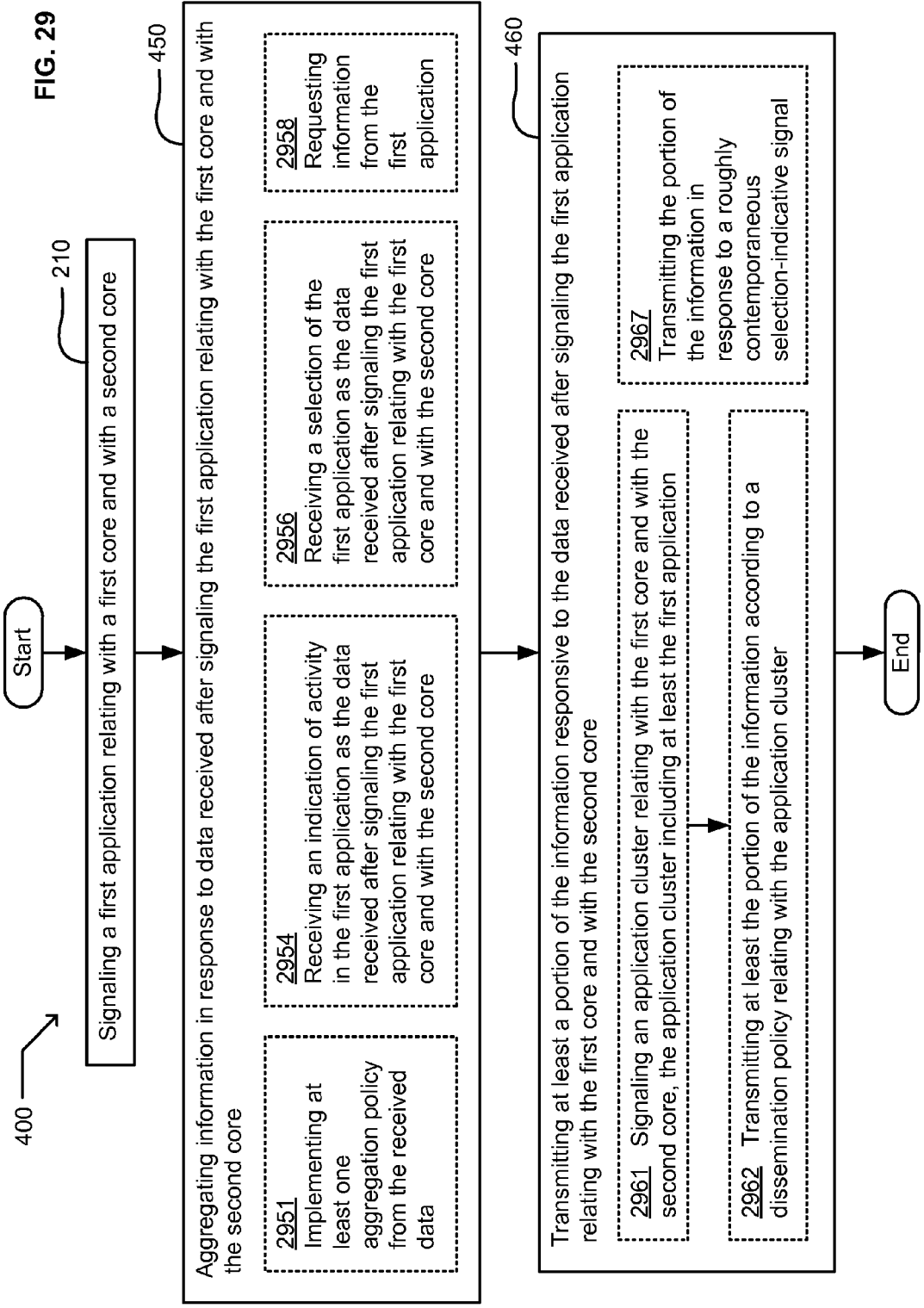
FIGS. 29-32 depict variants of the flow of FIG. 4.

Referring now to FIG. 29, there are shown several variants of the flow 400 of FIG. 4. Operation 450—aggregating information in response to data received after signaling the first application relating with the first core and with the second core—may (optionally) include one or more of the following operations: 2951, 2954, 2956, or 2958. Operation 460—transmitting at least a portion of the information aggregated in response to the data received after signaling the first application relating with the first core and with the second core—may include one or more of the following operations: 2961, 2962, or 2967.

Operation 2951 describes implementing at least one aggregation policy obtained from the received data (e.g. implementer 370 configuring aggregator 330 to capture registry data, process data, or similar "snapshot" data from cores 391, 392 hourly whenever app 397 remains active). This can occur, for example, in embodiments in which signaling module 311 is configured to perform operation 210, in which aggregation module 312 is configured to perform operation 450, and in which transmission module 313 is configured to perform operation 460.

Operation 2954 describes receiving an indication of activity in the first application as the data received after signaling the first application relating with the first core and with the second core (e.g. app interface 2728 receiving a heartbeat or the like from app 397 after completing a successful handshake with some portion of appnet 350). The appnet portion can comprise one of the apps 397, 398 or cores 391, 392, for example, in some embodiments. This can occur, for example, in embodiments in which signaling module 2701 implements signaling module 311 and in which aggregation module 2702 implements aggregations module 312. Alternatively or additionally, the indication of activity can include an acknowledgement or other reply from some portion of appnet 350 (or a network manager associated with the appnet, e.g.) responsive to an inquiry or other transmission from signaling module 311.

Operation 2956 describes receiving a selection of the first application as the data received after signaling the first application relating with the first core and with the second core (e.g. receiver 319 receiving an identifier of app 397 after signaling module 311 signals at least app 397 relating with core 391 and with core 392). The identifier can (optionally) include one or more of a filename, a process name, a product name, a username, a pathname or other address, an encoded identifier, or the like. Alternatively or additionally, the application selection can (optionally) include a control identifier, a reference to a portion of the application, a menu option, a reference that logically maps to a selection of the application, or the like. Alternatively or additionally, signaling module 311 can signal other apps (app 398, e.g.) relating with cores 391, 392 or other cores relating with app 397. See FIG. 19, e.g. Alternatively or additionally, in some embodiments, signaling module 321 or other portions of subsystem 302 can be included and configured to perform operation 2956, receiving the selection from interface 325 or the like.

Operation 2958 describes requesting information from the first application (e.g. query agent 2727 requesting a progress indication, functional or other role-descriptive information, activity information, loading information, availability information, code segments, or the like from app 398). The requested information can pertain to a request-receiving application (to app 398, e.g.) or to another application residing in an overlapping set of one or more cores (to app 397, e.g.). In a scenario in which the requested information is subsequently obtained, it can optionally be aggregated (by aggregator 330, e.g.) or used for defining or updating one or more aggregation criteria as taught herein.

Operation 2961 describes signaling an application cluster relating with the first core and with the second core, the application cluster including at least the first application (e.g. signal generator 2781 and one or more cluster definitions 2799 indicating that cluster 2690 contains at least application 2697 and more than one of cores 2691, 2692, and 2693). This can occur, for example, in an embodiment in which subsystem 2610 implements subsystem 2700, in which aggregation module 2702 and one or more resources 2704 jointly implement operation 450, and in which at least transmission module 2703 implements operation 460. Alternatively or additionally, signal generator 2781 can be configured to receive a portion of aggregation 2731 via extractor 2774. In some variants, signal generator 2781 can perform such functions responsive to trigger signal 2782, which can include one or more of a clock signal, a digital message from input devices 2608, a processor interface signal or the like.

Those skilled in the art will recognize that operative recitations or other roles can be implemented by circuitry or other logic not specifically described herein, in some variants, or by entities described herein in relation to other operations. Operation 2961 can be likewise be performed by some implementations of integration module 2748, for example, such as by linking each of a suite of networking applications with cores 2691, 2692, 2693. This can occur, for example, in embodiments in which subsystem 2610 includes an instance of subsystem 2700 operatively coupled at least to power supply 2604 and cluster 2690, in which signaling module 2701 is configured to perform operation 210, in which aggregation module 2702 is configured to perform operation 450, and in which transmission module 2703 is configured to perform operation 460. Some or all of resources 2704 can be implemented as resources 2696 of cluster 2690 and, alternatively or additionally, some or all of subsystem 2700 can be implemented as a distributed application across a plurality of cores (e.g. across processors 2605).

Operation 2962 describes transmitting at least the portion of the aggregated information according to a dissemination policy relating with the application cluster (e.g. extractor 2774 extracting one or more event indicators 2798 according to a security or other communication policy implemented by policy invoker 2784). Such policies can include public key encryption, error correction, or other ordinary authentication policies, for example, many of which can be used by those skilled in the art in the present context, without undue experimentation.

Operation 2967 describes transmitting the portion of the aggregated information in response to a roughly contemporaneous selection-indicative signal (e.g. extractor 2774 sending a search result within about a day of receiving a search term). This can occur, for example, in embodiments in which data handler 2790 uses one or more search terms 2797 for extracting the portion(s) to transmit, in which an instance of aggregation module 2702 can perform operation 450, and in which at least transmission module 2703 and one or more resources 2704 jointly perform operation 460. Alternatively or additionally, a trigger signal 2782 (e.g. request messages) can provide protocol information affecting how and when the information portion is transmitted. In some embodiments, the selection-indicative signal identifies a result format, transmission type, block size, character sets, syntax, sequence of response, or other protocol-related aspects of the information portion to be transmitted.

Figure 30:
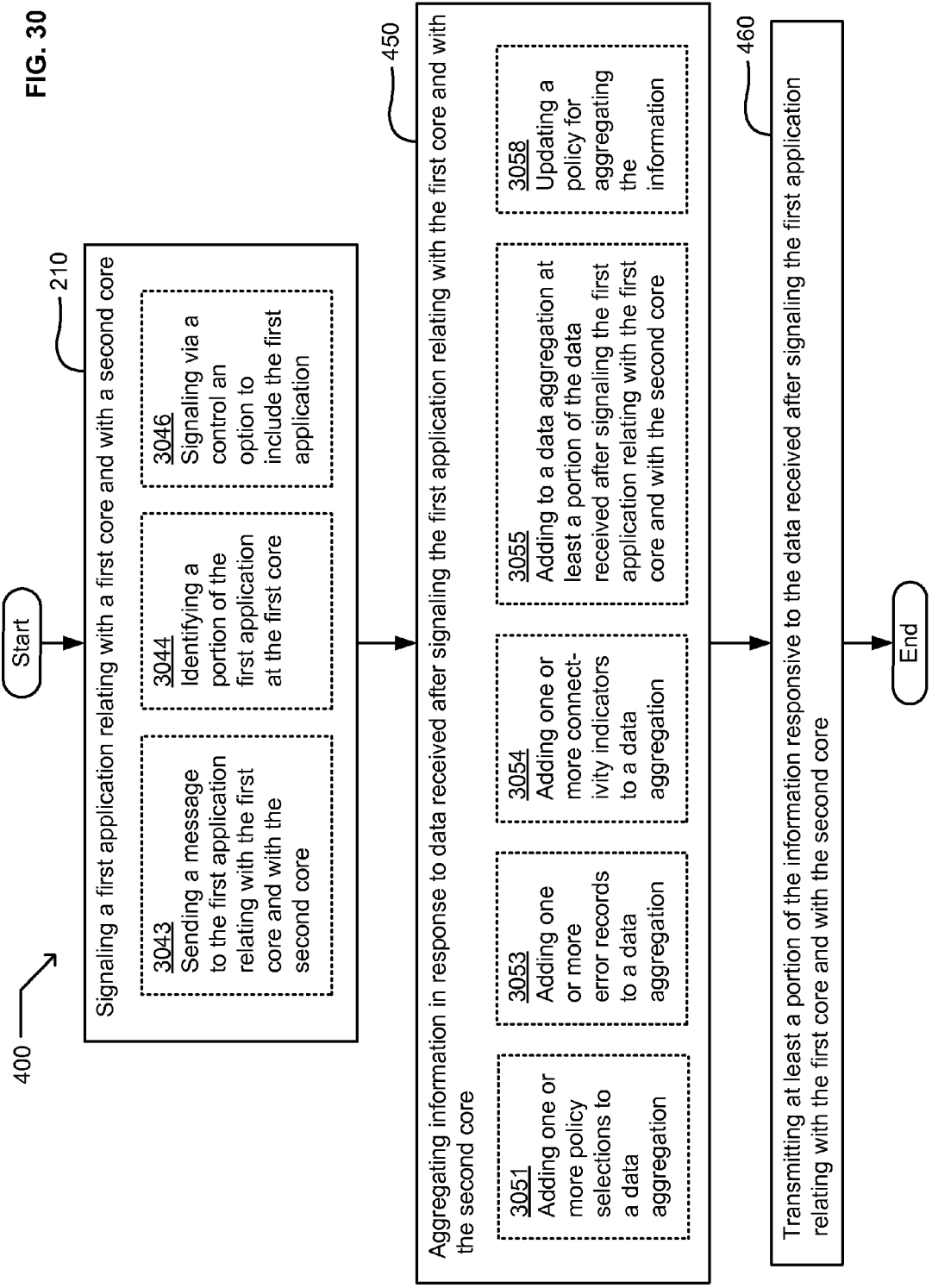

Referring now to FIG. 30, there are shown several variants of the flow 400 of FIG. 4 or 29. Operation 210—signaling a first application relating with a first core and with a second core—may include one or more of the following operations: 3043, 3044, or 3046. Operation 450—aggregating information in response to data received after signaling the first application relating with the first core and with the second core—may include one or more of the following operations: 3051, 3053, 3054, 3055, or 3058.

Operation 3043 describes sending a message to the first application relating with the first core and with the second core (e.g. messaging module 2747 signaling an application-wide policy change to a modeling application having active components in more than one core of cluster 2690). The modeling application may be implemented as application 2697, for example, including one or more processes 2694, one or more controls 2695, or one or more resources 2696 in each of cores 2691, 2692. In some embodiments, messages can be configured for direct or indirect transmission to one or more of these components, for example, such as by content distribution systems known by those skilled in the art.

Operation 3044 describes identifying a portion of the first application at the first core (e.g. data manager 2744 indicating one or more resources 2696 comprising data within or otherwise accessible to application 2697). This can occur, for example, in embodiments in which resources 2696 include network access port linkages, conventional data structures, or the like. Alternatively or additionally, the application portions at the "first" core (core 2692, e.g.) can include processes 2694, controls 2695, output signals, or the like. In some embodiments, "identifying" includes providing or determining an origin, group affiliation, handle, nature, or definitive characteristics of the application portion.

Operation 3046 describes signaling via a control an option to include the first application (e.g. selection module 2746 or option depicter 2617 causing a selection mechanism to appear at an interface enabling options for an entity to address the application or not). In some embodiments, for example, output device 2609 (implemented at admin station 115, e.g.) can present several options of which a first identifies appnet 150 and a second identifies appnet 160. Input device 2608 can likewise be configured to enable a selection of one or more of these options.

Operation 3051 describes adding one or more policy selections to a data aggregation (e.g. policy selector 2768 selecting one or more of security policies 2764, filtering 2765, or compliance policy 2766 for use with aggregator 2730). Alternatively or additionally, receiver 2722 can be configured to perform operation 3051 by logging or otherwise gathering indications of the selections into aggregation 2731 or the like. In some embodiments, the selections can be indicated or supplemented by content such as weblogs, podcasts, websites, or the like.

Operation 3053 describes adding one or more error records to a data aggregation (e.g. aggregator 2730 adding one or more error records 2793 to data 2791). In some embodiments, aggregator 2730 uses compliance policy 2766 or filtering 2765 in determining what constitutes an error needing documentation in error record 2793. Those skilled in the art will recognize a variety of contexts from which such determinations can readily be adapted, applied for aggregation, and used for characterizing anomalous behavior in a system, for example.

Operation 3054 describes adding one or more connectivity indicators to a data aggregation (e.g. aggregator 2730 adding one or more connectivity testing outcomes or other connectivity states 2792 to data 2791). In some embodiments, connectivity states 2792 can include a measurement, a failure indication, a diagnostic report, or the like. "Adding" can optionally include appending, arithmetically or logically combining, initializing, conditionally superseding, or otherwise injecting new data into the aggregation.

Operation 3055 describes adding to a data aggregation at least a portion of the data received after signaling the first application relating with the first core and with the second core (e.g. aggregator 2730 and filtering 2765 jointly injecting part of data 2723 into aggregation 2731 or the like after messaging module signals application 2698 relating with cores 2691, 2692). The data added can include version identifiers 2735, for example, even while omitting received software or other data to which the version identifiers 2735 pertain. Alternatively or additionally, the data to be added can (optionally) include one or more of register values 2732, app handles 2733, connectivity states 2792, error records 2793, timestamps 2794, addresses 2795, search terms 2797, event indicators 2798, or the like.

Operation 3058 describes updating a policy for aggregating the information (e.g. update circuitry 2762 modifying one or more policy definitions 2763 affecting an operational mode by which aggregator 2730 operates). In some embodiments, the updated policy may include a quality-of-service policy, a security policy, a virtual private network policy, a verbosity policy, or the like.

Figure 31:
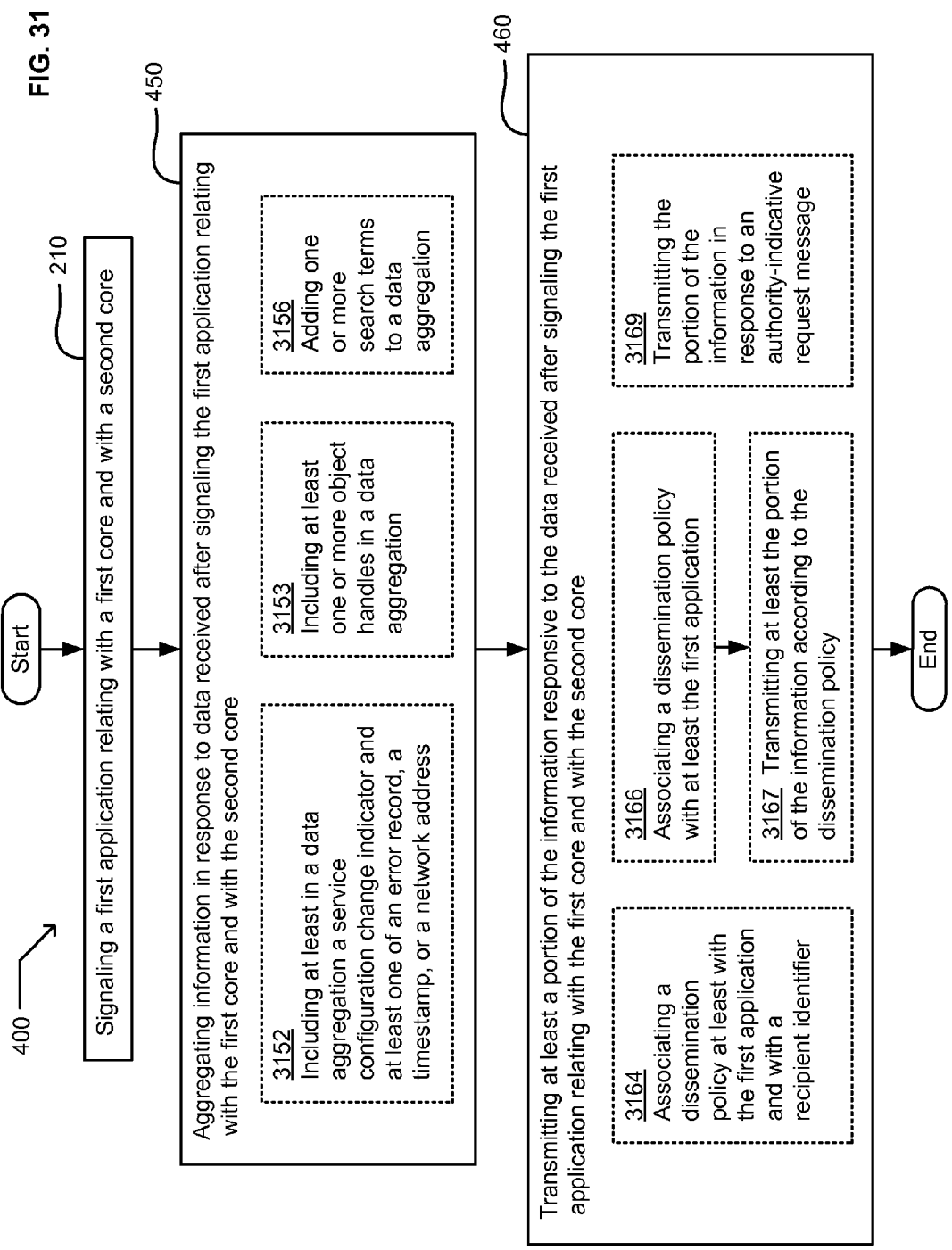

Referring now to FIG. 31, there are shown several variants of the flow 400 of FIG. 4, 29, or 30. Operation 450—aggregating information in response to data received after signaling the first application relating with the first core and with the second core—may include one or more of the following operations: 3152, 3153, or 3156. Operation 460—transmitting at least a portion of the information aggregated in response to the data received after signaling the first application relating with the first core and with the second core—may include one or more of the following operations: 3164, 3166, 3167, or 3169.

Operation 3152 describes including at least in a data aggregation a service configuration change indicator and at least one of an error record, a timestamp, or a network address (e.g. policy manager 2760 applying filtering 2765 to record timing or other aspects of service configuration changes signaled in operation 220 or its variants, as taught herein). In some embodiments, for example, aggregator 2730 can include one or more error records 2793, one or more timestamps 2794, or one or more network addresses 2795 in aggregation 2731. For example, this can occur in embodiments in which subsystem 2610 includes one or more instances of subsystem 2700 operatively coupled to power supply 2604 or to one or more processors 2605, in which aggregation module 2702 is configured to perform operation 450, and in which ASR 2650 is configured to perform operation 220.

More generally, embodiments of flow 400 can generally incorporate instances of flow 200 or its variants as taught herein in FIGS. 38-42. Aggregator 2730 can log the partial service configuration change signaled at operation 220 or its variants, for example. Alternatively or additionally, those skilled in the art will recognize that operations 450 and 460 or their variants can be performed before, during, or in alternation with operation 220 in some embodiments.

Operation 3153 describes including at least one or more object handles in a data aggregation (e.g. aggregator 2730 including domain names, IP addresses, or other addresses 2795 in aggregation 2731). Aggregation 2731 can contain one or more resource records, for example, associating the network address with some addressable object.

Operation 3156 describes adding one or more search terms to a data aggregation (e.g. aggregator 330 appending a message indicating a search term to data 331). The message can include a username or account or a timestamp with a search result, for example. In some implementations, for example, the search result can indicate which of apps 397, 398 is configured to use a printer, storage module, or other device identified by the search term.

Operation 3164 describes associating a dissemination policy at least with the first application and with a recipient identifier (e.g. combiner 2776 associating a highly secure protocol to a trading application providing information to a specific investor or class of investors). For an anonymous "guest" user requesting appnet information relating to local support services, conversely, combiner 2776 may default to an association with a much more liberal security or other dissemination policy. Alternatively or additionally, the dissemination policy may include a lower level of detail or system control for the anonymous user.

Operation 3166 describes associating a dissemination policy with at least the first application (e.g. policy invoker 2784 assigning a multiple-tier dissemination policy for an array of users as indicated in columns 1461, 1471, and 1481 of FIG. 14). This can occur, for example, in embodiments in which aggregation module 2702 can perform operation 450, in which transmission module 2703 can perform operation 460, and in which one or more commands 1409 in each cell of column 1461 or of row 1401 contain extraction commands executable by extractor 2774 (for reducing or presenting data as text output 2787 or graphical output 2785 from signal generator 2781, e.g.).

Operation 3167 describes transmitting at least the portion of the aggregated information according to the dissemination policy (e.g. distributing a weekly or other occasional extraction from aggregation 2731 to addresses 2795, consistent with addresses 2795 having been defined or filtered by policy invoker 2784). In some embodiments, the extraction can result from signal generator 2781 receiving a trigger signal 2782 indicating an event such as an apparent security breach, an overflow condition, or similar error signal recognizable by conventional comparisons or the like. Alternatively or additionally, the extraction can include part or all of the above-referenced multiple-tier dissemination policy, such as for giving each of several users a user-specific weekly report.

In some variants, some or all components of aggregations module 2702 (policy definitions 2763, e.g.) can reside among resources 2704, for example, accessible by signaling module 2701 or transmission module 2703. Policy definitions 2763 may include a data retention policy or the like, for example, causing portions of aggregation 2731 or data 2791 to be discarded after a period of time, a period of non-use, an extraction event, or the like. Trigger signal 2782 can thus cause an extraction operation that includes data removal, in some embodiments.

Operation 3169 describes transmitting the portion of the aggregated information in response to an authority-indicative request message (e.g. responder 2779 and transmitter 2788 jointly transmitting an accounting-appnet-specific extraction after responder 2779 validates a password or biometric data to authenticate a request for the report from one or more users of the "Accounting" domain). The user(s) can include integrator 1407 for example, in some embodiments. Alternatively or additionally, transmitter 2788 can transmit the information portion directly or indirectly responsive to such a request message.

Figure 32:
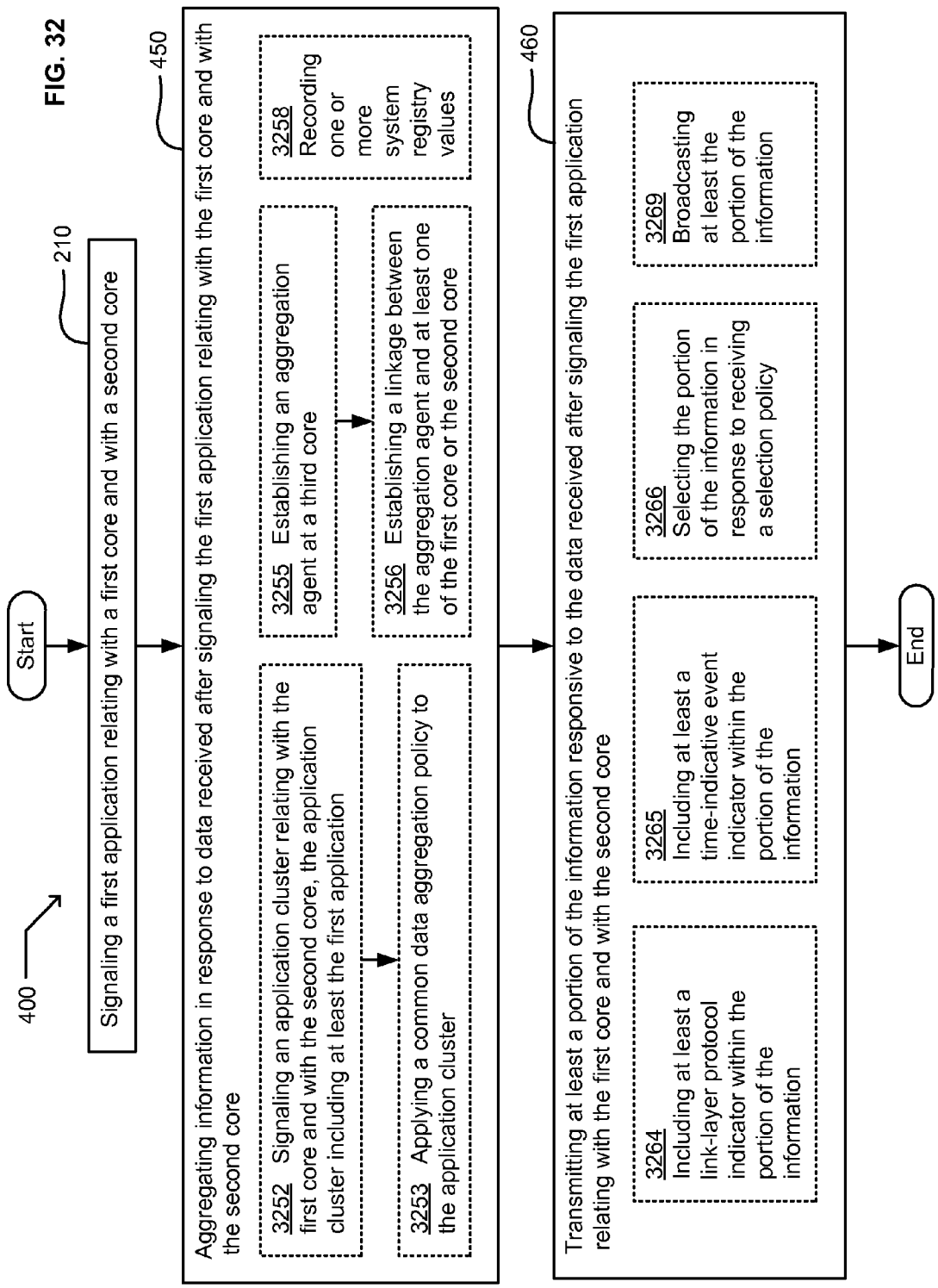

Referring now to FIG. 32, there are shown several variants of the flow 400 of FIG. 4, 29, 30, or 31. Operation 450—aggregating information in response to data received after signaling the first application relating with the first core and with the second core—may include one or more of the following operations: 3252, 3253, 3255, 3256, or 3258. Operation 460—transmitting at least a portion of the information aggregated in response to the data received after signaling the first application relating with the first core and with the second core—may include one or more of the following operations: 3264, 3265, 3266, or 3269.

Operation 3252 describes signaling an application cluster relating with the first core and with the second core, the application cluster including at least the first application (e.g. app interface 2728 addressing modules 1024-1026 of FIG. 10 as a single entity characterized or otherwise listed in cluster definitions 2799). This can occur, for example, in any of the embodiments described in which aggregation module 2702 can perform operation 450 and in which channel 2710 is directly or indirectly coupled with appnet 1062.

Alternatively or additionally, app interface 2728 can provide one or more aspects of how the cluster relates with the cores, such as in a domain (domain 1000, e.g.) to be used frequently for accessing two or more applications as a cluster. In some implementations of appnet 1062, for example, tier 1002 can include three functionally related applications (module 1024, 1025, 1026, e.g.) addressable as a cluster to permit a joint operation by or upon all three with a minimal service disruption.

Operation 3253 describes applying a common data aggregation policy to the application cluster (e.g. aggregator 2730 causing the application cluster to pause and report a status or progress regularly or occasionally). The status or progress can relate to one or more processes, cores, or resources in an appnet of the cluster, for example. In some embodiments, the aggregation policy includes one or more specifications of which phenomena are to be measured, which measurements are to be combined, which combinations are to be transmitted, which transmissions are to be aggregated, or which aggregations are to be retained. Those skilled in the art can incorporate existing policies of any of these types, or others, into the present context without undue experimentation.

Operation 3255 describes establishing an aggregation agent at a third core (e.g. dispatcher 2745 sending a mobile agent or the like as aggregator 2730 to core 2693 for gathering data sent by other cores 2691, 2692 in cluster 2690). Alternatively or additionally, dispatcher 2745 or the aggregation agent can occasionally generate data requests or other triggers causing one or more of cores 2691, 2692 to send data as described herein to the "third" core.

Operation 3256 describes establishing a linkage between the aggregation agent and at least one of the first core or the second core (e.g. router 2737 adding core 2693 to cluster 2690 in the above example). This can occur, for example, by router 2737 allocating channel 2710 or linkage 2628, at least temporarily linking core 2693 (at which aggregator 2730 has been established, e.g.) with core 2691. (Those skilled in the art will recognize the foregoing as one of many examples of flows herein that can be performed in a different sequence than that shown. Of course a linkage between cores 2691 and 2693 can be established before or during operation 3255, for example, so that establishing the agent establishes the linkage.)

Operation 3258 describes recording one or more system registry values (e.g. aggregator 2730 recording one or more register values 2732 in response to an interrupt or the like in the data received after signaling the application relating with the first core and with the second core). In some instances, for example, an entire system registry can be pushed onto a stack in response to a system error that aborts a process.

Operation 3264 describes including at least a link-layer protocol indicator within the portion of the aggregated information (e.g. sampler 2778 capturing an indication of whether incoming packets came via Ethernet, Wi-Fi, Token Ring, PPP, ATM, Frame Relay, SMDS, or the like). In some embodiments, of course, the information portion need not include packets, or the link layer may signify a protocol outside the internet protocol suite.

Operation 3265 describes including at least a time-indicative event indicator within the portion of the aggregated information (e.g. responder 2779 responding to input with a plot of one or more parameters versus time as graphical output 2785). Operation 3265 can occur, for example, in embodiments in which signaling module 2701 performs operation 210, in which aggregation module 2702 performs operation 450 (individually or jointly with resources 2704), and in which transmission module 2703 performs operation 460. The parameter(s) can include one or more of an error count, a port usage or resource level, a pattern-matching event symptomatic of a worm or other malicious agent, or the like.

Operation 3266 describes selecting the portion of the aggregated information in response to receiving a selection policy (e.g. distiller 2775 selecting a representative portion of the information aggregated in response to receiving one or more new executable instructions or other selection parameters). The representative portion can include every tenth record, for example, in an embodiment in which other records are discarded. Alternatively or additionally, in some embodiments distiller 2775 can be adjusted so that a diagnostically probative portion of the aggregated information is selected.

Operation 3269 describes broadcasting at least the portion of the aggregated information (e.g. transmitter 2788 transmitting at least event indicators 2798 as text output 2787 to several destinations at addresses 2795). Alternatively or additionally, the information portion can be sent to some or all cores within a tier, appnet or domain, in some embodiments. This can occur, for example, in embodiments in which transmission module 2703 can perform operation 460 by broadcasting a security or priority protocol change to all modules 1024, 1025, 1026 in cluster 1095.

Figure 33:
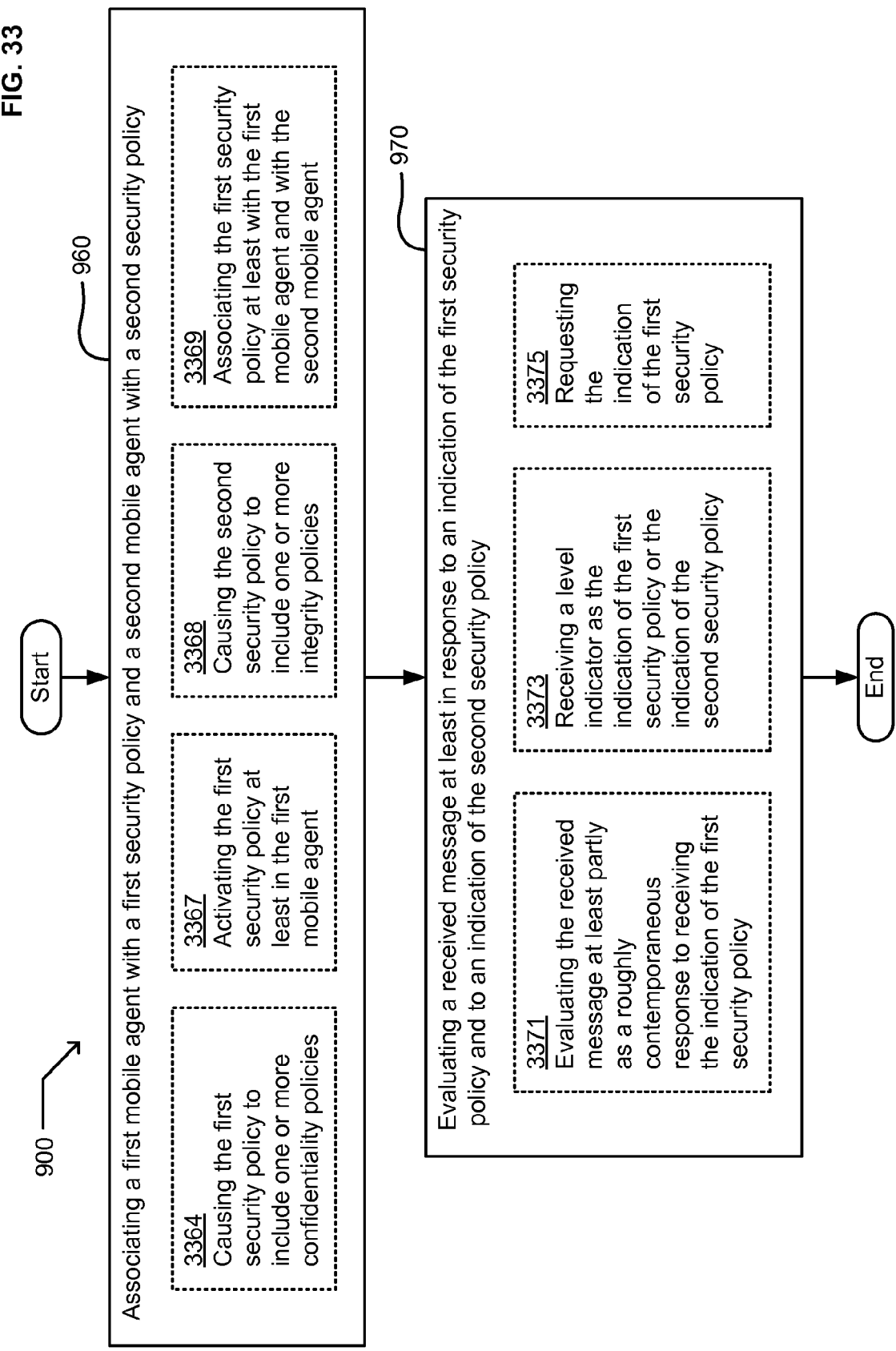
FIGS. 33-35 depict variants of the flow of FIG. 9.

Referring now to FIG. 33, there are shown several variants of the flow 900 of FIG. 9. Operation 960—associating a first mobile agent with a first security policy and a second mobile agent with a second security policy—may include one or more of the following operations: 3364, 3367, 3368, or 3369. Operation 970—evaluating a received message at least in response to an indication of the first security policy and to an indication of the second security policy—may include one or more of the following operations: 3371, 3373, or 3375.

Operation 3364 describes causing the first security policy to include one or more confidentiality policies (e.g. first security policy circuitry 2138 including one or more confidentiality policies 2154). In some embodiments, a confidentiality policy can ensure that a first level of information cannot be accessed by a subject at any lower level of authorization. Alternatively or additionally, the access can be modulated so that the level of a required authorization depends upon whether the mode of accessing the information is to include reading, writing, modifying, executing or the like. This can occur, for example, at least in embodiments in which module 1751 implements the "first" mobile agent, in which policy association module 2130 is configured to perform operation 960, in which evaluation module 2170 is configured to perform operation 970, and in which first security policy circuitry 2138 is implemented as one or more of software, firmware, hardware, or media bearing signals. Alternatively or additionally, first security policy circuitry 2138 can include one or more of message encryption, user authentication, shrink-wrap licensing or other digital rights management technologies available to those skilled in the art.

Operation 3367 describes activating the first security policy at least in the first mobile agent (e.g. first security policy circuitry 2138 and activation logic 2131 jointly implementing a heartbeat, a provenance indication or the like in a spawning agent or the like). This can occur, for example, in embodiments in which the mobile agent includes a broker agent, a content delivery agent, a synthesizing agent, a research agent or the like. Likewise the first security policy can include security policies referenced herein or combinations of them, as will be understood by those skilled in the art. In some variants, the "first" security policy can include data integrity policies such as a "no write up, no read down" policy. Alternatively or additionally, such policies can include transaction integrity policies 2155 such as recording at least an authorization identifier and timestamp in association with each qualifying transaction. Those skilled in the art can implement many other existing data or transaction integrity policies selectively for use as the first security policy without undue experimentation. (Alternatively or additionally, of course they can likewise include implementations of flow 700 or flow 800 as taught herein for embodiments in which one or more of the mobile agents are remote.)

Operation 3368 describes causing the second security policy to include one or more integrity policies (e.g. second security policy circuitry 2139 including data integrity policies 2136 or transaction integrity policies 2155). Alternatively or additionally, this variant can include one or more of operation 3364, operation 3367, or other operations affecting or effectuating other security policies. This can occur, for example, in embodiments in which policy association module 2130 can perform operation 960, in which message evaluation module 2170 can perform operation 970, and in which module 1753 implements the "first" mobile agent.

Operation 3369 describes associating the first security policy at least with the first mobile agent and with the second mobile agent (e.g. association logic 2133 including a record or function that maps at least an identifier of the policy with the two or more mobile agents). Alternatively or additionally, the association may include activating or otherwise implementing the first security policy in the first or second mobile agents. In some variants, second security policy circuitry 2139 and association logic 2133 can jointly perform operation 3369 by providing specific security instructions to all addressable mobile agents in subsystem 1700. The security instructions may include a periodic or occasional intrusion detection procedure, an incoming data filter implementation, a conditional security deactivation instruction, a handshaking protocol or the like as known by those skilled in the art. Alternatively or additionally, one or more agent selection criteria may be applied for deciding which software agents receive the specific security instructions.

Operation 3371 describes evaluating the received message at least partly as a roughly contemporaneous response to receiving the indication of the first security policy (e.g. triggering circuitry 2178 causing one or more other portions of evaluation module 2170 to begin processing the received message within about a day of receiving the indication). This can occur, for example, in embodiments in which the evaluation of a recent message (e.g. that the first mobile agent "needs a firewall") is changed (e.g. to "needs a transaction security protocol") in response to the indication (e.g. that the first mobile agent "has Firewall X"). In some embodiments, the message evaluation can yield an error message, an event record, a process initiation, a reconfiguration, a level indication or the like. Alternatively or additionally the evaluation can be performed with user interaction, such as by indicating the first security policy and receiving the evaluation at user interface 2151 responsive to a suitably authorized user logging on a few weeks after network interface 2192 receives a message.

Operation 3373 describes receiving a level indicator as the indication of the first security policy or the indication of the second security policy (e.g. network interface 2192 receiving "high," 61%, or 5th as one or more level indicators 2195 signifying a capacity, an activity level, a ranking, or the like). Alternatively or additionally, the level indicator may relate meaningfully with some other quality-indicative measure such as recency, value, safety, performance, or the like.

Operation 3375 describes requesting the indication of the first security policy (e.g. policy update circuitry 2188 requesting message handler 2190 to broadcast one or more inquiries 2197 relating to security policies in use in nearby cores). In some embodiments, for example, module 1752 may transmit inquiries 2197 to this effect to each of cores 1782 through 1787, requesting a direct response to core 1781.

Figure 34:
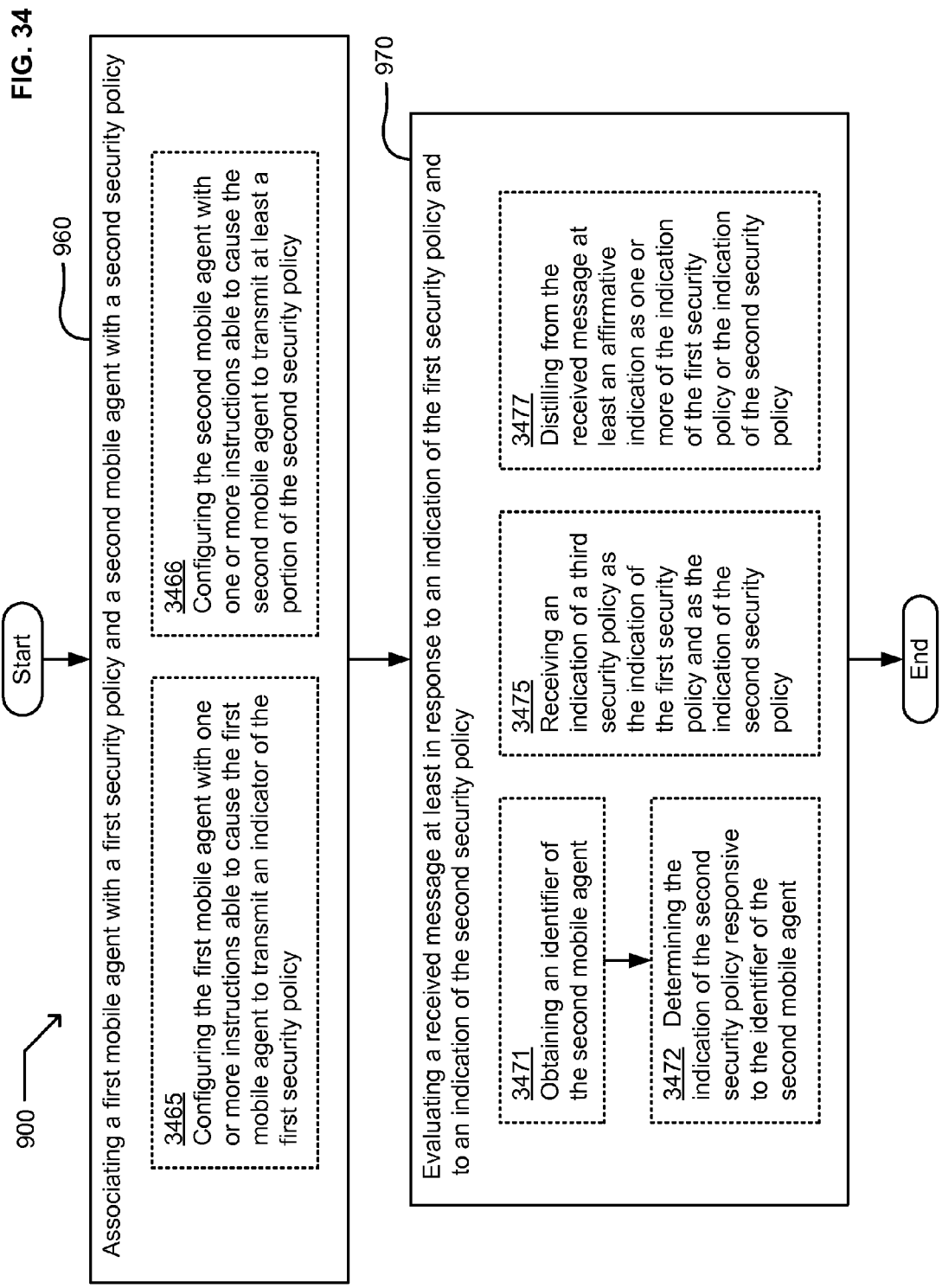

Referring now to FIG. 34, there are shown several variants of the flow 900 of FIG. 9 or 33. Operation 960—associating a first mobile agent with a first security policy and a second mobile agent with a second security policy—may include one or more of the following operations: 3465 or 3466. Operation 970—evaluating a received message at least in response to an indication of the first security policy and to an indication of the second security policy—may include one or more of the following operations: 3471, 3472, 3475, or 3477.

Operation 3465 describes configuring the first mobile agent with one or more instructions able to cause the first mobile agent to transmit an indicator of the first security policy (e.g. code generation circuitry 2135 creating module 1758 able to transmit policy identifiers 2157 indicating one or more policies 1797). This can occur, for example, in embodiments in which module 1758 implements the "first" mobile agent, in which core 1785 comprises subsystem 2100, in which at least part of evaluation module 2170 can perform operation 970, and in which channel 2110 can be coupled to transmit one or more of module 1758 or a message identifying the "first" security policy. Alternatively or additionally, the message can include a timestamp, a status, an event log, information about one or more processes 1794 or resources 2150 available at core 1785, or the like.

Operation 3466 describes configuring the second mobile agent with one or more instructions able to cause the second mobile agent to transmit at least a portion of the second security policy (e.g. code generation circuitry 2135 configuring the "second" mobile agent with one or more data integrity policies 2136 comprising policy definition logic 2158 such as executable virus scanners and other malware detection code). Alternatively or additionally, code generation circuitry 2135 can be configured to manipulate first mobile agent such as by performing operation 3465. In some embodiments, multiple instances of operation 3465 or 3466 can be performed in creating or dispatching a population of mobile agents so that more than one agent has information about other agents' security policies in a specific domain.

Operation 3471 describes obtaining an identifier of the second mobile agent (e.g. authentication logic 2183 interpreting data 2184 to identify the second mobile agent as a string of "Field__22" within data 2184). Data 2184 may indicate Field__22 as a sender or subject of data 2184, for example, in a scenario in which that agent was expected to remain anonymous. Alternatively or additionally, authentication logic 2183 can be configured to identify the second mobile agent implicitly by finding a sign of that agent in data 2184 (e.g. by intercepting a spyware message or the like identifying "Field__22" as locally resident).

Operation 3472 describes determining the indication of the second security policy responsive to the identifier of the second mobile agent (e.g. policy manager 2187 determining a "breached" status responsive to the above-described events.) Alternatively or additionally, the second security policy can include an alarm signal (e.g. transmitted to the second mobile agent via antenna 2165), an upgrade, or other security modification as the indication of the second security policy.

In other instances policy manager 2187 may receive an information request such as a function call asking for information about module 1759 (e.g. identifying the second mobile agent in an argument). Policy manager 2187 may be configured to respond by looking up the second security policy (e.g. as a table look-up function using policy list 2189), for example, and optionally by providing information about the second security policy to the requesting entity.

Operation 3475 describes receiving an indication of a third security policy as the indication of the first security policy and as the indication of the second security policy (policy manager 2187 receiving policy list 2189 containing several policies as the third security policy). In some embodiments, policy list 2189 may likewise be configured to include associations between the first and second security policies and one or more mobile agents or other modules. The associations may identify one or more of (a) a module that currently subscribes, (b) a module that is able to subscribe, (c) a module that has previously subscribed, to the first or second security policy. Alternatively or additionally, policy list 2189 may include supplemental information such as one or more pointers to confidentiality policies 2154, transaction integrity policies 2155, or other policy definition logic 2158 of resources 2150.

Operation 3477 describes distilling from the received message at least an affirmative indication as one or more of the indication of the first security policy or the indication of the second security policy (e.g. message parser 2191 gleaning from signals 2198 that type 1 policy 1798 is in effect in module 1753 and that type 2 policy 1799 is in effect in module 1751). This can occur, for example, in embodiments in which the message reports or instructs that type 1 policy 1798 and type 2 policy 1799 each provide some security. The message may include text such as "Policy_M2=1" or "ON," executable code or register bit values similarly signifying security activation, or similar representations of several types recognized by those skilled in the art. Alternatively or additionally, of course, the message can optionally signify one or more negative indications such as security policy deactivations.

Figure 35:
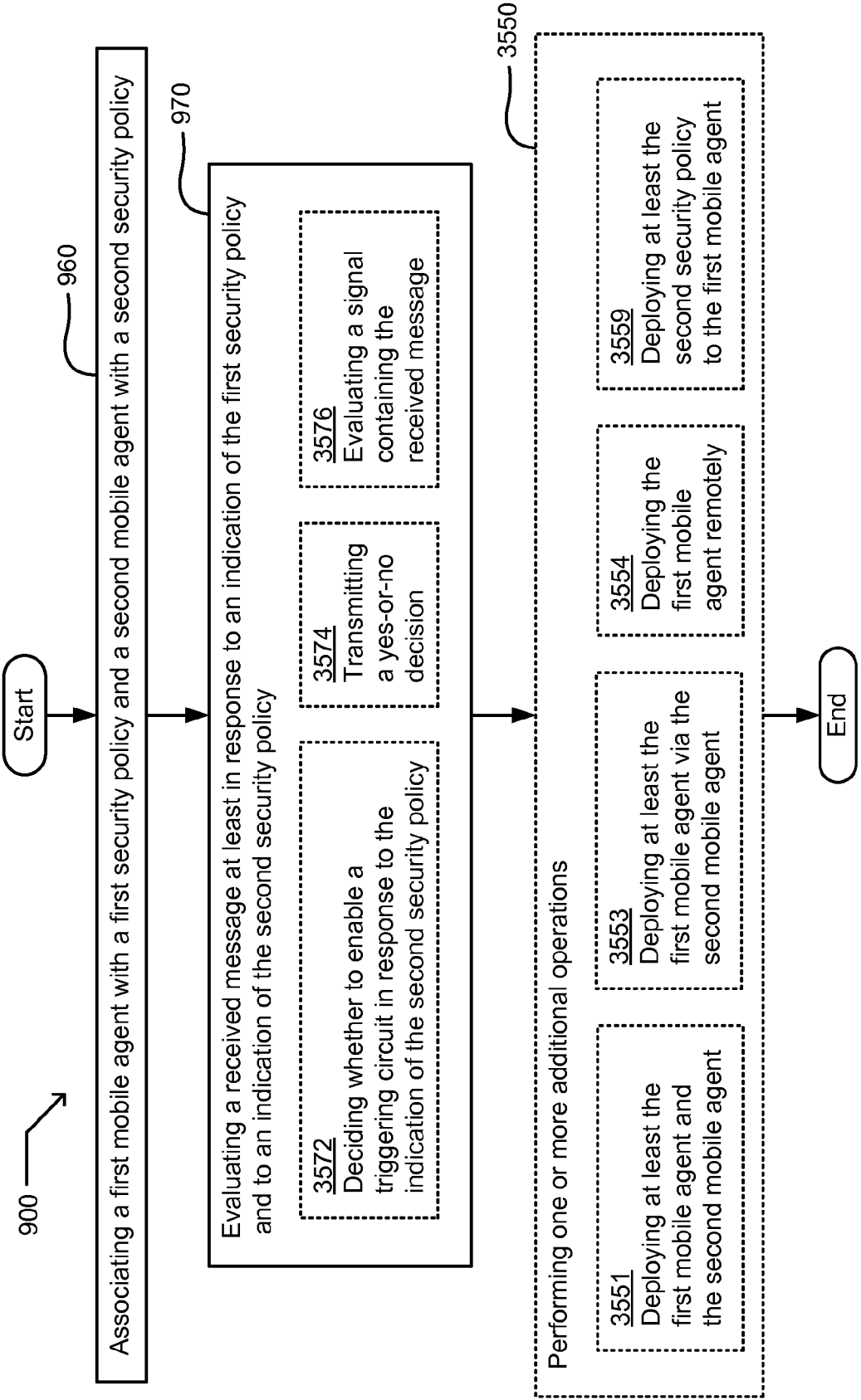

Referring now to FIG. 35, there are shown several variants of the flow 900 of FIGS. 9, 33, and 34. Operation 970—evaluating a received message at least in response to an indication of the first security policy and to an indication of the second security policy—may include one or more of the following operations: 3572, 3574, or 3576. Operation 3550—performing one or more additional operations—may include one or more of the following operations: 3551, 3553, 3554, or 3559.

Operation 3572 describes deciding whether to enable a triggering circuit in response to the indication of the second security policy (e.g. enable logic 2179 enabling some other portion of evaluation module 2170 in response to one or more indicators of type 2 policy 1799). This can occur, for example, in embodiments in which policy association module 2130 can perform operation 960, in which evaluation module 2170 can perform operation 970, in which enable logic 2179 is configured to enable triggering circuit 2178 in response to at least one potential value of the second security policy indication. In one such embodiment, type 2 policy 1799 defines a network interface enable bit having a "set" value (e.g. 1) to which enable logic 2179 responds by enabling network interface 2192. In some variants, type 2 policy 1799 can likewise define one or more other enable bits each respectively controlling access to one or more of resources 2150, signal evaluation circuitry 2171, authentication logic 2183, policy manager 2187, message handler 2190, or the like.

Operation 3574 describes transmitting a yes-or-no decision (e.g. positive response logic 2173 producing no output or otherwise signaling a negative decision). This can occur, for example, in response to an indication that first security policy circuitry 2138 requires messages to have a checksum of 3, that second security policy circuitry 2139 requires messages to have at most ten bytes, and that the received message is a 94-byte message having a checksum of 2. The negative decision in this example thus indicates the message apparently did not come from any agent with the first or second security policy. Alternatively or additionally, a yes-or-no decision can indicate whether an error has occurred, whether a policy has been employed, whether a task shall proceed, or whether some other hypothesis is supported by observations. Alternatively or additionally, the evaluation(s) can include a level or other non-Boolean outcome.

This can likewise occur in a variant in which the first and second security policies do not call the mobile agents to generate heartbeat signals, and in which the received message includes a heartbeat signal. The decision can thus indicate that the received message apparently did not come from the first or second mobile agent, for example. In some embodiments, such decisions can trigger a deployment (of a patch or diagnostic agent, e.g.) or be used as a basis for deciding whether to ignore a message. Alternatively or additionally, the message can indicate that one or more of the policies are to be ignored, for example, by virtue of module having disabled a policy. The message can likewise contain a policy dictating that other information is to be ignored such as trust indications, expected message protocols or the like.

Operation 3576 describes evaluating a signal containing the received message (e.g. message handler 2190 and signal evaluation circuitry 2171 jointly producing ranking 2174 or explanation 2176 responsive to receiving signals 2198). This can occur, for example, in embodiments in which packets, tasks, or other messages in the signal include priority-indicative data that can be used to rank them. The sample portion can include a digital signal decoded by a Viterbi detector or the like, for example. Alternatively or additionally, the responsive value can correlate with an error rate estimate, a confidence estimate relating to the received message, or other quality indicator(s). In some embodiments, some samples or portions of the signal can be disallowed so that the received message excludes them. Alternatively or additionally, such responsive values can be used as the evaluation(s) or further processed such as by one or more lookup tables to generate the scalar score, decision, or other evaluation.

Operation 3551 describes deploying at least the first mobile agent and the second mobile agent (e.g. deployment module 2160 deploying first agent 2161 and second agent 2162). This can occur, for example, in embodiments in which these agents are mobile. In some embodiments, they may be deployed into respective cores (e.g. 1781-1783) in direct mutual communication (respectively as modules 1755, 1754, e.g.). Alternatively or additionally, one or more of the modules may be deployed locally to deployment module 2160.

Operation 3553 describes deploying at least the first mobile agent via the second mobile agent (e.g. mobile deployment logic 2163 deploying first agent 2161 from second agent 2162). This can occur, for example, in embodiments in which the "first" agent is first deployed (e.g. as module 1753 into core 1782), which later in turn deploys the "second" agent (e.g. as module 1751 into core 1782). In some embodiments an originating agent includes evaluation module 2170, for example, including triggering circuitry 2178 for signaling when module 1751 should be deployed.

Operation 3554 describes deploying the first mobile agent remotely (e.g. deployment module 2160 and router 2168 jointly deploying first agent 2161 via one or more routes 2169). In an embodiment in which core 1785 includes subsystem 2100 configured to deploy first agent 2161 to core 1782, for example, routes 2169 can include numerous options even in the environment of subsystem 1700 (e.g. via core 1781; via cores 1786, 1787; via cores 1786, 1781, 1787; via cores 1786, 1781; via cores 1781, 1787; via cores 1784, 1781; via cores 1786, 1781, 1784, 1783; or via cores 1784, 1783). In some embodiments router 2168 implements one or more policies 1797 for controlling routes selected for deploying one or more portions of the first mobile agent. In one scenario, for example, the first mobile agent includes module 1757 in transit between core 1785 and core 1781 as a step toward deployment module 2160 performing operation 3554.

Operation 3559 describes deploying at least the second security policy to the first mobile agent (e.g. message handler 2190 deploying at least one of policies 2153 to first agent 2161, before or after deployment module 2160 deploys first agent). In various embodiments, the second security policy can include, activate, modify, transmit, perform or otherwise implement one or more logical blocks of the first mobile agent, for example.

Figure 36:
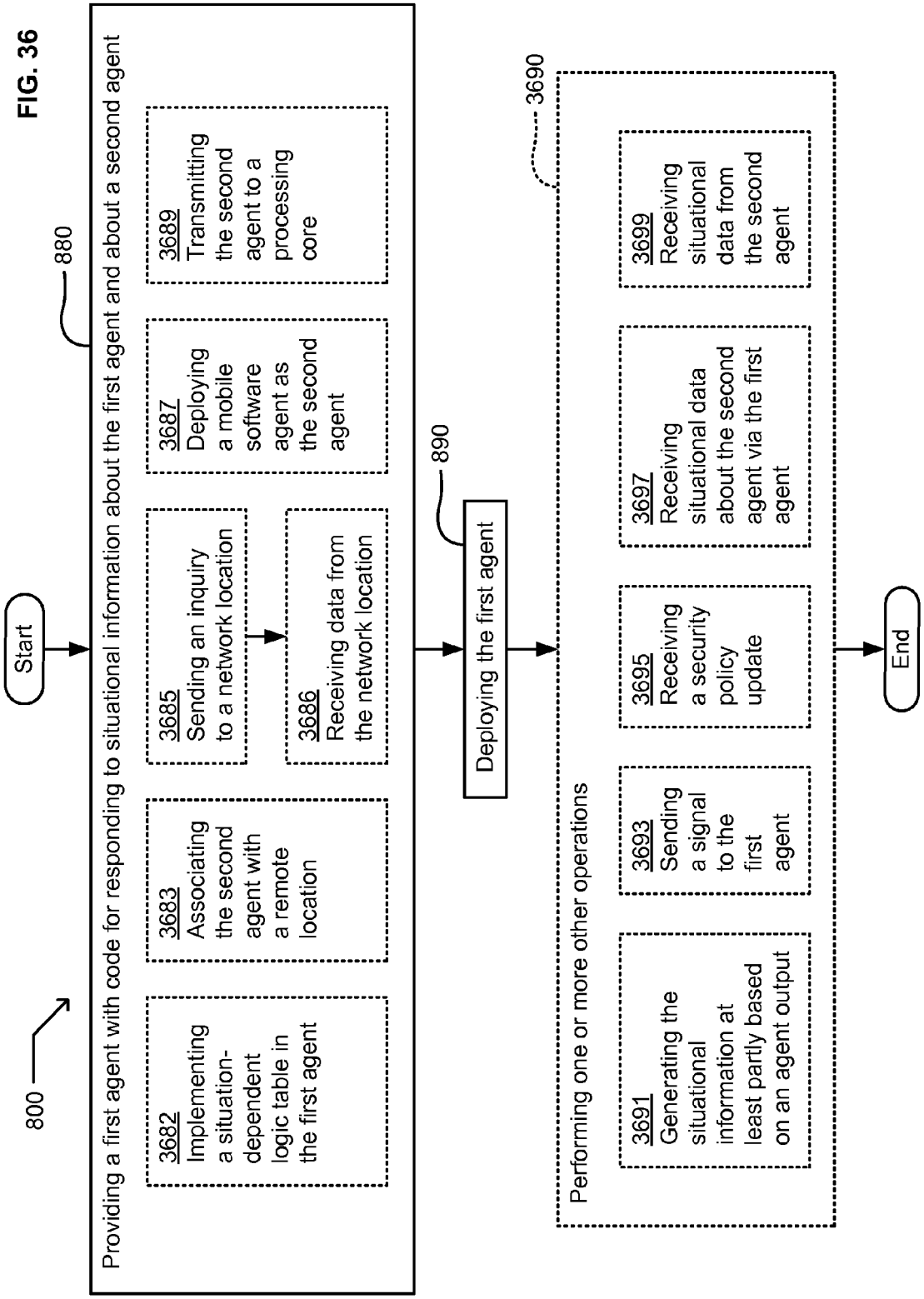
FIGS. 36-37 depict variants of the flow of FIG. 8.

Referring now to FIG. 36, there are shown several variants of the flow 800 of FIG. 8. Operation 880—providing a first agent with code for responding to situational information about the first agent and about a second agent—may include one or more of the following operations: 3682, 3683, 3685, 3686, 3687, or 3689. Operation 3690—performing one or more other operations—may include one or more of the following operations: 3691, 3693, 3695, 3697, or 3699.

Operation 3682 describes implementing a situation-dependent logic table in the first agent (e g linking module 2579 providing digital logic that generates one or more bits responsive to inputs that indicate a status of at least the first and second agent). This can occur, for example, in embodiments in which operation 880 is performed by agent configuration module 2580, in which operation 890 is performed by agent deployment module 2590, in which module 1751 implements the first agent, in which resources 1796 of module 1751 include the digital logic, and in which one or more portions of ASR 2530 or resources 2560 are configured to interact with module 1751. Each input can, in some embodiments, relate to only one of the agents of subsystem 1700. In other embodiments one or more of the inputs can jointly describe some aspect of more than one of the agents (e.g. a fault bit set when any agent signals a fault to linking, and otherwise generally not set). Alternatively or additionally, the situation-dependent logic table implementation can encode and depend upon situational aspects such as location, connection types and other aspects of resources, trust indications and other aspects of policies, resource and policy availability, active processes or controls, timestamps, version indicators, or the like.

Operation 3683 describes associating the second agent with a remote location (e.g. location designation logic 2582 locally identifying a remote core at which the second agent is or was situated). In some embodiments the second agent can include a mobile agent associated successively with a series of past or current remote locations such as may be specified by IP addresses. Alternatively or additionally, some remote locations associated with the second agent may include planned or potential locations within a directory structure. The first agent can optionally be configured to perform operation 3683, such as in an embodiment in which module 1751 implements the first agent, in which module 1752 implements the second agent, and in which one or more resources 1796 of module 1751 can perform the associating. This can enable a module in a more-trusted location to monitor a module in unknown location, in some situation, such as when core 1782 is more trusted than core 1781. Even without such trust information, though, positioning agents for monitoring other agents remotely can enhance operational safety.

Operation 3685 describes sending an inquiry to a network location (e.g. inquiry transmitter 2583 and network interface 2585 jointly polling nearby network locations to determine whether any have a specific resource). The specific resource can include one or more of a processing power surplus, an upgrade, electrical power, internet service, geographic information, surplus storage or the like, optionally within or otherwise controlled by a software module (e.g. resources 1796 controlled by module 1752). In some embodiments, the inquiry is broadcast to any available nodes of an ad hoc network. It will be understood, however, that many variants of flow 800 described herein can be implemented even in the absence of a network.

Operation 3686 describes receiving data from the network location (e.g. network interface 2585 and receiver 2565 receiving packet data from a network that includes subsystem 1700 via channel 2510). This can occur, for example, in embodiments in which agent configuration module 2580 and resources 2560 jointly perform operation 880, in which at least ASR 2530 is configured to perform operation 890, and in which in which the data can be treated as a response to the inquiry or otherwise as resource-indicative data.

Operation 3687 describes deploying a mobile software agent as the second agent (e.g. allocation manager 2589 moving an executable portion of module 1752 into memory and triggering one or more processes 1794 leading to a departure of module 1752 from core 1781). The one or more processes 1794 can serve other roles as exemplified herein, for example, in module 1752 or other modules of subsystem 1700 as shown. Alternatively or additionally, operation 3687 may comprise deploying the mobile software agent at a remote core or other location outside the core at which allocation manager 2589 operates (e.g. outside core 1781).

Operation 3689 describes transmitting the second agent to a processing core (e.g. deployment manager 2587 sending module 1757 to a core able to perform one or more data-transformative operations.) The data-transformative operations can include one or more of encrypting, compiling, compressing, or multiplexing, for example. This can occur, for example, in embodiments in which subsystem 2500 resides locally at the processing core (e.g. core 1785). Alternatively or additionally, router 2593 can be used to transmit the second agent through one or more data relay cores or the like in an ad hoc network, which need not be configured to perform any processing of the second agent.

Operation 3691 describes generating the situational information at least partly based on an agent output (e.g. evaluator 2561 determining that an agent's environment is normal responsive to an absence of alerts or to an expected output from the agent). The expected output can include an outcome from a negotiation or other task, timestamps, visited locations or other provenance data, a heartbeat, gathered data or the like, for example. The evaluator can incorporate expectation logic (not shown) defining criteria by which the agent output is to be judged, suitable examples of which are readily available to those skilled in the art.

Operation 3693 describes sending a signal to the first agent (e.g. transmitter 2562 sending signal 2563 via port 2564 as one or more resources 1796 to module 1754). Signal 2563 can include an executable module that resides alongside the first agent in a common core, for example (e.g. by using module 1755 for updating module 1752 in core 1781). Alternatively or additionally, signal 2563 can include virus vectors, resource definition data, price negotiation data or other comparative information for use by the first agent for performing a primary function (e.g. price negotiation or related research) or secondary function (e.g. a mobile agent firewall or network topology discovery). In some embodiments, signal 2563 includes a heartbeat, a location identifier, a password or other mechanism for communicating with another agent, or other resources. In some embodiments, the signal is likewise sent to the second or other agents (e.g. in a broadcast operation by transmitter 2562).

Operation 3695 describes receiving a security policy update (e.g. receiver 2565 receiving agent output 2569 indicating a revision of a security mechanism of subsystem 2500 or an agent residing there). In some embodiments, the update can simply be a change to a version number in a record describing the agent or the core in which it operates. Alternatively or additionally, the update can include a module implementing the security policy update, such as a replacement for an executable decryption module or the like.

Operation 3697 describes receiving situational data about the second agent via the first agent (e.g. receiver 2565 receiving relayed data 2566 about module 1758 via module 1759). This can occur, for example, in embodiments in which module 1759 implements the "first" agent, in which module 1758 implements the "second" agent, and in which the first agent monitors, receives, or otherwise gleans situational data about the first agent. In some embodiments, the second agent resides within or near the first agent (i.e. at core 1785) and distills a concise inference about the situation of the first agent. The inference can include an indication of trust or risk, for example, responsive to a reaction time, ownership, task attribute, connection type, resource status, or other aspect of core 1785.

Operation 3699 describes receiving situational data from the second agent (e.g. receiver 2565 receiving situational input 2567 describing computing environment attributes relating to a domain including the second agent). Alternatively or additionally, the first agent can relay or otherwise receive the data from the second agent (e.g. ASR 2530 receiving the situational data from the second agent as message input 2541, optionally discarding some of the data and relaying other parts as message output 2542).

Figure 37:
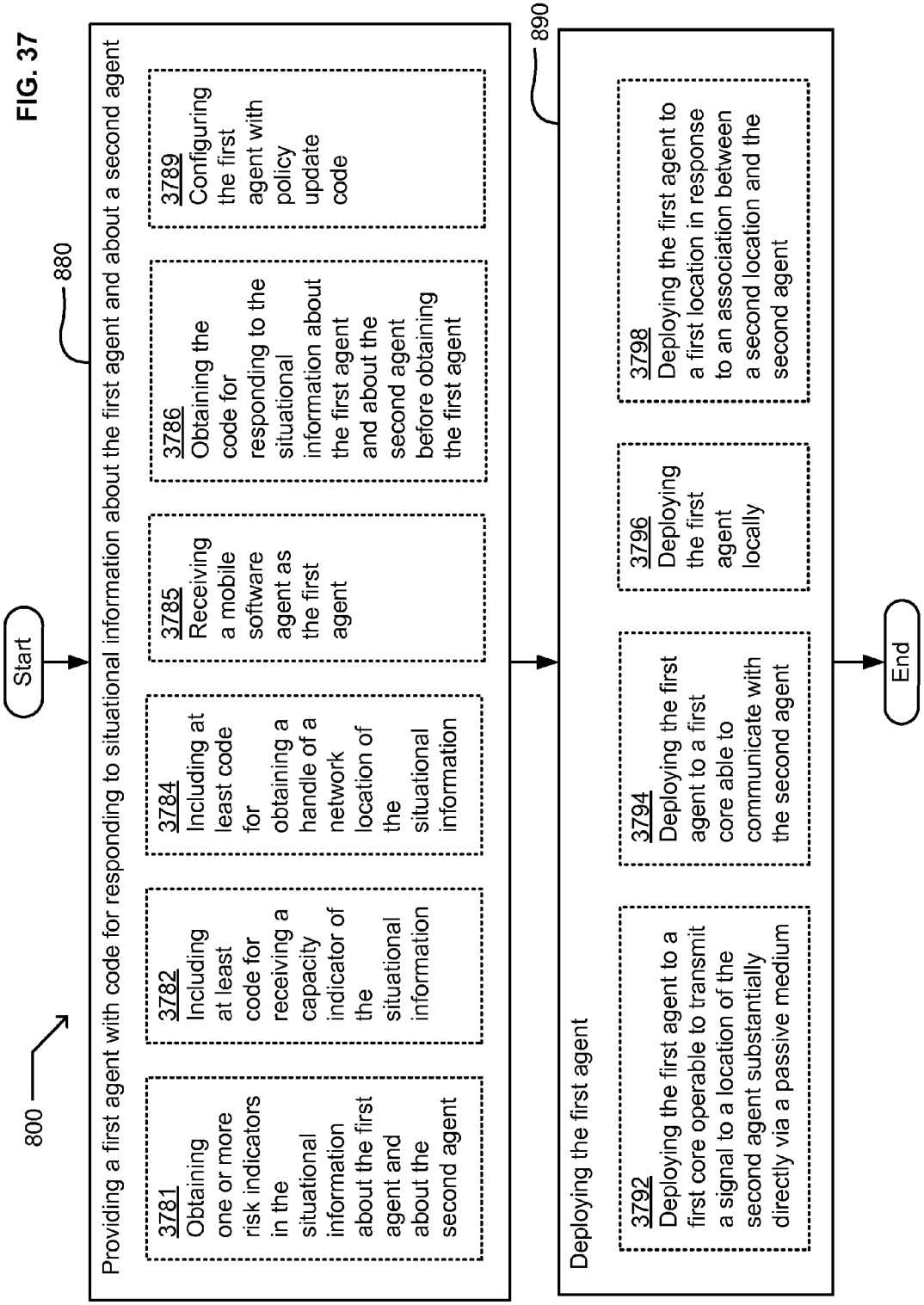

Referring now to FIG. 37, there are shown several variants of the flow 800 of FIG. 8 or 36. Operation 880—providing a first agent with code for responding to situational information about the first agent and about a second agent—may include one or more of the following operations: 3781, 3782, 3784, 3785, 3786, or 3789. Operation 890—deploying the first agent—may include one or more of the following operations: 3792, 3794, 3796, or 3798.

Operation 3781 describes obtaining one or more risk indicators in the situational information about the first agent and about the second agent (e.g. implementer 2570 with risk dependency logic 2572 receiving raw vulnerability data such as an indication of a successful remote access). In some embodiments, risk indicators can be summarized or presented in conjunction with a responsive action such as an executable security protocol update module that can directly modify one or more of the agents. Alternatively or additionally, the obtained risk indicators can be distilled into more concise risk indicators (e.g. "medium" risk or "R=2" to a denial-of-service-type attack) for aggregation or transmission to a remote network management site. Those skilled in the art can readily implement such functions in light of teachings herein and of the general methodologies used, for example, in common vulnerability evaluation software such as Nessus (see NESSUS.COM), GFI LANguard (see GFI-.COM), ISS Internet Scanner (see ISS.NET) or the like.

Operation 3782 describes including at least code for receiving a capacity indicator of the situational information (e.g. implementer 2570 with capacity dependency logic 2574 indicating a quantity of computational, storage, carrying or other capacity currently or potentially available). The capacity indicator can (optionally) include a count, percentage, or vector-valued entity. Alternatively or additionally, the included value can indicate a capacity indirectly, such as by giving a cores' response time in milliseconds as an indicator of its available capacity.

Operation 3784 describes including at least code for obtaining a handle of a network location of the situational information (e.g. implementer 2570 with location dependency logic 2573 remotely or locally invoking a utility that generates one or more addresses). The utility can function like TCPView or Netstat, for example, generating one or more addresses for each of several connections or processes or the like.

Operation 3785 describes receiving a mobile software agent as the first agent (e.g. memory manager 2576 receiving at least a portion of module 1755 into memory 2575 responsive to receiver 2577 receiving at least the portion from outside subsystem 2500). The can occur, for example, in embodiments, in which core 1781 implements subsystem 2500, in which agent configuration module 2580 is configured to perform operation 880 by receiving part or all of the mobile software agent into module 1755 piecemeal, and in which ASR 2530 is configured to perform operation 890.

Operation 3786 describes obtaining the code for responding to the situational information about the first agent and about the second agent before obtaining the first agent (e.g. memory manager 2576 and receiver 2577 jointly receiving receiver 2565 for inclusion in the "first" agent). In some implementations, operation 3786 can later be completed by code generator 2578 and memory manager 2576 jointly generating the first agent by assembling components in memory 2575 with received receiver 2565.

Operation 3789 describes configuring the first agent with policy update code (e.g. receiver 2577 and code generator 2578 implementing malware-indicative or other anomaly signature data in one or more controls 1795 operable to update a policy in module 1757). Controls 1795 for updating policies 1797 can be implemented as one or more code blocks, one or more executable instructions for modifying controls 1795 that configure a policy, one or more assignments or replacement values, or the like such as are known by those skilled in the art. In some implementations policies 1797 employed by processes 1794 are pervasively controlled by software switches, for example, for reducing the necessity of replacing executable code.

Operation 3792 describes deploying the first agent to a first core operable to transmit a signal to a location of the second agent substantially directly via a passive medium (e.g. transmitter 2591 depositing module 1754 in core 1783 directly coupled to core 1782 via one or more passive media 1712). In the configuration as shown, the "second" agent can comprise module 1751 or module 1753. In some embodiments the substantially direct couplings can include one or more of an antenna, an optical fiber, a wire, a free space medium or the like, without active interstitial elements such as network nodes.

Operation 3794 describes deploying the first agent to a first core able to communicate with the second agent (e.g. at least router 2593 and network connectivity table 2599 jointly deploying module 1755 into core 1781). This can occur, for example, in embodiments in which the "second" agent includes module 1751, module 1752, or some other module that network connectivity table 2599 indicates as having a suitable linkage to module 1755.

Operation 3796 describes deploying the first agent locally (e.g. at least location designation logic 2598 deploying module 1751 locally into core 1782). This can occur, for example, in an embodiment in which at least some of subsystem 2500 resides in core 1782. Module 1753 can optionally be configured to contain subsystem 2500 in some embodiments, for example. Such a "local" deployment can likewise include sending module 1751 locally to another core implemented on a common integrated circuit with at least a portion of agent deployment module 2590.

Operation 3798 describes deploying the first agent to a first location in response to an association between a second location and the second agent (e.g. deployment module 2160 sending first agent 2161 to core 1781 rather than to core 2691 responsive to an indication that second agent 2162 has been routed to core 1782). This can occur, for example, in embodiments in which a current location of the second agent is unknown or in which the domain of each core is known. In some embodiments the first location is selected to be remote from the second location, such as those in which deployment module 2160 implements a dispersion of related agents that favors a first deployment into each listed domain over other deployments. Alternatively or additionally, in some embodiments, a decision to place the first agent into a domain (e.g. subsystem 1700) can depend at least partly on an indication of whether one or more functionally related agents exist within the domain. See U.S. patent application Ser. No. 11/396,396 ("Code Installation Decisions for Improving Aggregate Functionality") filed 31 Mar. 2006 by Cohen et al., commonly assigned herewith, and incorporated herein by reference to the extent not inconsistent with this document.

Figure 38:
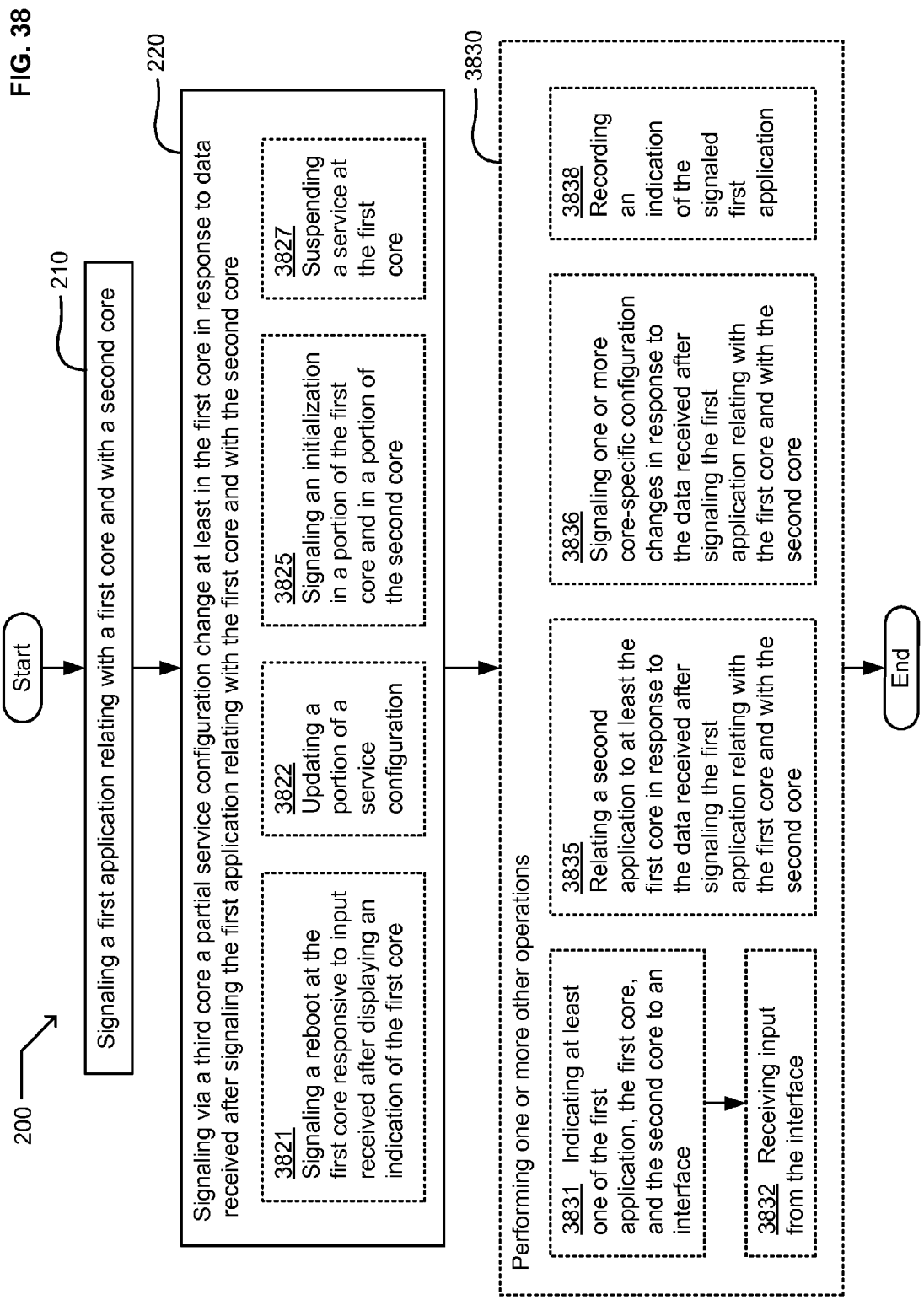
FIGS. 38-42 depict variants of the flow of FIG. 2.

Referring now to FIG. 38, there are shown several variants of the flow 200 of FIG. 2. As shown, operation 210 describes signaling an application relating with a first core and with a second core. Operation 220—signaling via a third core a partial service configuration change at least in the first core in response to data received after signaling the first application relating with the first core and with the second core—may include one or more of the following operations: 3821, 3822, 3825, or 3827. Operation 3830—performing one or more other operations—may include one or more of the following operations: 3831, 3832, 3835, 3836, or 3838.

Operation 3821 describes signaling a reboot at the first core responsive to input received after displaying an indication of the first core (e.g. control utility 2661 sending an acknowledgment to one or more output devices 2609 responsive to a reboot instruction from one or more input devices 2608). This can occur, for example, after control utility 2661 sends an instruction causing group depicter 2614 to show a graphical display depicting at least core 2691, and after control utility 2661 receives an indication of a user instruction to reboot core 2691. In some scenarios, the instruction to reboot the first core can be received as a menu selection or an acceptance of a suggestion to reboot the first core presented at one or more output devices 2609, such as by option depicter 2617. Alternatively or additionally, the first core reboot can be effectuated by core reset logic 2548 transmitting a reset signal to the first core (core 2691, e.g.). This can occur, for example, in embodiments in which channel 2510 is operably coupled with power supply 2604

Operation 3822 describes updating a portion of a service configuration (e.g. servicelet app 2667 upgrading a library or other resources 2696 of application 2697). In some embodiments, servicelet app 2667 can perform such an upgrade as a portion of an appnet-wide or tier-wide upgrade (of appnet 1062 or tier 1002, e.g., in an embodiment in which the modules 1011-1059 of domain 1000 of FIG. 10 comprise cores 2691-2693 of cluster 2690 of FIG. 19).

Alternatively or additionally, in some embodiments, adapter app 2666 contemporaneously provides one or more instances of integration module 2676 as resources 2696 that enable interaction with a remaining portion of the service configuration of the first core (core 2691, e.g.). Such resources 2696 can include message transformation modules such as are known by those skilled in the art, commercially available from providers such as RosettaNet, ebXML, or SAP. Alternatively or additionally, resources 2696 can include HTTP, HTTPS, SOAP, SMTP, or other transport protocols such as are known by those skilled in the art.

Operation 3825 describes signaling an initialization in a portion of the first core and in a portion of the second core (e.g. function interface module 2677 initiating at least two processes 2694 of application 2698 as shown). This can occur, for example, in an embodiment in which appnet depicter 2613 can perform operation 210 and in which servicelet app 2667 can perform operation 220 (alone or in combination with core 2693, e.g.).

Operation 3827 describes suspending a service at the first core (e.g. halt logic 2427 setting one or more controls 2695 of remote subsystem 2490 to cause one of the processes 1794 to pause, such as in response to an instruction to pause a print job). In some configurations this can likewise be performed by implementer 2662 altering one of controls 2695 of core 2692 to disable another of controls 2695 or to deny access to a specific requester or the like. Alternatively or additionally, in some embodiments, operation 3827 can be performed effectively by removing or denying access to resources (e.g. policy app 2669 signaling core 2693 with instructions to take one or more resources 2696 controllable by core 2693 offline).

Operation 3831 describes indicating at least one of the first application, the first core, and the second core to an interface (e.g. message handling module 2678 indicating a relationship between application 2698, core 2691, and core 2692 by showing names or symbols of each at interface 2607). This can occur, for example, in embodiments in which control utility 2661 can perform operation 210, in which appnet manager 2653 can perform operation 220, and in which at least routelet app 2668 can perform operation 3830. Alternatively or additionally, message handling module 2678 can display a graphical relationship like that of FIG. 1, optionally including additional features to indicate process activity, resource availability, or one or more controls 2695 available to a user at interface 2607.

Operation 3832 describes receiving input from the interface (e.g. function interface module 2677 receiving a menu selection or button activation from interface 2607). Alternatively, in an embodiment of FIG. 11, Network Interface Card 1168 can receive addressing and payloads relating the application to the RTE's 1186, 1187, 1188 via signal-bearing medium 1270 of FIG. 12). The addressing can include layered logical or physical addresses in some embodiments. In embodiments like that of FIG. 12, payloads (app payload 1258, e.g.) can likewise include application data or program code (e.g. rules). This can occur in variants of FIG. 11, for example, in which dispatcher 1110 routes such relation-indicative information to queue 1105 for storage or to queue 1108 for processing.

Alternatively or additionally, in some scenarios, RCP 1180 receives the content of one or more messages 1161 via queue 1108. This can occur, for example, by dispatcher 1110 and RCP 1180 jointly applying one or more priority criteria 1182 for a next-available one of the RTE's 1186, 1187, 1188 so that RCP 1180 generates a highest priority task of queue 1108 based on the content of message 1161. RCP 1180 can then assign each next-available runtime engine (RTE 1187, e.g.) to become an instance of processor 1130 assigned to process the content (by writing data to routing table 1183, e.g.).

Operation 3835 describes relating a second application to at least the first core in response to the data received after signaling the first application relating with the first core and with the second core (e.g. engine dispatcher 1185 of FIG. 11 adding RTE 1188 to portal appnet 1324 of FIG. 13). This can occur, for example, in embodiments in which the "other" application is the portal application, in which RTE 1188 implements database server 1342, in which Network Interface Card 1168 can perform operation 210, in which RCP 1180 can perform operation 220, and in which application processor 1189 can perform operation 3830. Such a relation may be advantageous, for example, in embodiments in which engine dispatcher 1185 determines that database server 1342 has surplus processing, memory, or storage capacity needed by the "other" application.

Operation 3836 describes signaling one or more core-specific configuration changes in response to the data received after signaling the first application relating with the first core and with the second core (e.g. policy app 2669 configuring rule handler 2679 to implement a restart of one or more processes 2694 within core 2692 responsive to an error message). This can occur, for example, in an embodiment in which core 2692 is the first or second core of flow 200, in which the data received indicates a code or configuration update, in which appnet manager 2653 can perform operation 210, and in which control utility 2661 can perform operation 220.

Operation 3838 describes recording an indication of the signaled first application (e.g. dispatcher 1110 queuing an application-indicative record in queue 1105 for writing into storage 1154). This can occur, for example, in embodiments in which dispatcher 1110 responds to one or more messages 1161 indicating that application processor 1189 is acting on the application or its appnet. Alternatively, variants of domain 2601 as described herein can include data manager 2644 configured to record one or more instances of applications signaled, such as for network monitoring to facilitate analysis of faults within network 2600.

Figure 39:
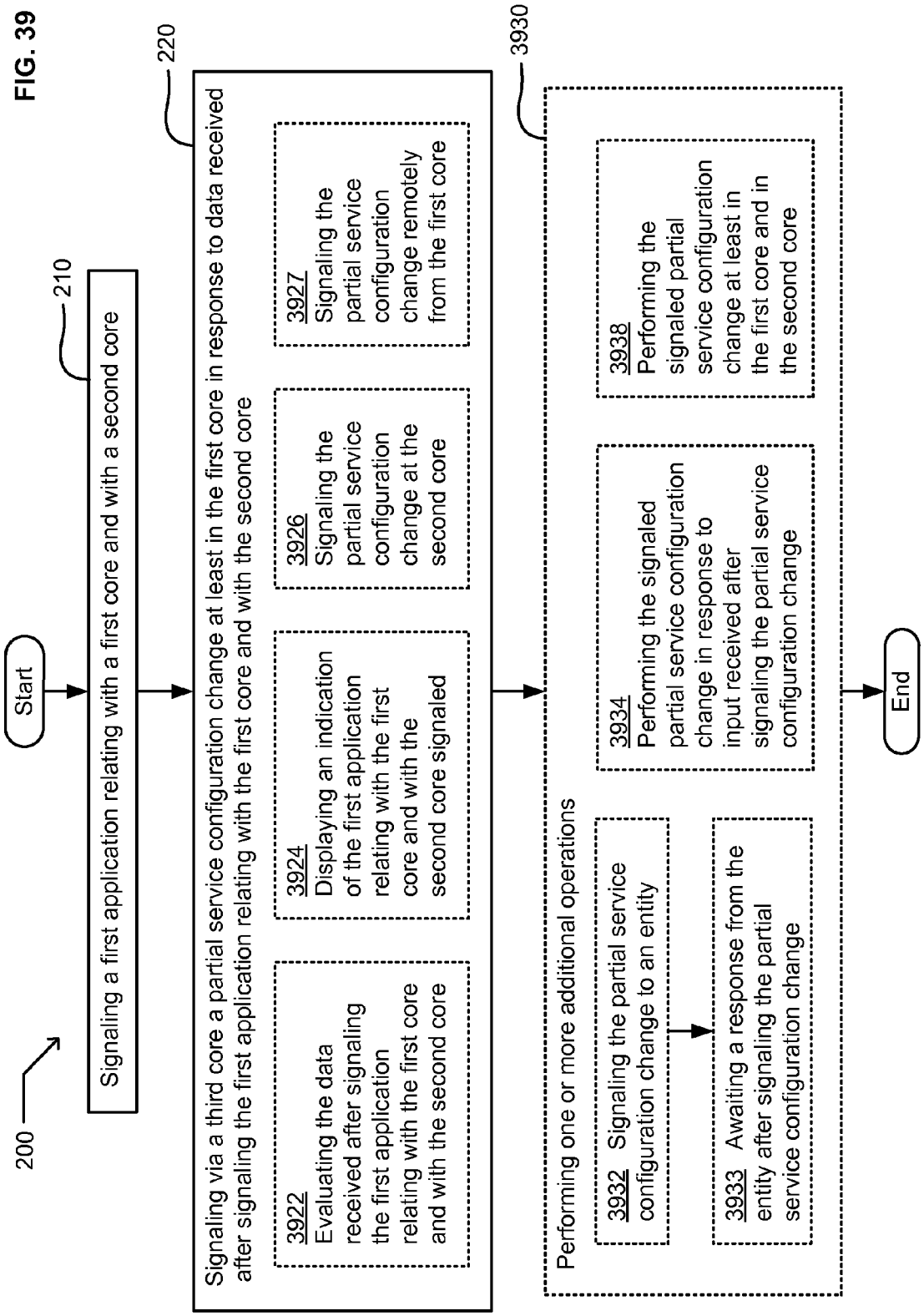

Referring now to FIG. 39, there are shown several variants of the flow 200 of FIG. 2 or 38. Operation 220—signaling via a third core a partial service configuration change at least in the first core in response to data received after signaling the first application relating with the first core and with the second core—may include one or more of the following operations: 3922, 3924, 3926, or 3927. Operation 3930—performing one or more additional operations—may include one or more of the following operations: 3932, 3933, 3934, or 3938.

Operation 3922 describes evaluating the data received after signaling the first application relating with the first core and with the second core (e.g. input devices 2608 of FIG. 26 confirming that received keystrokes constitute a valid password or other authorization for the partial service configuration change earlier presented by appnet manager 2653 via output devices 2609). This can occur, for example, in embodiments in which interface 2607 is secure, and in which interface 2607 and control utility 2661 jointly perform operation 220. Alternatively or additionally, ASR 2650 can perform operation 3922 such as by control utility 2661 evaluating biometric data or other raw data from input devices 2608 (e.g. from sensing devices such as a camera or microphone) or by appnet manager 2653 receiving user input triggering appnet configuration changes.

Operation 3924 describes displaying an indication of the first application relating with the first core and with the second core signaled (e.g. resource depicter 2618 sending a display screen a schematic mapping between a distributed "Network Manager" application and cores 2691, 2692 on which it runs). This can occur, for example, in embodiments in which output devices 2609 comprise the display screen, in which the third core implements subsystem 2610, in which appnet depicter 2613 and the display screen jointly perform operation 220, and in which the schematic mapping includes names of one or more processes 2694 of the "Network Manager" application. In some embodiments, such a schematic mapping can be implemented in a layout form (like that of FIG. 1, e.g.), in a table form (like that of object directory 2643, e.g.), in a tiered form (like that of FIG. 13, e.g.) or the like.

Operation 3926 describes signaling the partial service configuration change at the second core (e.g. application processor 1189 signaling RTE 1187 that protocol handler 1131 has been assigned to Intermediate Processing Center 1138 as the partial service configuration change in the "first" core). This can occur, for example, in embodiments in which RTE 1187 is the "second" core, in which application processor 1189 obtains the assignment information from facts dictionary 1181, and in which RCP 1180 can perform operation 220.

Operation 3927 describes signaling the partial service configuration change remotely from the first core (e.g. application processor 1189 indicating the partial service configuration change at least 100 meters from the remainder of system 1100). This can occur, for example, in embodiments in which the "first" core is processor 1130 and in which RCP 1180 accesses processor 1130 and RTE's 1186, 1187, 1188 only through a network (not shown) by writing a suitable set of values to routing table 1183. Those skilled in the art will appreciate that many existing protocols and methodologies for network routing can be used in this context in light of teachings herein.

Operation 3932 describes signaling the partial service configuration change to an entity (e.g. option depicter 2617 providing a menu option like "authorize partial service transfer" to a user or other authorization agent at interface 2607). For example, the partial service transfer may signify transferring one of the processes 2694 of core 2692 to core 2693 at least partially. Alternatively or additionally, platform 1300 of FIG. 13 can be configured so that development group 1334 can request app server 1346 for a managerial confirmation authorizing a priority increase for servicing requests from database server 1342 on behalf of trusts domain 1314. In some embodiments, acceptance of such a selective refinement may be a sufficiently localized disruption to warrant consideration even in contexts in which a whole-server, whole-domain service configuration change would not.

Operation 3933 describes awaiting a response from the entity after signaling the partial service configuration change (e.g. control utility 2661 postponing an effectuation of a response to the above-mentioned menu option until a timeout occurs or until an explicit affirmation or rejection of the option is received). In some embodiments, a timeout occurs after a period of time (a minute or an hour, e.g.) and triggers a default action. Default action(s) may include changing a configuration of output devices 2609, recording the occurrence of the timeout, or treating the timeout as a default affirmation or rejection, for example.

Operation 3934 describes performing the signaled partial service configuration change in response to input received after signaling the partial service configuration change (e.g. input-responsive configuration logic 2473 repartitioning storage medium 2478 in response to one or more user-entered values 2474 after imaging device 2476 displays a menu option, a command prompt, a query, a form page or the like for accepting the user entries). In some embodiments, implementer 2662 can likewise be configured to perform operation 3934 by initiating a process migration responsive to a confirmation of a user-selected or other proposed action. Alternatively or additionally, the input can include routing information, reservation or other resource information, timing information or a default value, or other parameters triggering or facilitating the signaled partial service configuration change. This can occur, for example, in embodiments in which group depicter 2614 is configured to perform operation 210 and in which option depicter 2617 is configured to perform operation 220.

Operation 3938 describes performing the signaled partial service configuration change at least in the first core and in the second core (e.g. local configuration logic 2475 changing a priority or resource allocation for processes 1794 in remote subsystem 2490 and in core 1785). This can occur, for example, in embodiments in which first signaling module 2410 performs operation 210, in which second signaling module 2420 performs operation 220, and in which subsystem 1700 is within local subsystem 2401.

Optionally, the configurations changed in this way can all pertain directly to a common application (application 2698, e.g.). This can occur, for example, in embodiments in which group depicter 2614 can perform operation 210 and in which option depicter 2617 can perform operation 220. Those skilled in the art will recognize that the flows described herein can readily support a variety of sequential variations so that, for example, operation 3938 can be performed before, between or during various portions of operation 220.

Figure 40:
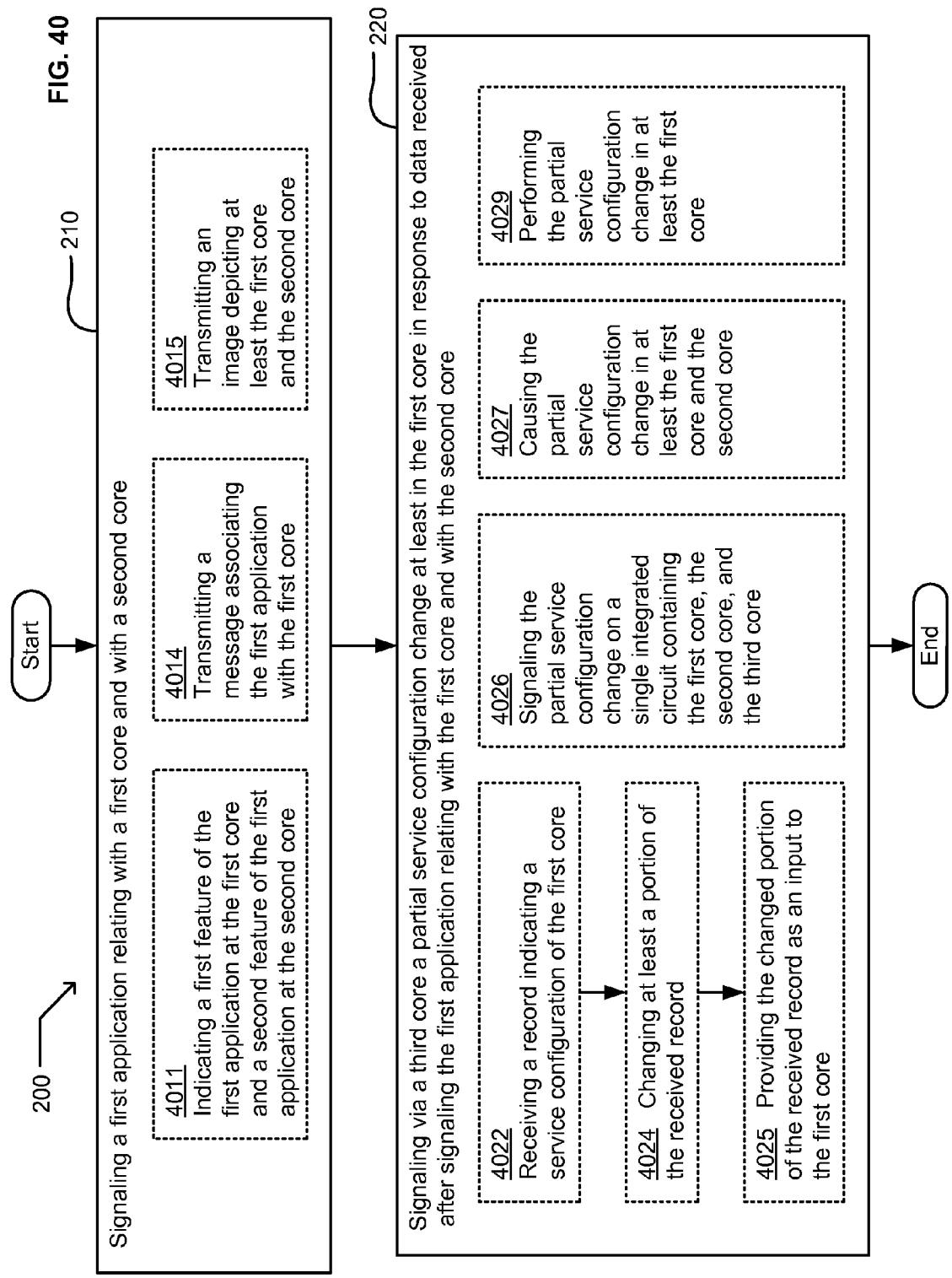

Referring now to FIG. 40, there are shown several variants of the flow 200 of FIG. 2, 38 or 39. Operation 210—signaling a first application relating with a first core and with a second core—may include one or more of the following operations: 4011, 4014, or 4015. Operation 220—signaling via a third core a partial service configuration change at least in the first core in response to data received after signaling the first application relating with the first core and with the second core—may include one or more of the following operations: 4022, 4024, 4025, 4026, 4027, or 4029.

Operation 4011 describes indicating a first feature of the first application at the first core and a second feature of the first application at the second core (e.g. service directory 2642 indicating identifiers 2603 and definitions 2602 of one or more processes 2694 in core 2691 and one or more processes in core 2692). This can occur, for example, in embodiments in which at least group depicter 2614 or resource depicter 2618 perform operation 210 and in which at least data manager 2644 can perform operation 220. In some embodiments, feature-indicative data from service directory 2642 are retrieved and arranged by message handling module 2678, for example, and sent to one or more output devices 2609. Alternatively or additionally, the features can likewise include controls 2695 or resources 2696.

Operation 4014 describes transmitting a message associating the first application with the first core (e.g. ASR 2620 sending a record from service directory 2642 associating a "Trade Clearing" application with a "Web Server" core). This can occur, for example, in embodiments implementing FIG. 13 and FIG. 19 in combination, in which core 2691 implements web server 1341, in which core 2692 implements database server 1342, in which subsystem 2610 is configured to perform operation 210, and in which subsystem 2610 or interface 2607 is configured to perform operation 220.

Operation 4015 describes transmitting an image depicting at least the first core and the second core (e.g. one or more output devices 2609 transmitting a core-indicative image in a layout form, a table form, a tiered form, or the like). The core-indicative image can show predictive, historical, hypothetical, or other hardware or software modules such as modules 1011-1059 of FIG. 10 or clusters such as that of FIG. 13, for example. In some embodiments, portions of the image depicting at least some cores each substantially overlaps or otherwise identifies a selectable display screen control relating to that core (an icon, e.g.).

Operation 4022 describes receiving a record indicating a service configuration of the first core (e.g. record receiver 2421 receiving from module 1758 information about one or more policies 1797 or processes 1794 resident in one or more cores of remote subsystem 2490). This can occur, for example, in embodiments in which first signaling module 2410 performs operation 210 and in which second signaling module 2420 performs operation 220.

In the variant of FIG. 26, message handling module 2678 can likewise perform operation 4022 by receiving from cluster 2690, directly or indirectly, definitions of some or all of the processes 2694, controls 2695, and resources 2696 of core 2692. In some embodiments, such records arrive periodically or occasionally from remote cores to ASR 2620, which can store them in service directory 2642 routinely or in response to one or more criteria of rule handler 2679. This can be facilitated, for example, by launching one or more mobile apps or other processes 2694 into a remote core of cluster 2690 (core 2692, e.g.) configured to aggregate and transmit cluster status and configuration information.

Operation 4024 describes changing at least a portion of the received record (e.g. control utility 2661 editing or reassigning one or more of the above-referenced definitions in a local copy of a received record such as app payload 1258). The change may define a change to some or all of the processes 2694, controls 2695, and resources 2696 of core 2692 without implementing them, for example.

Operation 4025 describes providing the changed portion of the received record as an input to the first core (e.g. implementer 2662 transmitting the above-referenced received and changed record to core 2692). Alternatively or additionally, implementer 2662 can implement the change by sending the change to some other core (such as core 2693, e.g., in some embodiments) that controls the operation of the first core. In some embodiments, one or more of operations 4022 through 4025 can thus effectuate one or more of a process change (to a security protocol, e.g.) or a resource change (to a processor or memory allocation, e.g.) to core 2692 or its operation.

Operation 4026 describes signaling the partial service configuration change on a single integrated circuit containing the first core, the second core, and the third core (e.g. engine dispatcher 1185 allocating RTE's 1186, 1187, 1188 in an embodiment in which a single processor chip includes a complete instance of system 1100). In some embodiments, a programmable general-purpose chip implements a variant of system 1100 as taught herein, such as by implementing RCP 1180 and the like in software.

Operation 4027 describes causing the partial service configuration change in at least the first core and the second core (e.g. delegation logic 2477 triggering module 1758 to install a firewall upgrade to each of several cores of remote subsystem 2490). This can occur, for example, in embodiments in which first signaling module 2410 and resources 2470 jointly perform operation 210, in which second signaling module 2420 performs operation 220, and in which remote subsystem 2490 is configured with several cores.

In the variant of FIG. 26, message handling module 2678 can likewise perform operation 4027 by deploying mobile agents or other code blocks that implement a security configuration change to processes 2694 or otherwise to one or more cores 2691-2693. Alternatively or additionally, message handling module 2678 can cause such a change by sending one or more messages like that of FIG. 12 to software agents resident in cluster 2690.

Operation 4029 describes performing the partial service configuration change in at least the first core (e.g. core configuration logic 2425 performing the change upon the at least one core in remote subsystem 2490 via linkage 2481). This can occur, for example, in embodiments in which at least first signaling module 2410 performs operation 210, in which at least second signaling module 2420 performs operation 220, and in which remote subsystem 2490 is at least configured with the "first core."

In the variant of FIG. 26, implementer 2662 can likewise perform operation 4029 (e.g. by causing processes 2694 of application 2697 to install an encryption or decryption utility as one or more resources 2696 of application 2698 in core 2691). Alternatively or additionally, such resources may be made available to other entities such as application 2697.

Figure 41:
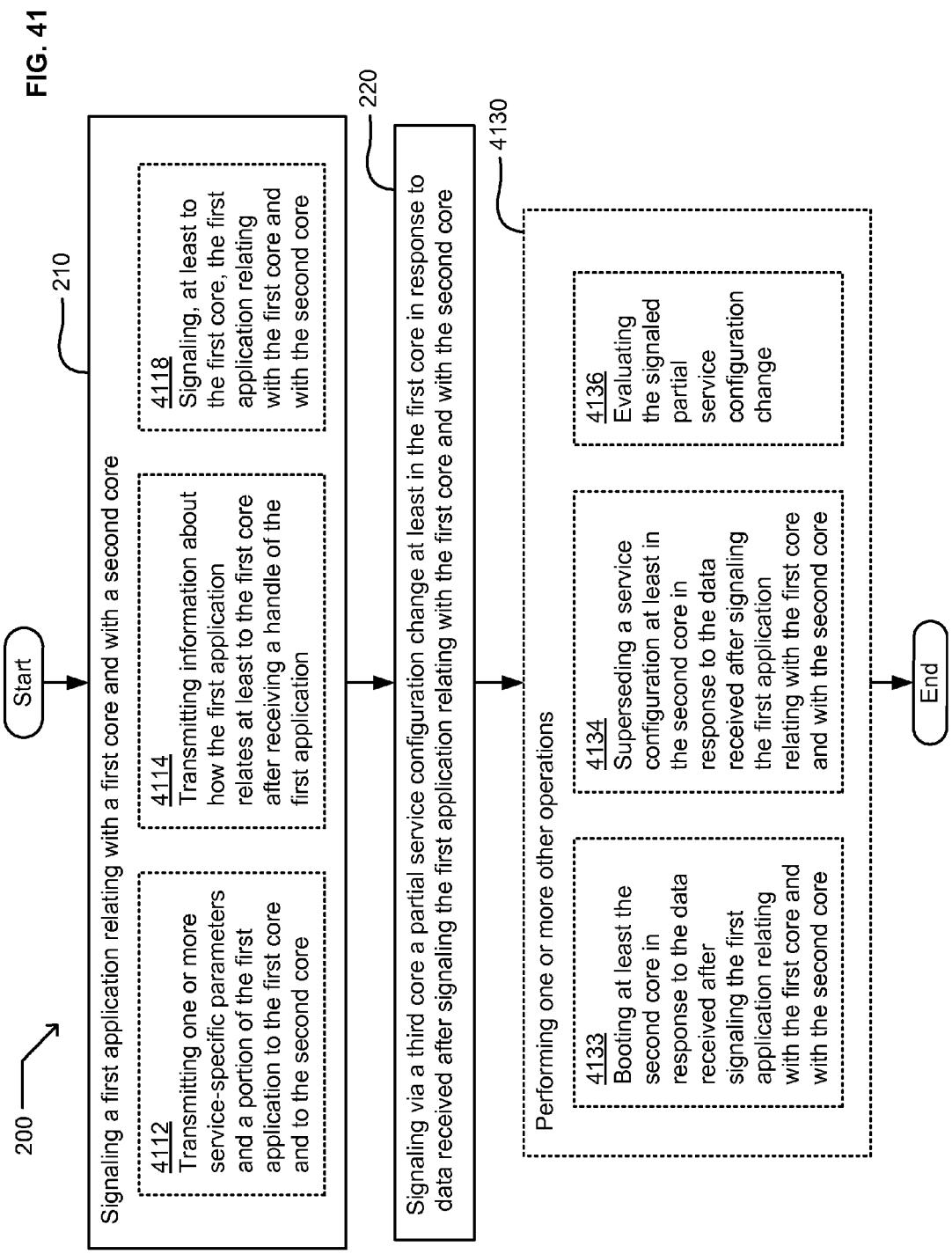

Referring now to FIG. 41, there are shown several variants of the flow 200 of FIG. 2, 38, 39, or 40. Operation 210—signaling a first application relating with a first core and with a second core—may include one or more of the following operations: 4112, 4114, or 4118. Operation 4130—performing one or more other operations—may include one or more of the following operations: 4133, 4134, or 4136.

Operation 4112 describes transmitting one or more service-specific parameters and a portion of the first application to the first core and to the second core (e.g. code distribution logic 2411 distributing type 1 policy 1798 with implementing parameters and instructions at least to module 1753 and module 1754, as shown in FIG. 17). This can occur, for example, in embodiments in which at least first signaling module 2410 performs operation 210, in which at least second signaling module 2420 performs operation 220, in which local subsystem 2401 includes subsystem 1700, and in which channel 2450 couples directly or indirectly to passive media 1712.

In the variant of FIG. 26, message handling module 2678 can likewise perform operation 4112 (e.g. by sending controls 2695 and communication modules to cores 2691-2693 in creating appnet 2688). For example, the controls 2695 can include passwords, selections, security levels, user preferences, path names, switch values, or the like. The communication modules can comprise resources 2696, mobile agents, or the like. Each of the cores can also receive other information about application 2698 when assembling application 2698, such as indications of where message handling module 2678 resides or of which cores comprise appnet 2688. Alternatively or additionally, authorized user lists and other sensitive information relating to application 2698 can generally remain within subsystem 2610 as a single access control point in domain 2601 for higher-level commands 1409 (such as those in row 1403, e.g.).

Operation 4114 describes transmitting information about how the first application relates at least to the first core after receiving a handle of the first application (e.g. software agent 1589 sending topological information about appnet 1581 specifying one or more core groups 1564, after receiving an application handle from directory manager 1520). A request for such information can include "Enterprise" or a pathname as an application handle, for example, or a handle of a resource or other component of the application or appnet, for searching directory 1586. This can occur, for example, in embodiments in which domain 1585 implements domain 2601 of FIG. 19, in which software agent 1589 implements Application Service Router 2620 for performing operation 210, in which appnet depicter 2613 is configured to perform operation 4114, in which directory 1586 implements object directory 2643, in which appnet 1581 implements cluster 2690 (including core 2691), and in which ASR 2650 is configured to perform operation 220.

In one scenario, app 1571 provides a handle of part or all of appnet 1581 ("Enterprise," e.g.) in seeking to register with directory manager 1520. (This can occur, for example, after app 1571 attempts to complete a transaction directly with core 2691 of appnet 1581 via linkage 1523 without success.) In some instances "Enterprise" may not be found locally within directory manager 1520, in which case directory manager may broadcast or otherwise send an inquiry about "Enterprise" across linkage 1522 and others (not shown), triggering the above-described response.

In another scenario, directory manager 1520 comprises an instance of subsystem 2610 that can mediate between app 1571 and appnet 1581 by obtaining a channel to appnet 1581 via software agent 1589. In many cases like these, the existence of several high-level appnet constructs defined within company 1580 enables software agent 1589 to be configured centrally to serve as a convenient regional or global network access point for company 1580. This provides better visibility of organizational responsibility and usage of various infrastructure and application components within appnets 1581-1583. It also enables developers and users to better implement and enforce application- and system-level resource access control. These configurations and scenarios thus illustrate how appnets can be used for increasing divisional or organizational agility, especially when using shared hardware (e.g. cores 1565) or common software interfaces.

Operation 4118 describes signaling, at least to the first core, the first application relating with the first core and with the second core (e.g. routelet app 2668 transmitting a digital signal to core 2691 indicating that an aggregator application is running jointly on at least core 2691 and core 2692). In some variants, the digital signal can include a name of the application, for example, a name of one or more processes 2694 of the application on the second core or on other cores, a timestamp, a list of cores or core groups (see FIG. 15, e.g.), information about other applications or overlapping appnets, or the like.

Operation 4133 describes booting at least the second core in response to the data received after signaling the first application relating with the first core and with the second core (e.g. implementer 2662 rebooting core 2691 in response to receiving an instruction or timeout signal after appnet depicter 2613 signals application 2698 at cores 2691-2693). This can occur, for example, in embodiments in which core 2691 is the second core, in which data manager 2644 is configured to perform operation 220, and in which ASR 2650 is configured to perform operation 4130. In another such scenario, appnet manager 2653 can begin a sequence for initializing application 2698 by publishing an intention to boot one or more cores 2691-2693 of cluster 2690 in lieu of detecting any countervailing conditions (defined in and monitored by rule handler 2679, e.g.) within a period of time. The countervailing conditions may include input from interface 2607, activity in application 2697, or the like. The data received may include clock transitions or other indications of elapsed time, indications of activity in one or more of the cores 2691-2693, an indication of the partial service configuration change relating, a linkage between such a change and application 2697, or the like. The booting may include any sequence of hardware transitions or other triggers known by those skilled in the art, and may include implementer 2662 causing a reboot event as an indirect effect (of power cycling cluster 2690 or generating a fault condition, for example).

Operation 4134 describes superseding a service configuration at least in the second core in response to the data received after signaling the first application relating with the first core and with the second core (e.g. appnet manager migrating module 1033 responsive to super-user 1406 or policy app 2669 indicating a removal of module 1033 from appnet 1062). This can occur, for example, in embodiments in which module 1034 is the first core, for example, or otherwise in which module 1033 is or resides in the second core. In some variants interface 2607 is configured to interact with super-user 1406, with rule handler 2679 defining which commands 1409 are available to super-user 1406 when interacting with appnet 1062 (e.g. those included in one of columns 1461-1465).

Operation 4136 describes evaluating the signaled partial service configuration change (e.g. abstracter 2615 predicting a success rate of 92% in relation to a cache hits performance statistic, for example, or a difference between 92% and a current success rate). This can occur, for example, in embodiments in which abstracter 2615 receives a user-proposed partial service configuration change and one or more user-designated statistics of interest in operation 210. In some embodiments, abstracter 2615 estimates one or more effects jointly (with input from adapter app 2666, servicelet app 2667, one or more resources 2696, or the like) in performing operation 4136

Alternatively or additionally, operation 4136 can yield an evaluation of a past change as "harmless" or a proposed change as "risky," can an efficiency or other performance model relating to past changes, indications of various aspects of the change (relating to an availability of resources 2696, e.g.), or the like.

Figure 42:
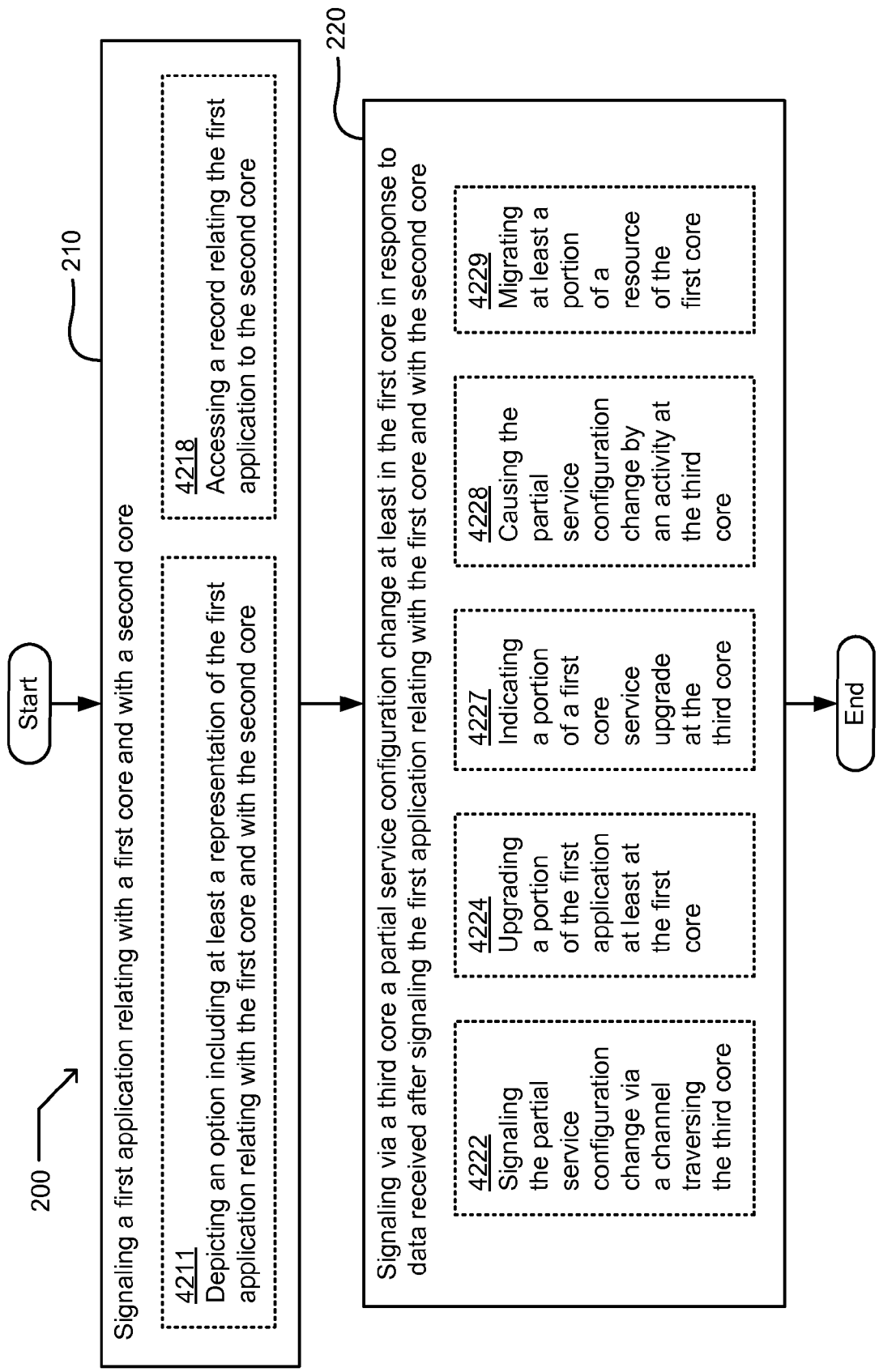

Referring now to FIG. 42, there are shown several variants of the flow 200 of FIG. 2, 38, 39, 40, or 41. Operation 210—signaling a first application relating with a first core and with a second core—may include one or more of the following operations: 4211 or 4218. Operation 220—signaling via a third core a partial service configuration change at least in the first core in response to data received after signaling the first application relating with the first core and with the second core—may include one or more of the following operations: 4222, 4224, 4227, 4228, or 4229.

Operation 4211 describes depicting an option including at least a representation of the first application relating with the first core and with the second core (e.g. option depicter 2617 graphically showing appnet 150 including cores 151, 152). One or more additional appnets may likewise be depicted, such as in network 100 as shown in FIG. 1. Alternatively or additionally, one or more of the options or other features may be shown in menu form. Alternatively, an appnet can be depicted without related options per se, such as for context or other merely informational purposes.

Operation 4218 describes accessing a record relating the first application to the second core (e.g. DMA 1163 accessing a current or recent list of processes from memory 1166). A process list from the second core can be received within app payload 1258 of message 1210, for example. This can occur periodically or in response to a request, such as can be generated when a user requests a view of an appnet for the application.

Operation 4222 describes signaling the partial service configuration change via a channel traversing the third core (e.g. implementer 2662 using channel 1391, traversing database server 1342, for signaling an activation of "Node1" module 1351 from web server 1341 at "Pricedb" module 1352). This can occur, for example, in an embodiment in which core 2691 implements web server 1341, in which core 2692 implements database server 1342, in which appnet 2687 implements trade clearing appnet 1321, and in which ASR 2650 can perform operation 220. (The channel may likewise comprise one or more physical signal paths such as linkage 2628.)

Operation 4224 describes upgrading a portion of the first application at least at the first core (e.g. servicelet app 2667 suspending one or more processes 2694 of application 2697 at core 2691 and replacing one or more resources 2696 of the suspended process such as a subroutine code module of application 2697). In such embodiments appnets can be used for facilitating an incremental software upgrade using existing subsystems. Incremental upgrades can be useful, for example, in determining which portion of an upgrade might have introduced malicious agents or other anomalies into a network.

Operation 4227 describes indicating a portion of a first core service upgrade at the third core (e.g. query agent 2727 requesting specific authorizations to upgrade some controls 395 or resources 396 of core 391 via interface 325). This can occur, for example, in embodiments in which signaling module 321 is configured to perform operation 210, in which aggregation module 322 implements aggregation module 2702 for performing at least operation 220, in which interface 325 can be used for selecting some of controls 395 or resources 396. If receiver 2722 receives an indication of code module X (not shown) of resources 396 in core 391 being selected for upgrade, for example, in some embodiments update circuitry 2762 can respond by updating only code module X as the partial service configuration change. This illustrates that an appnet can facilitate selective upgrades effectively in some embodiments. This also illustrates how appnets can be used for facilitating the reuse of code modules, for example, during selective additions or replacements of network hardware components.

Operation 4228 describes causing the partial service configuration change by an activity at the third core (e.g. transmitter 2531 sending service identifiers 2532 or service change specifications 2533 corresponding with a service level change). This can occur, for example, in embodiments in which the "first" and "second" cores are remote (from transmitter 2531, e.g.), in which subsystem 2802 of FIG. 28 implements a local "third" core, in which ASR 2866 is configured to perform operation 210, in which signaling circuitry 2868 is configured to perform operation 220, and in which signaling circuitry 2868 is configured to implement one or more of the listed components of ASR 2530, including at least transmitter 2531.

Operation 4229 describes migrating at least a portion of a resource of the first core (e.g. servicelet app 2667 causing one or more resources 2696 to be allocated at core 2691 in lieu of some or all of like resources at core 2692). Resources to be migrated in this fashion may include a memory or storage allocation, code modules, database files or linkages, a processing capacity, or the like.

Figure 43:
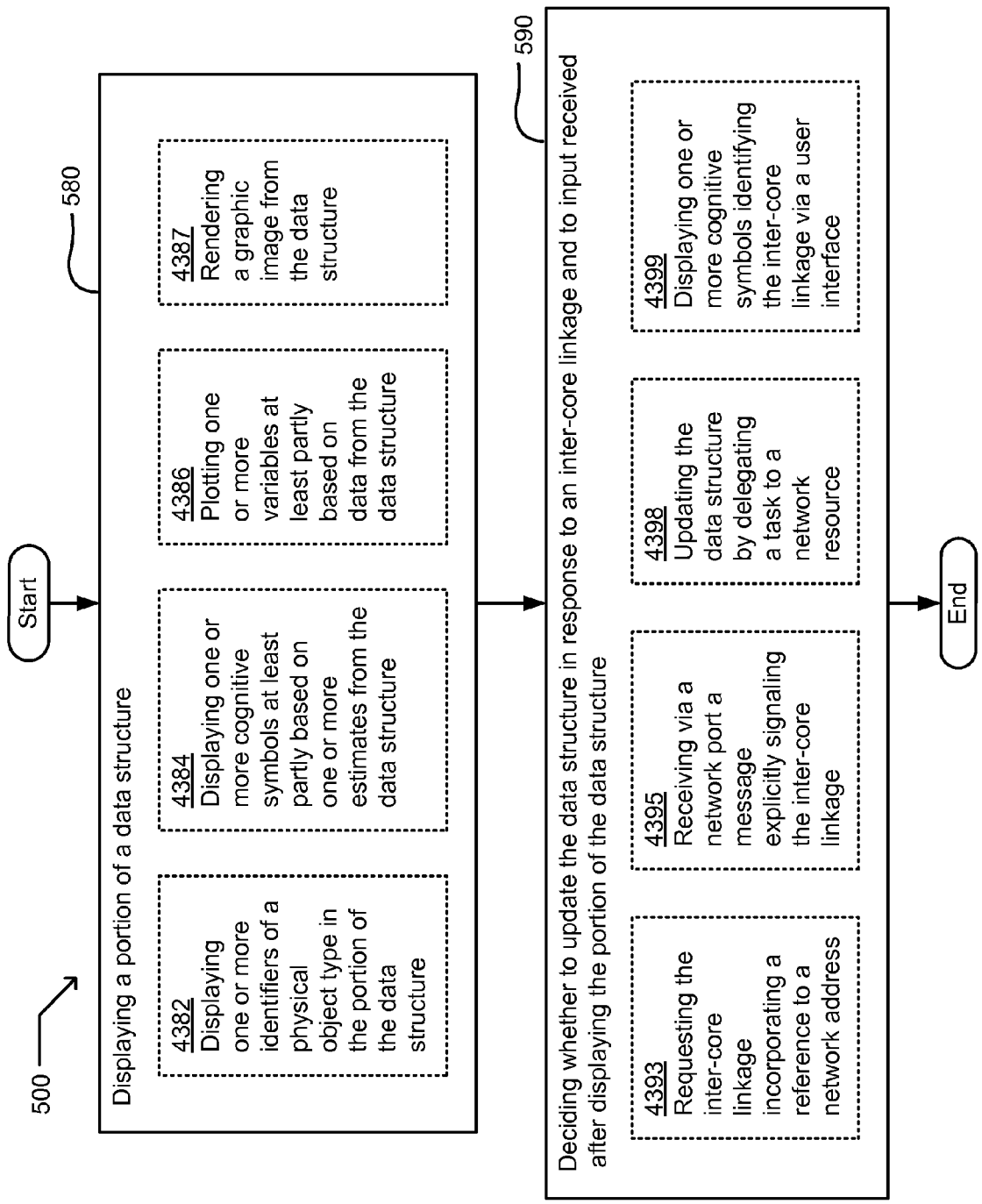
FIGS. 43-44 depict variants of the flow of FIG. 5.

Referring now to FIG. 43, there are shown several variants of the flow 500 of FIG. 5. Operation 580—displaying a portion of a data structure—may (optionally) include one or more of the following operations: 4382, 4384, 4386, or 4387. Operation 590—deciding whether to update the data structure in response to an inter-core linkage and to input received after displaying the portion of the data structure—may likewise include one or more of the following operations: 4393, 4395, 4398, or 4399.

Operation 4382 describes displaying one or more identifiers of a physical object type in the portion of the data structure (e.g. view selection logic 2363 showing one or more alphanumeric values 2364 such as part numbers identifying components of an article of manufacture in data structure 2322). This can occur, for example, in embodiments in which interface module 2360 is configured to perform operation 580, in which decision module 2350 is configured to perform operation 590, and in which view selection logic accesses data structure portions such as DDO's 2380, SDO's 2385, or labels associated with them.

Operation 4384 describes displaying one or more cognitive symbols at least partly based on one or more estimates from the data structure (e.g. data format logic 2365 showing decimal values or other quantity-indicative symbols responsive to estimates 2234 arriving as a destination data object 2287). The symbols can reflect desired, required, or available product quantity estimates, for example, or a cost or component quantity based upon them, many examples of which are available to those skilled in the art.

Operation 4386 describes plotting one or more variables at least partly based on data from the data structure (e.g. plotting logic 2362 plotting one or more computations 2235 from tabular grid data 2236, in a histogram or scatter plot). The variables or operands from which computations 2235 are obtained can include destination data object 2287 or linking data object 2284, for example.

Operation 4387 describes rendering a graphic image from the data structure (e.g. drawing logic 2367 showing a bitmap or vector image as type 3 DDO 2383). The graphic image can be a direct copy from type 3 SDO 2393, for example, or can be processed based on a local (prior) image and editing or other image processing instructions in type 2 SDO 2392.

Operation 4393 describes requesting the inter-core linkage incorporating a reference to a network address (e.g. linkage request logic 2354 asking for an association between destination data objects 2380 locally and source data objects 2390 at a remote IP address via physical linkage 2311). The recipient of the request may be a local entity (e.g. link management module 2240) or a remote entity (e.g. in second network 2300). In some embodiments, linkage request logic 2354 can first request a remotely-managed linkage (by which a remote entity is responsible for updating relationships in either or both directions), and absent a positive response, request a locally-managed linkage (by which a local entity updates the data relationship). Either of these entities can optionally be configured to pull or push data to update or confirm the data object relationship periodically or occasionally, for example.

Operation 4395 describes receiving via a network port a message explicitly signaling the inter-core linkage (e.g. message parser 2355 receiving a web page or e-mail message indicating linkage 2311, such as by identifying channel 2310 or some other route between first network 2200 and other entities). The explicit signal may comprise identifiers of the linked cores, for example, or a similar transport header or the like. In various embodiments, this information can trigger the update, enable input-receiving circuitry, or otherwise be used in deciding whether to update the data structure of operation 590.

Operation 4398 describes updating the data structure by delegating a task to a network resource (first delegation logic 2357 instructing second network 2300 or the like to accept type 2 SDO 2387 for use in updating one or more destination data objects 2395). This can occur, for example, in embodiments in which decision module 2350 is configured to perform operation 590 and in which such data objects are in the data structure to be updated.

Operation 4399 describes displaying one or more cognitive symbols identifying the inter-core linkage via a user interface (e.g. display control logic 2368 sending words or other cognitive symbols 2369 describing linkage 2311 to a screen display or other output devices 2309). In some embodiments, the inter-core linkage can be identified merely as "Current Inventory," "Prices," "Days to Completion," or "Compositions" referring to data to be updated from SDO's 2385 to DDO's 2395 (or from SDO's 2390 to DDO's 2380, e.g.). Many such text labels sufficient to distinguish such data object linkages from one another will be apparent to those skilled in the art in light of teachings herein.

Figure 44:
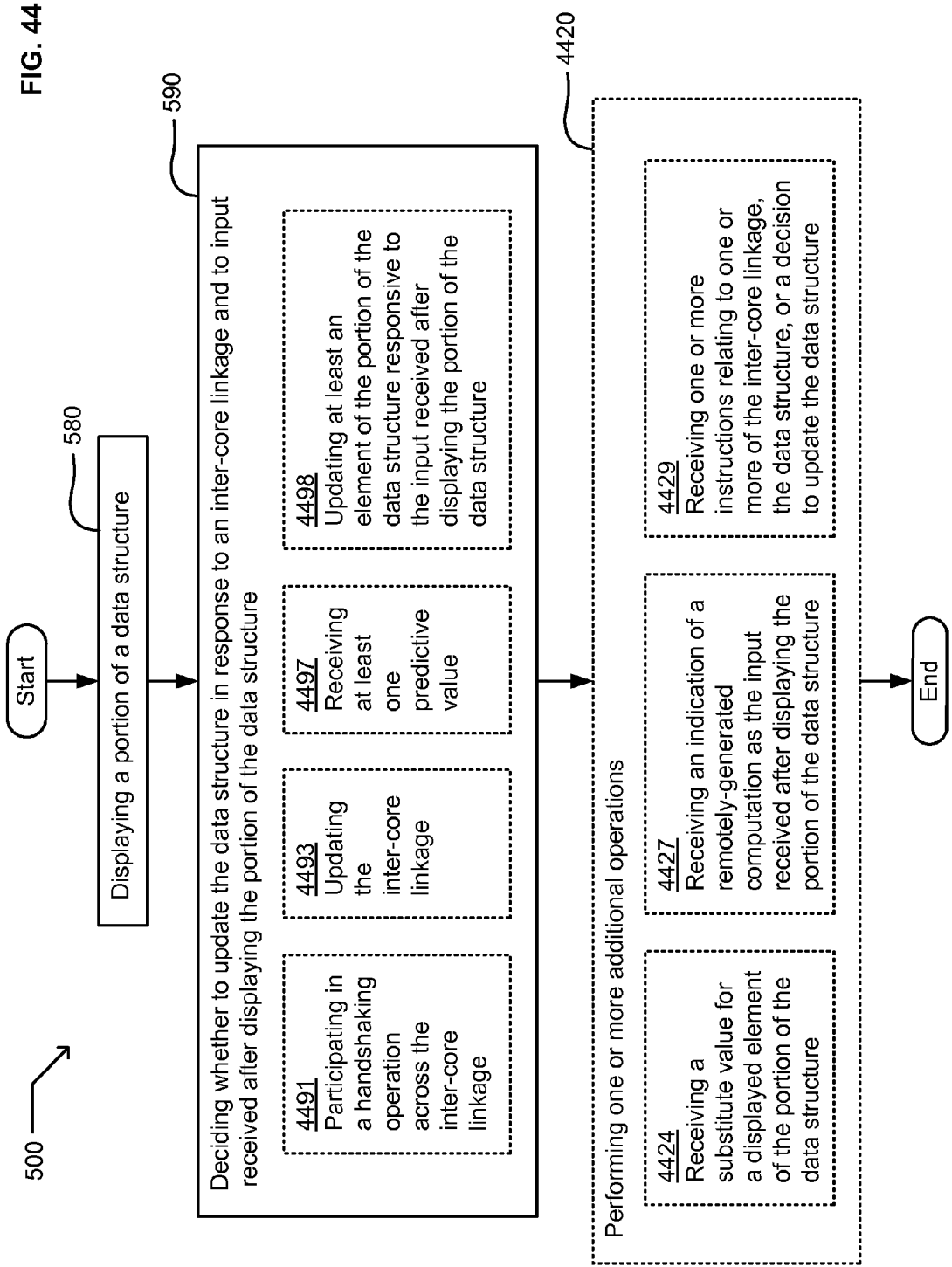

Referring now to FIG. 44, there are shown several variants of the flow 500 of FIG. 5 or 43. Operation 590—deciding whether to update the data structure in response to an inter-core linkage and to input received after displaying the portion of the data structure—may include one or more of the following operations: 4491, 4493, 4497, or 4398. Operation 4420—performing one or more additional operations—may include one or more of the following operations: 4424, 4427, or 4429.

Operation 4491 describes participating in a handshaking operation across the inter-core linkage (e.g. protocol logic 2352 initiating or responding to a communication across linkage 2311). This can occur, for example, in embodiments in which interface module 2360 can perform operation 580, in which decision module 2350 can perform operation 590 (alone or in combination with interface 2307 or data manager module 2220), and in which linkage 2311 includes one or more inter-core linkages.

Operation 4493 describes updating the inter-core linkage (e.g. selective update logic 2351 retrieving data from SDO 2289 into DDO 2287, pushing data from type 2 SDO 2387 to type 3 DDO 2397, or checking for changes at LDO 2284 or LDO 2286 to trigger a synchronization operation). This can occur, for example, in embodiments in which at least decision module 2350 performs operation 590, in which channel 2210 is operatively coupled to channel 2310, and in which selective update logic 2351 can control or access linkage 2288, linkage 2311, or linkage 2285, as shown. In some embodiments, operation 4493 is performed periodically (e.g. each 5 to 500 milliseconds). Alternatively or additionally, selective update logic 2351 can be configured to respond to notifications received from some or all of the above-mentioned source or linking data objects indicating a change in object contents.

Operation 4497 describes receiving at least one predictive value (second input device 2302 receiving an arrival time estimate, a weather forecast, a resource availability or cost prediction or the like). This can occur, for example, in embodiments in which interface 2307 and decision module 2350 jointly perform operation 590 and in which a service or product provider is trying to coordinate arrivals or other contributions from several other providers.

Operation 4498 describes updating at least an element of the portion of the data structure responsive to the input received after displaying the portion of the data structure (update logic 2227 updating one or more objects in tabular data appnet 2250 responsive to input signifying acceptance of a displayed proposal). In some embodiments update logic 2227 can transmit a revised formula, for example, just typed into first input device 2301, so that some DDO's or formulae that depend from them effectively incorporate the revised formula.

Operation 4420 describes performing one or more additional operations (e.g. data manager module 2320 or tabular data appnet 2250 performing one or more of operations 4424-4429). In some embodiments, deployment module 2160 or other resources 2150 can effectively perform such operations, for example, by deploying one or more local or remote agents configured to serve such a role within network 2300.

Operation 4424 describes receiving a substitute value for a displayed element of the portion of the data structure (source data object 2282 receiving a binary value of 11101101 from linking data object 2284 or from first input device 2301, e.g., as a substitute for an earlier-reported value of 00000000). In some embodiments, one or more networks are configured so that such a substitution results in a substantially simultaneous update of more than one of (a) the displayed element, (b) formulas in the data structure incorporating the element as an operand, or (c) remote values configured as DDO's or LDO's.

Operation 4427 describes receiving an indication of a remotely-generated computation as the input received after displaying the portion of the data structure (type 1 DDO 2381 receiving an updated checksum indicative of a remote checksum value arriving at SDO 2391). This can occur, for example, after one or more output devices 2309 display a portion of data structure 2322 including, for example, labels identifying DDO 2381 as reflecting the checksum or other computation at SDO 2391. In some embodiments, configuring data manager module 2320 to receive such computations (rather than voluminous raw data, e.g.) can reduce a burden caused by maintaining data object linkages.

Operation 4429 describes receiving one or more instructions relating to one or more of the inter-core linkage, the data structure, or a decision to update the data structure (e.g. message parser 1623 receiving one or more modules containing instructions for servicing or updating inter-core linkage 1685, for forming inter-core linkage to data structure 1695, or for implementing decision module 1650). This can occur, for example, in embodiments in which interface module 1660 can perform operation 580, in which decision module 1650 can perform operation 590, and in which decision module 1650 or receiving module 1620 can perform operation 4420.

Figure 45:
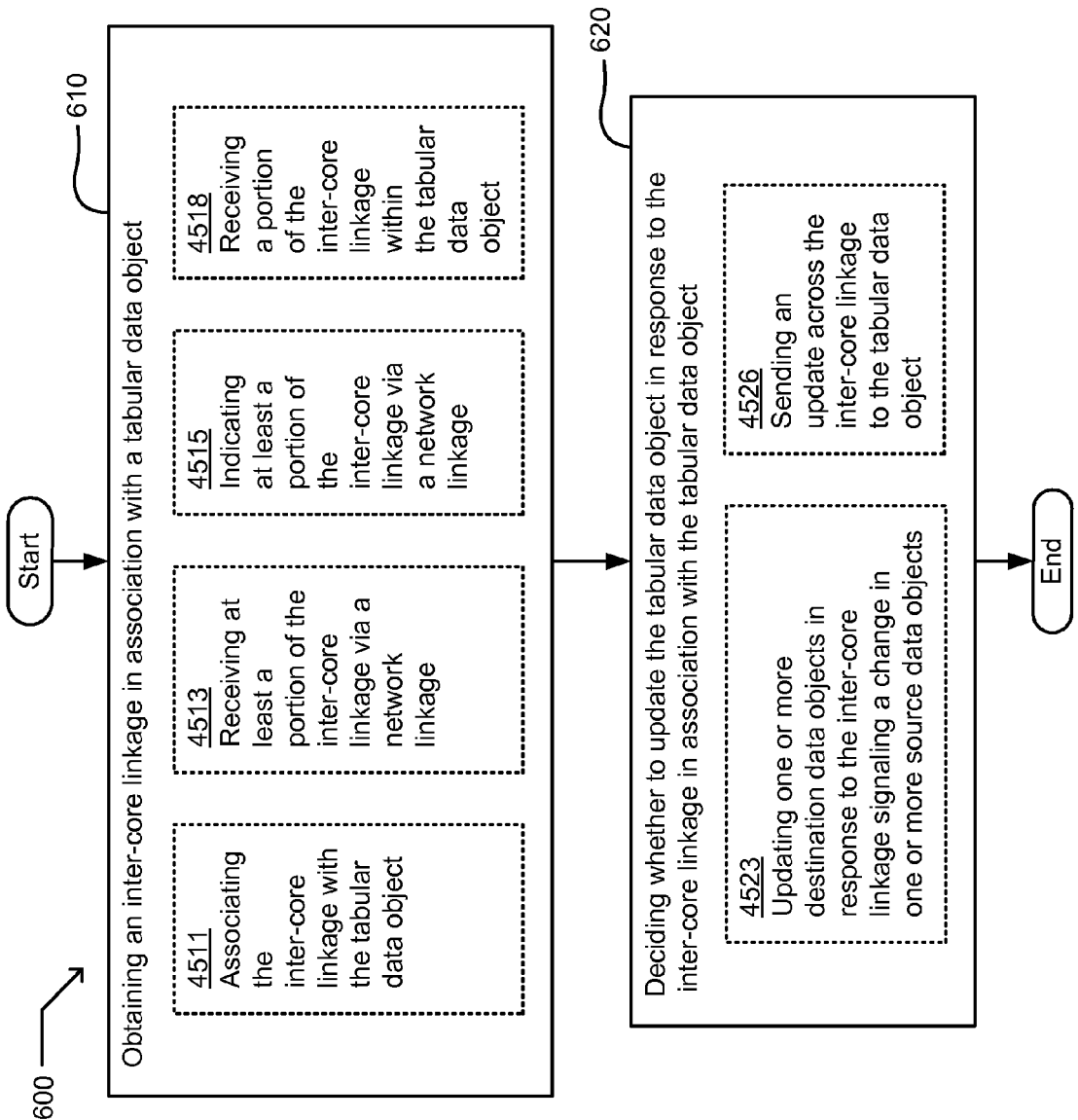
FIGS. 45-46 depict variants of the flow of FIG. 6.

Referring now to FIG. 45, there are shown several variants of the flow 600 of FIG. 6. Operation 610—obtaining an inter-core linkage in association with a tabular data object—may include one or more of the following operations: 4511, 4513, 4515, or 4518. Operation 620—deciding whether to update the tabular data object in response to the inter-core linkage obtained in association with the tabular data object—may include one or more of the following operations: 4523 or 4526.

Operation 4511 describes associating the inter-core linkage with the tabular data object (e.g. association logic 2271 mapping addresses or other handles 2203 to physical addresses 2204 of a data table containing type 2 DDO 2397). Alternatively or additionally, one or more of the physical addresses 2204 can identify a location of a data table (as type 1 DDO 2396, e.g.). In some embodiments, association logic 2271 can similarly associate a single data object handle with a logical handle associated with several physical addresses (e.g. by providing a table entry containing a thumbnail or search term hit in a table entry that also contains a registered name of an internet domain within which the thumbnail or search term data was found).

Operation 4513 describes receiving at least a portion of the inter-core linkage via a network linkage (e.g. receiving logic 2279 receiving a hyperlink or other object indicating a logical or physical address of an entity containing source data objects 2390 or destination data objects 2395 through linkage 2311). Alternatively or additionally, receiving logic 2279 can be configured to assemble, decode, parse, or otherwise process portions of an address, envelope object, channel identifier or other received linkage feature into ports of the inter-core linkage.

Operation 4515 describes indicating at least a portion of the inter-core linkage via a network linkage (e g linkage indication logic 2276 transmitting a handle of core 2252 across linkage 2285 of tabular data appnet 2250). Alternatively or additionally, linkage indication logic 2276 can be configured to perform operation 4515 by authorizing linkages between objects within data structures of first network 2200 and SDO's 2390 or DDO's 2395. This can cause type 3 SDO 2393 to be linked to one or more DDO's in data structures 2222, 2225 or tabular data grid 2236, for example.

Operation 4518 describes receiving a portion of the inter-core linkage within the tabular data object (e.g. record update logic 2272 including first network access port linkage 2231 within tabular data object 2236). This can occur, for example, in embodiments in which tabular data object 2236 is of a type that a spreadsheet or database application or the like can interact with in a conventional manner, in which first network access port linkage 2231 corresponds with a portion thereof such as a cell or a rectangular range, and in which linkage module 2270 is configured to perform operation 610. The portion can comprise one or more data objects that can refresh a remote data object (or vice versa) responsive to tabular data object 2236 being opened or closed, for example, or during some interrupts or object activation events such as pulses from clock circuitry 2228.

Operation 4523 describes updating one or more destination data objects in response to the inter-core linkage signaling a change in one or more source data objects (e.g. destination update logic 2243 updating DDO 2287 responsive to a pulse via second network access port linkage 2232). The pulse can signify new data becoming available among SDO's 2390, for example, in a variant in which destination update logic 2243 requests or otherwise pulls the new data through linkage 2311. Alternatively or additionally destination update logic 2243 can push or otherwise facilitate a data update through linkage 2311 from type 1 SDO 2386 to type 3 DDO 2398. Those skilled in the art will recognize a variety of configurations for implementing such variants without undue experimentation, in light of the teachings in this document.

Operation 4526 describes sending an update across the inter-core linkage to the tabular data object (e.g. router 2244 and core 2252 jointly updating linking data object 2286 responsive to detecting a change in linking data object 2284). This can occur, for example, in embodiments in which link management module 2240 and tabular data appnet 2250 jointly perform operation 620, in which linkage 2285 implements the inter-core linkage, and in which core 2253 implements at least the tabular data object. Alternatively or additionally, router 2244 can be configured for performing operation 4526 by sending update-containing messages via linkage 2311.

Figure 46:
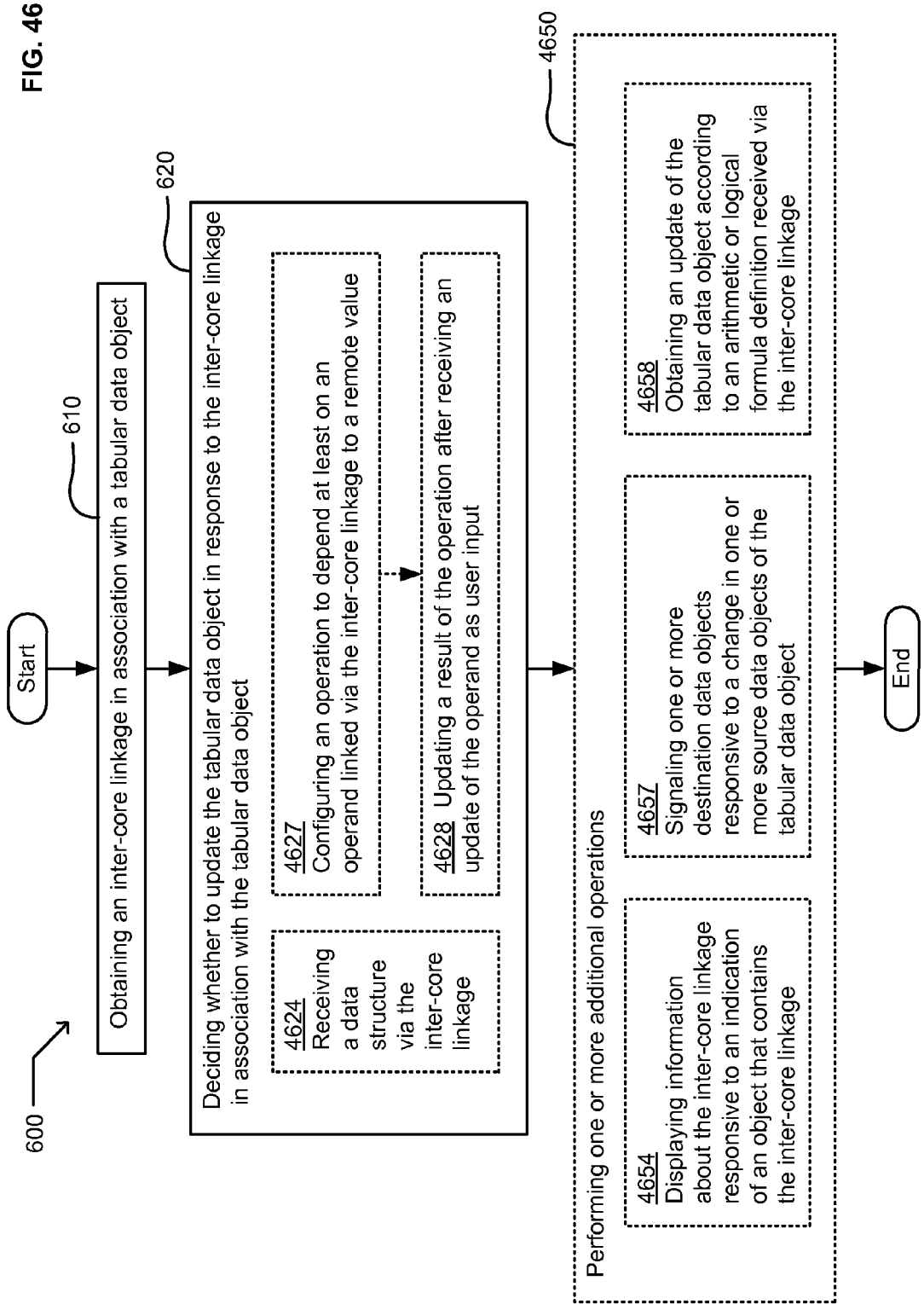

Referring now to FIG. 46, there are shown several variants of the flow 600 of FIG. 6 or 45. Operation 620—deciding whether to update the tabular data object in response to the inter-core linkage obtained in association with the tabular data object—may include one or more of the following operations: 4624, 4627, or 4628. Operation 4650—performing one or more additional operations—may include one or more of the following operations: 4654, 4657, or 4658.

Operation 4624 describes receiving a data structure via the inter-core linkage (e.g. memory device 2224 receiving data structure 2225 via an inter-core linkage including channel 2210, channel 2310 and linkage 2311. This can occur, for example, in embodiments in which linkage module 2270 is configured to perform operation 610, in which data structure 2225 includes an array-type data structure of more than one dimension, and in which data manager module 2220 and decision module 2350 can jointly perform operation 620. Many such embodiments are described in this document.

Operation 4627 describes configuring an operation to depend at least on an operand linked via the inter-core linkage to a remote value (e.g. formula definition logic 2247 configuring formula update logic 2248 to update a cell in tabular data grid 2236 by multiplying type 1 SDO 2391 with a scalar constant of "100"). Alternatively or additionally, formula definition logic 2247 can configure formula update logic 2248 to implement one or more triggering criteria that control when such an update can occur. These variants can occur, for example, in embodiments in which linkage module 2270 is configured to perform operation 610 and in which at least link management module 2240 is configured to perform operation 620.

Operation 4628 describes updating a result of the operation after receiving an update of the operand as user input (e.g. formula update logic 2248 updating the above-referenced cell in tabular data grid after receiving "5" as an updated value of type 1 SDO 2391). This can result in the cell being updated, for example (e.g. from a prior value of 21 to a subsequent value of 35). This can occur, for example, in response to a change in the formula or to a change in operands (or both) being entered at second input device 2302, in some embodiments. Alternatively or additionally, indications of the user input or other changes can originally enter first network 2200 via second network 2300 in some variants.

Operation 4654 describes displaying information about the inter-core linkage responsive to an indication of an object that contains the inter-core linkage (e.g. implementation logic 2278 indicating transmitting an owner identifier, a creation date, location data, usage history, or other attributes describing linkage 2311 or a logical linkage that includes it in response to an identifier of such a logical linkage). Alternatively or additionally, the linkage-containing object can comprise a message or file including one or more estimates 2234, computations 2235, tabular data grid 2236 or the like. This can occur, for example, in embodiments in which linkage module 2270 is configured to perform operation 4650.

Operation 4657 describes signaling one or more destination data objects responsive to a change in one or more source data objects of the tabular data object (e.g. destination update logic 2243 maintaining linkage 2281 by updating or otherwise notifying DDO 2280 in response to SDO 2282 being changed or otherwise refreshed). This can occur, for example, in variants in which one or more fields of the tabular data object comprise SDO 2282, in which link management module 2240 performs operation 620, and in which one or more cores of tabular data appnet 2250 at least partially implement another instance of link management module 2240 (e.g. one that can perform operation 4650).

Operation 4658 describes obtaining an update of the tabular data object according to an arithmetic or logical formula definition received via the inter-core linkage (e.g. second delegation logic 2358 obtaining a new value for use in tabular data grid 2236 by delegating a computation task to core 1786). This can occur, for example, in an embodiment in which decision module 2350 performs operation 4650, in which subsystem 2802 of FIG. 28 couples channel 2310 to core 1786 via passive media 1712, in which the computation task includes determining whether 2X+7<30, in which second delegation logic 2358 receives a signal defining this formula via linkage 2311 and passes it to core 1786, and in which second delegation logic 2358 later passes a result of "TRUE" to tabular data grid 2236. Alternatively or additionally, operation 4658 can be performed with respect to tabular data objects in second network 2300. Alternatively or additionally, in some embodiments, tabular data grid 2236 can be configured to obtain computations 2235 directly without delegation, for example in embodiments in which second network 2300 and network 2800 are not included, and in which the operand values and formula definition (e.g. X=3 and 2X+7<30) are passed into tabular data grid 2236.

Figure 47:
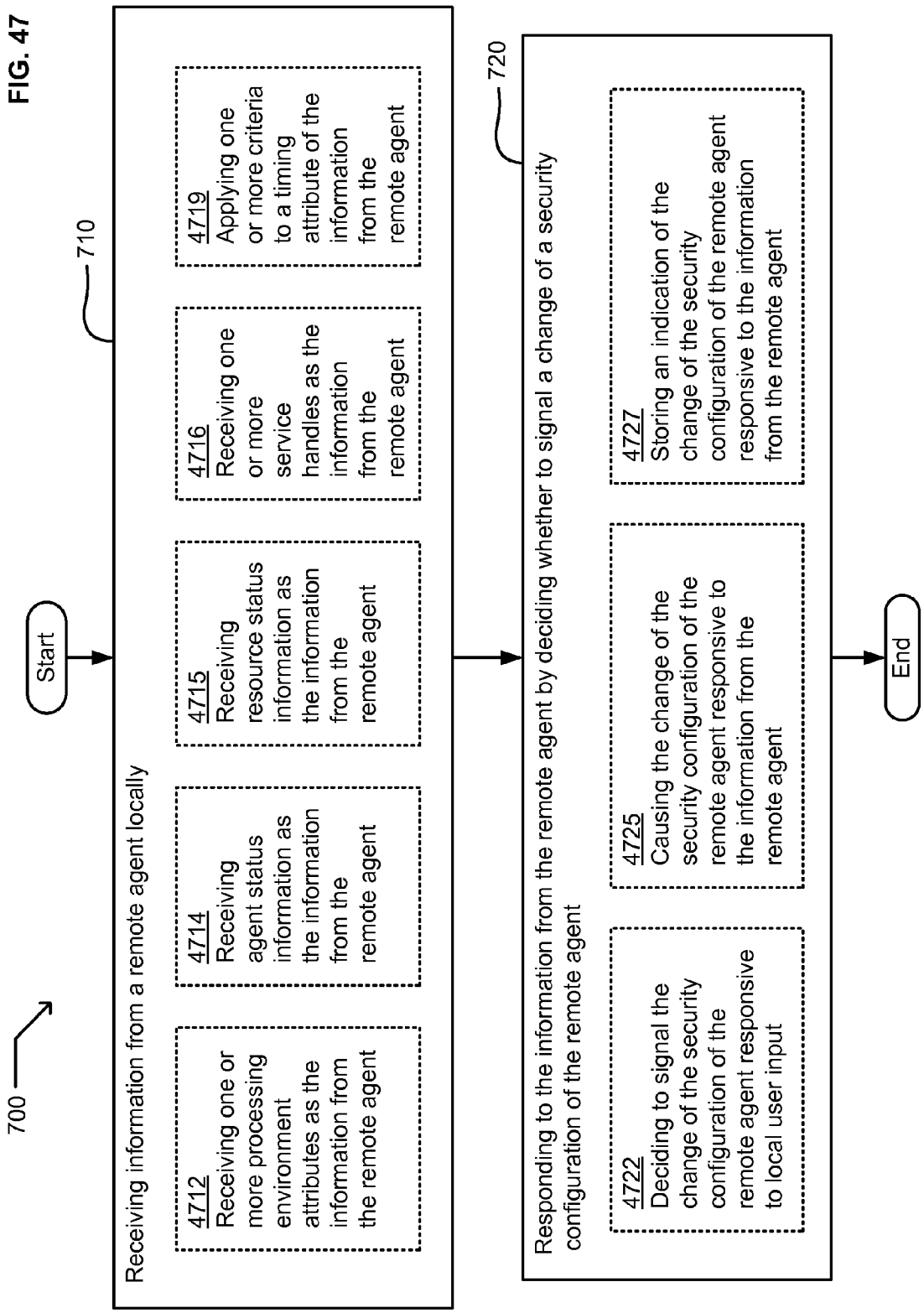

Referring now to FIG. 47, there are shown several variants of the flow 700 of FIG. 7. Operation 710—receiving information from a remote agent locally—may include one or more of the following operations: 4712, 4714, 4715, 4716, or 4719. Operation 720—responding to the locally received information from the remote agent by deciding whether to signal a change of a security configuration of the remote agent—may include one or more of the following operations: 4722, 4725, or 4727.

Operation 4712 describes receiving one or more processing environment attributes as the information from the remote agent (e.g. core description registry 1921 or core status registry 1947 respectively receiving a core configuration summary and a core status summary from remote core 1985). Alternatively or additionally, in some embodiments, core description registry 1921 can receive core owner, manufacturer, model or revision identifier, size information or the like from remote core 1985 about other cores. In variants in which subsystem 2802 and links 2819, 2450 are included, for example, such information can describe remote subsystem 2490, for example. Alternatively or additionally, in some variants, core status registry 1947 can likewise receive a core availability status, a process name, a policy effectuation list, a resource status summary, or the like from remote core 1985 relating to remote subsystem 2490.

Operation 4714 describes receiving agent status information as the information from the remote agent (e.g. agent status registry 1943 receiving from remote core 1985 an indication of a status of one or more agents). This can occur, for example, in embodiments in which the one or more agents comprise remote core 1985 or module 1758, in which receiving module 1920 performs operation 710, and in which linkage 1911 is at least about 10 meters in length. (In some embodiments, a "remote" network element can be one that is coupled primarily with a "local" item via a signal-bearing channel containing such a linkage.)

Operation 4715 describes receiving resource status information as the information from the remote agent (e.g. resource status registry 1945 receiving a status message about one or more resources 1796). This can occur, for example, in embodiments in which subsystem 2802 couples channel 1910 with passive media 1712 and in which the remote agent comprises module 1759 or some other entity in subsystem 1700 that can be remote from resource status registry 1945.

Operation 4716 describes receiving one or more service handles as the information from the remote agent (e.g. service handle registry 1929 receiving a pointer, name, or other handle of one or more processes 1794, resources 1796, or other controls in subsystem 1700). This can occur, for example, in embodiments incorporating subsystem 2802 of FIG. 28, in embodiments in which channel 1910 includes one or more passive media 1712, or in which channel 1910 is operatively coupled to one or more passive media 1712.

Operation 4719 describes applying one or more criteria to a timing attribute of the information from the remote agent (e.g. timing certification logic 1930 applying one or more arrival time limits 1935 or other timing criteria 1934 to a message from remote core 1985). Alternatively or additionally, timing criteria 1934 may include whether a message defines a timing parameter (by including a timestamp, e.g.) or whether the message transmission time was within about 1 minute of an inquiry time. An outcome of operation 4719 can be used in deciding whether to retry an inquiry, whether to record an event, whether to initiate a diagnostic, or whether to signal the security change of operation 710.

Operation 4722 describes deciding to signal the change of the security configuration of the remote agent responsive to local user input (e.g. preference implementation logic 1654 signaling a security protocol deactivation in response to a deactivation request from a user within a vicinity of core 1680). Alternatively or additionally, one or more other portions of decision module 1650 may be included in the same vicinity and operably coupled to act upon the input.

Operation 4725 describes causing the change of the security configuration of the remote agent responsive to the locally received information from the remote agent (e.g. security control logic 1656 responding to a signal from remote agents 1692 in core 1690 by transmitting instructions for adding a security protocol to one or more of the remote agents 1692). This can occur, for example, in contexts in which core 1680 is local, in which core 1690 includes remote agents 1692 remote from core 1680, and in which decision module 1650 performs operation 720. Alternatively or additionally, the security protocol to be added can be a replacement or other upgrade, optionally changed by sending a task request (pull or install, e.g.) to one or more of the remote agents 1692.

Operation 4727 describes storing an indication of the change of the security configuration of the remote agent responsive to the locally received information from the remote agent (e.g. security configuration change monitor 1651 recording indications of a requested, intended, available, completed, rejected, or other security configuration change). Alternatively or additionally, the change indication can include information relating to the change such as version numbers, event timestamps, threat indicators 1658 or the like.

Referring now to FIG. 48, there are shown several variants of the flow 700 of FIG. 7 or 47. Operation 710—receiving information from a remote agent locally: 4812, 4818, or 4819. Operation 4850—performing one or more additional operations—may include one or more of the following operations: 4853, 4855, 4856, or 4858.

Operation 4812 describes requesting data from the remote agent (e.g. data request logic 1937 requesting a heartbeat, a self-identification, a status update, request 1659, one or more data objects 1696 or the like from remote agents 1692, in some variants). The request can (optionally) include one or more of an address or other identifier of core 1680, an identifier of core 1690, a substantive description of the data requested, executable instructions for acting on the request or the like.

Operation 4818 describes receiving status information as the information from the remote agent (e.g. status registry 1940 receiving core status, available resource capacity, control status, or the like). This can occur, for example, in embodiments in which at least status registry 1940 is local, in which the status information relates to the remote agent or other software, and in which at least some of receiving module 1920 performs operation 710. Alternatively or additionally, in some embodiments, the information may include an inference from an aspect of the remote agent, an event relating to the remote agent, or otherwise in which the remote agent is not a sender of the information.

Operation 4819 describes receiving the information from the remote agent at least partly through a wireless medium (e.g. antenna 1969 receiving the information from one or more remote agents 1692 via linkage 1911). This can occur, for example, in embodiments in which channel 1610 is operatively coupled with local subsystem 1901 along channel 1910 via linkage 1911, in which linkage 1911 is a wireless linkage, and in which at least a portion of resource module 1960 performs operation 710.

Operation 4853 describes deciding whether to authorize a transaction responsive to the locally received information from the remote agent (e.g. transaction authorization logic 1962 generating a decision by applying one or more authorization criteria 1963 to the locally received information). The information can include a proposed start time, one or more transaction cost or benefit indications (e.g. a duration or an amount of currency), a level or substantive type of authority needed, or other transaction descriptors, for example. Those skilled in the art will recognize how each of these factors can be used in operation 4853, in light of these teachings. The proposed start time can warrant an affirmative decision within about an hour of that time, for example, or a timing-conditional authorization in response to a description of a proposed transaction having a low cost or a high expected benefit.

Operation 4855 describes receiving information from one or more other agents (e.g. network interface 1961 or subsystem 2802 receiving data from module 1751 as well as module 1758). This can occur, for example, whether module 1751 is remote or local to network interface 1961, in embodiments in which modules 1751, 1758 comprise a combination of hardware and software agents, in which resource module 1960 is configured to perform operation 4850, and in which receiver 2875 performs operation 710.

Operation 4856 describes deciding whether to signal a change of a local security configuration responsive to the locally received information from the remote agent (e.g. intrusion response logic 1965 deciding to modify one or more authorization criteria 1963 responsive to a warning or request from module 1758). This can occur, for example, in embodiments in which transaction authorization logic 1962 controls a security policy of resource module 1960 in a vicinity in which operation 710 has been performed.

Operation 4858 describes transmitting a response to the locally received information from the remote agent (e.g. routing logic 1968 transmitting an acknowledgment or other notification to the remote agent, a zonal aggregator, or the like). The target recipient can include subsystem 2802, a relay node or the like, in some embodiments. Alternatively or additionally, the response can evaluate, summarize or otherwise substantively indicate the locally received information.

Referring now to FIG. 49, there are shown several variants of the flow 700 of FIG. 7, 48, or 49. Operation 710—receiving information from a remote agent locally—may include one or more of the following operations: 4912, 4914, or 4916. Operation 720—responding to the locally received information from the remote agent by deciding whether to signal a change of a security configuration of the remote agent—may include one or more of the following operations: 4921, 4925, or 4926. Alternatively or additionally, flow 700 may include other features such as operation 4976 as shown.

Operation 4912 describes receiving a location history via the remote agent as the locally received information (e.g. zonal registry 1922 receiving a list of locations module 1755 has visited or a list of locations from which module 1755 has received signals). The list(s) of locations can be comprehensive, sampled, selected according to one or more criteria or the like, in some embodiments. This can occur, for example, in embodiments in which channel 1910 is directly or indirectly coupled with passive media 1712 and channel 2310, in which receiving module 1920 performs operation 710, and in which decision module 2350 or first decision circuitry 2878 performs operation 720.

Operation 4914 describes receiving a cost-indicative value as the locally received information (e.g. cost registry 1924 receiving indications of time, work, money, storage or other quantities of a burden associated with adding or removing a security policy at the remote agent). The information may include a message or other signal arriving as a request or instruction that includes the value, for example, or a formula or other mechanism for obtaining it, in some embodiments.

Operation 4916 describes receiving at least an indication of a source data object as the locally received information (e.g. unpacking logic 1926 receiving via linkage 2311 an envelope object 1927 containing, referring to or otherwise indicating one or more of SDO's 2390 or SDO's 2385). The SDO's can comprise remote or local objects, for example, that are each existing or suggested by the information.

Operation 4921 describes signaling a change of an integrity policy as the change of the security configuration of the remote agent (e.g. integrity policy update logic 1653 relaxing or removing one or more data integrity or transaction integrity policies in use for broker agent). Alternatively or additionally, the policies can relate to a content delivery agent, a synthesizing agent, a research agent, a stationary agent or the like.

Operation 4925 describes deciding to signal at least a partial security increase as the change of the security configuration of the remote agent (e.g. remote security logic 1657 responding to one or more threat indicators 1658 by signaling a firewall or other new security protocol to be implemented at the remote agent). Alternatively or additionally, the partial security increase may comprise at least removing a partial security threat such as a suspect agent observable by the remote agent.

Operation 4926 describes deciding to authorize an action as the change of the security configuration of the remote agent (e.g. security control logic 1656 authorizing a purchase or allocation by remote agents 1692 in response to request 1659). This can occur, for example, in embodiments in which message parser 1623 receives request 1659 (from remote agents 1692, e.g.) for one or more remote agents 1692 to be authorized to buy or otherwise obtain on behalf of an owner of or user at interface module 1660 (not shown). In some embodiments, security control logic 1656 can be configured to manifest an affirmative decision by transmitting an authorization for the one or more actions comprising the security configuration change. Those skilled in the art will recognize a variety of factors and criteria for use in reaching the decision(s) in light of these teachings.

Operation 4976 describes causing a processing core security configuration change including more than the change of the security configuration of the remote agent (e.g. operating system upgrade logic 1997 causing, at the remote agent, a substitution of a different operating system having a substantially different security protocol). Alternatively or additionally, the processing core security configuration change can include a change in the configuration of several local processing cores.

In regard to the above-referenced methods, those skilled in the art will recognize that a network can include more than one instance of circuitry configured to perform the above-described flow variants. Likewise some subsystems can coordinate their operation so that respective elements thereof can perform such variants in succession, in alternation, conditionally, or simultaneously. In some embodiments incorporating FIG. 28, for example, first signaling module 2410, signaling module 2701, or ASR 2866 can each be configured to perform a respective instance of operation 210. Likewise second signaling module 2420 or signaling circuitry 2868 can each be configured to perform a respective instance of operation 220 as described above. Alternatively or additionally, network 2800 can be configured so that aggregation module 2702 or aggregation circuitry 2871 can each be configured to perform a respective instance of operation 450. Likewise transmission module 2703 or transmitter 2874 can each be configured to perform a respective instance of operation 460 as described above.

Alternatively or additionally, network 2800 can be configured so that more than one instance of interface module 2360 or interface 2607 can each be configured to perform a respective instance of operation 580. Likewise decision module 2350 or first decision circuitry 2878 can each be configured to perform a respective instance of operation 590 as described above. Alternatively or additionally, network 2800 can be configured so that linkage module 2270 or linkage circuitry 2881 can each be configured to perform a respective instance of operation 610. Likewise linkage management module 2240, decision module 2350, linkage management circuitry 2882 or the like can each be configured to perform a respective instance of operation 620 as described above.

Alternatively or additionally, network 2800 can be configured so that receiving module 1620 or receiver 2875 can each be configured to perform a respective instance of operation 710. Likewise decision module 1650 or second decision circuitry 2879 can each be configured to perform a respective instance of operation 720 as described above. Alternatively or additionally, network 2800 can be configured so that agent configuration module 2580 or agent configuration circuitry 2893 can each be configured to perform a respective instance of operation 880. Likewise agent deployment module 2590 or agent deployment circuitry 2894 can each be configured to perform a respective instance of operation 890 as described above. Alternatively or additionally, network 2800 can be configured so that policy association module 2130 or policy association circuitry 2897 can each be configured to perform a respective instance of operation 960. Likewise evaluation module 2170 or evaluation circuitry 2898 can each be configured to perform a respective instance of operation 970 as described above.

It will be understood that variations in technical or business models relating to the technologies described herein may prove advantageous, for example in situations in which an information systems consultant or other service provider acts for the benefit of one or more clients or interests to achieve such technologies collectively. Such arrangements can facilitate organizational or tool specialization and cost effectiveness, for example, across distributed networks in the global marketplace. Those skilled in the art will recognize that such beneficial interaction creates a commercial web constituting a single de facto entity of two or more interacting participants cooperatively implementing the teachings herein, within the scope and spirit of the claimed invention.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Moreover, "can" and "optionally" and other permissive terms are used herein for describing optional features of various embodiments. These terms likewise describe selectable or configurable features generally, unless the context dictates otherwise.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly.

What is claimed is:

1. A network subsystem comprising:
    means for associating a first mobile agent with a first security policy and a second mobile agent with a second security policy; and
    means for evaluating a received message at least in response to an indication of the first security policy and to an indication of the second security policy including at least means for broadcasting one or more inquiries relating to at least one of the first security policy or the second security policy in use in one or more processing cores.

2. The network subsystem of claim 1 in which the means for associating a first mobile agent with a first security policy and a second mobile agent with a second security policy comprises:
    at least one of:
        means for activating the first security policy at least in the first mobile agent;
        means for causing the second security policy to include one or more integrity policies;

means for associating the first security policy at least with the first mobile agent and with the second mobile agent; or
means for configuring the first mobile agent with one or more instructions able to cause the first mobile agent to transmit an indicator of the first security policy.

3. The network subsystem of claim 1 in which the means for evaluating a received message at least in response to an indication of the first security policy and to an indication of the second security policy comprises:
at least one of:
means for receiving a level indicator as the indication of the first security policy or the indication of the second security policy;
means for requesting the indication of the first security policy;
means for distilling from the received message at least an affirmative indication as one or more of the indication of the first security policy or the indication of the second security policy;
means for deciding whether to enable a triggering circuit in response to the indication of the second security policy; or
means for evaluating a signal containing the received message.

4. The network subsystem of claim 1 in which the means for evaluating a received message at least in response to an indication of the first security policy and to an indication of the second security policy comprises:
means for obtaining an identifier of the second mobile agent; and
means for determining the indication of the second security policy responsive to the identifier of the second mobile agent.

5. The network subsystem of claim 1 further comprising:
means for deploying the first mobile agent remotely.

6. The network subsystem of claim 1 further comprising:
means for deploying at least the second security policy to the first mobile agent.

7. The network subsystem of claim 1 in which the means for evaluating a received message at least in response to an indication of the first security policy and to an indication of the second security policy comprises:
means for requesting the indication of the first security policy;
means for distilling from the received message at least an affirmative indication as one or more of the indication of the first security policy or the indication of the second security policy;
means for determining the indication of the second security policy responsive to the obtained identifier of the second mobile agent; and
means for transmitting a yes-or-no decision of whether to enable a triggering circuit in response to the indication of the second security policy.

8. The network subsystem of claim 7 further comprising:
one or more user interfaces operably coupled with the means for evaluating a received message at least in response to an indication of the first security policy and to an indication of the second security policy; and
means for deploying at least the first mobile agent remotely via the second mobile agent.

9. The network subsystem of claim 1 in which the means for associating a first mobile agent with a first security policy and a second mobile agent with a second security policy comprises:

means for causing the first security policy to include one or more confidentiality policies;
means for activating the first security policy at least in the first mobile agent;
means for associating the first security policy at least with the first mobile agent and with the second mobile agent;
means for configuring the first mobile agent with one or more instructions able to cause the first mobile agent to transmit an indicator of the first security policy;
means for causing the second security policy to include one or more integrity policies; and
means for configuring the second mobile agent with one or more instructions able to cause the second mobile agent to transmit at least a portion of the second security policy.

10. The network subsystem of claim 9 in which the means for evaluating a received message at least in response to an indication of the first security policy and to an indication of the second security policy comprises:
means for evaluating the received message at least partly as a roughly contemporaneous response to receiving the indication of the first security policy;
means for receiving a level indicator as the indication of the first security policy or the indication of the second security policy;
means for obtaining an identifier of the second mobile agent;
means for determining the indication of the second security policy responsive to the obtained identifier of the second mobile agent; and
means for transmitting a yes-or-no decision of whether to enable a triggering circuit in response to the indication of the second security policy.

11. A network subsystem comprising:
an agent configuration module operable for providing a first agent with code for responding to situational information about the first agent and about a second agent;
a security protocol update module operable for modifying one or more security policies of one or more of the first agent or the second agent operating in one or more processing cores; and
an agent deployment module operable for deploying the first agent.

12. A network subsystem comprising:
a policy association module for associating a first mobile agent with a first security policy and a second mobile agent with a second security policy; and
an evaluation module for evaluating a received message at least in response to an indication of the first security policy and to an indication of the second security policy including at least distilling from the received message at least one of an affirmative indication of security policy activation or a negative indication of security policy deactivation as one or more of the first security policy or the second security policy operating in one or more processing cores.

13. A network subsystem comprising:
associating circuitry for associating a first mobile agent with a first security policy and a second mobile agent with a second security policy; and
evaluation circuitry for evaluating a received message at least in response to an indication of the first security policy and to an indication of the second security policy, the evaluation circuitry including at least: circuitry for requesting the indication of the first security policy;

circuitry for receiving a level indicator as the indication of the first security policy or the indication of the second security policy;

circuitry for deciding whether to enable a triggering circuit in response to the indication of the second security policy; and circuitry for updating at least one of the first security policy or the second security policy responsive to one or more inquiries relating to at least one of the first security policy or the second security policy operating in one or more processing cores.

14. The network subsystem of claim 1 in which the means for evaluating a received message at least in response to an indication of the first security policy and to an indication of the second security policy comprises:

means for obtaining one or more risk indicators in situational information about the first mobile agent and the second mobile agent.

15. The network subsystem of claim 1 in which the means for evaluating a received message at least in response to an indication of the first security policy and to an indication of the second security policy comprises:

means for evaluating the received message at least in response to a timing indicator defined in the received message.

16. The network subsystem of claim 1 in which the means for evaluating a received message at least in response to an indication of the first security policy and to an indication of the second security policy comprises:

means for updating at least one of the first security policy or the second security policy in response to at least one signal to change a security configuration of at least one of the first mobile agent or the second mobile agent.

17. The network subsystem of claim 1 in which the means for evaluating a received message at least in response to an indication of the first security policy and to an indication of the second security policy comprises:

means for updating at least one of the first security policy or the second security policy in response to information received from at least one of the first mobile agent or the second mobile agent.

18. The network subsystem of claim 1 in which the means for evaluating a received message at least in response to an indication of the first security policy and to an indication of the second security policy comprises:

means for updating at least one of the first security policy or the second security policy in response to a cost-indicative value indicating a burden associated with adding or removing a security criterion received from at least one of the first mobile agent or the second mobile agent.

19. The network subsystem of claim 1 in which the means for evaluating a received message at least in response to an indication of the first security policy and to an indication of the second security policy comprises:

means for substituting a different operating system having a substantially different security protocol in response to at least one signal to change a security configuration of at least one of the first mobile agent or the second mobile agent.

20. The network subsystem of claim 1 in which the means for evaluating a received message at least in response to an indication of the first security policy and to an indication of the second security policy comprises:

means for evaluating a received message at least in response to an indication of the first security policy and to an indication of the second security policy including at least distilling from the received message at least one of an affirmative indication of security policy activation or a negative indication of security policy deactivation as one or more of the first security policy or the second security policy.

21. The network subsystem of claim 1 in which the means for evaluating a received message at least in response to an indication of the first security policy and to an indication of the second security policy comprises:

means for updating at least one of the first security policy or the second security policy responsive to one or more inquiries relating to at least one of the first security policy or the second security policy.

\* \* \* \* \*